United States Patent [19]

Minor et al.

[11] Patent Number: 5,433,880
[45] Date of Patent: Jul. 18, 1995

[54] REFRIGERANT COMPOSITIONS WHICH INCLUDE A SULFUR COMPOUND

[75] Inventors: Barbara H. Minor, Elkton, Md.; Glenn S. Shealy, Hockessin, Del.

[73] Assignee: E. I. du Pont de Nemours and Company, Wilmington, Del.

[21] Appl. No.: 220,427

[22] Filed: Mar. 30, 1994

Related U.S. Application Data

[63] Continuation-in-part of Ser. No. 6,014, Jan. 15, 1993, abandoned.

[51] Int. Cl.[6] .......................... C09K 5/04; C11D 7/34; C11D 7/50; C08J 9/14
[52] U.S. Cl. ........................ 252/67; 62/114; 252/8; 252/162; 252/172; 252/194; 252/305; 252/364; 252/571; 252/DIG. 9; 264/53; 264/DIG. 5
[58] Field of Search ............... 62/114; 252/8, 67, 162, 252/170, 171, 172, 305, 364, 571, 194, DIG. 9; 264/53, DIG. 5

[56] References Cited

U.S. PATENT DOCUMENTS

| | | | |
|---|---|---|---|
| 2,697,726 | 12/1954 | Silvey et al. | 260/543 |
| 3,362,180 | 1/1968 | Eiseman | 62/112 |
| 4,166,798 | 9/1979 | Mastroianni et al. | 252/63.5 |
| 4,315,098 | 2/1982 | Dougherty et al. | 174/15 S |
| 4,961,321 | 10/1990 | O'Neill et al. | 62/114 |
| 5,187,206 | 2/1993 | Volkert et al. | 521/129 |
| 5,275,751 | 1/1994 | Decaire et al. | 252/67 |
| 5,286,822 | 2/1994 | Krespan et al. | 526/204 |

FOREIGN PATENT DOCUMENTS

| | | |
|---|---|---|
| 0510295A2 | 11/1992 | European Pat. Off. |
| 1953765 | 10/1969 | Germany |
| 2272086 | 11/1990 | Japan |
| 3093887 | 4/1991 | Japan |
| 3231939 | 10/1991 | Japan |
| 30229730 | 10/1991 | Japan |
| 4110385 | 4/1992 | Japan |
| 04110386A | 4/1992 | Japan |
| 05049711A | 3/1993 | Japan |
| 05202220A | 8/1993 | Japan |
| 05222235A | 8/1993 | Japan |
| 06041591A | 9/1994 | Japan |
| 2274462 | 7/1994 | United Kingdom |
| WO92/13931 | 8/1992 | WIPO |

OTHER PUBLICATIONS

*Research Disclosure* vol. 146 disclosure No. 14623 Jun. 1976.
Kopko, "Beyond CFCs: Extending the Search for New Refrigerants", ASHRAE CFC Technology Conference, Gaithersburg, Md., Sep. 1989.
PCT International Search Report: International Appln. No. PCT/US94/00072, International Filing Date Jun. 1, 1994.

*Primary Examiner*—Linda Skaling

[57] ABSTRACT

Refrigerant compositions are disclosed which include a first component of bis(trifluoromethyl)sulfide, difluoromethyl(trifluoromethyl)sulfide, pentafluoroethyl sulfur pentafluoride, difluoromethyl sulfur pentafluoride, trifluoromethylsulfur pentafluoride bis(pentafluoroethyl)sulfide and a second component of difluoromethane, 1,1,2,2-tetrafluoroethane, 1,1,1,2-tetrafluoroethane, 1,1,2-trifluoroethane, 1,1-difluoroethane, fluoroethane, dimethyl ether, ammonia, fluoromethyl trifluoromethyl ether, trifluoromethyl methyl ether, 1,1,1,2,2-pentafluoropropane, 2-fluoropropane, cyclopropane, bis(difluoromethyl)ether, 1,1,2,2-tetrafluoropropane, 1,1,1,2-tetrafluoropropane, 1-fluoropropane, 1,1,1,3,3-pentafluoropropane, 1,2,2-trifluoropropane, 2,2-difluoropropane, 1,2-difluoropropane, 1,1-difluoropropane, 1-trifluoromethoxy-2,2,2-trifluoroethane, tris(trifluoromethyl)amine or 1,1,2,2,3-pentafluoropropane.

6 Claims, 40 Drawing Sheets

REFRIGERANT COMPOSITIONS WHICH INCLUDE A SULFUR COMPOUND

CROSS-REFERENCE TO EARLIER FILED APPLICATION

This a continuation-in-part of patent application Ser. No. 08/006,014 filed Jan. 15, 1993, now abandoned.

FIELD OF THE INVENTION

This invention relates to refrigerant compositions that include at least one sulfur compound. This invention also relates to azeotropic or azeotrope-like compositions that include a sulfur compound, said compositions being useful as cleaning agents, expansion agents for polyolefins and polyurethanes, aerosol propellants, refrigerants, heat transfer media, gaseous dielectrics, fire extinguishing agents, power cycle working fluids, polymerization media, particulate removal fluids, carrier fluids, buffing abrasive agents, and displacement drying agents.

BACKGROUND OF THE INVENTION

Fluorinated hydrocarbons have many uses, one of which is as a refrigerant. Such refrigerants include dichlorodifluoromethane (CFC-12) and chlorodifluoromethane (HCFC-22).

In recent years it has been pointed out that certain kinds of fluorinated hydrocarbon refrigerants released into the atmosphere may adversely affect the stratospheric ozone layer. Although this proposition has not yet been completely established, there is a movement toward the control of the use and the production of certain chlorofluorocarbons (CFCs) and hydrochlorofluorocarbons (HCFCs) under an international agreement.

Accordingly, there is a demand for the development of refrigerants that have a lower ozone depletion potential than existing refrigerants while still achieving an acceptable performance in refrigeration applications. It is believed that sulfur compounds meet these criteria.

In refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure component or an azeotropic or azeotrope-like composition, the refrigerant composition may change when leaked or discharged to the atmosphere from the refrigeration equipment, which may result in undesirable changes to the refrigerant, such as causing the refrigerant to become flammable or to have poor refrigeration performance.

Accordingly, it is desirable to use as a refrigerant an azeotropic or azeotrope-like composition that includes a sulfur compound.

Compositions that include a sulfur compound may also be used as a cleaning agent or solvent to clean, for example, electronic circuit boards. It is desirable that the cleaning agents be azeotropic or azeotrope-like because in vapor degreasing operations the cleaning agent is generally redistilled and reused for final rinse cleaning.

Azeotropic or azeotrope-like compositions that include a sulfur compound are also useful as blowing agents in the manufacture of closed-cell polyurethane, phenolic and thermoplastic foams, as propellants in aerosols, as heat transfer media, gaseous dielectrics, fire extinguishing agents, power cycle working fluids, such as for heat pumps, inert media for polymerization reactions, fluids for removing particulates from metal surfaces, as carrier fluids that may be used, for example, to place a fine film of lubricant on metal parts, or as buffing abrasive agents to remove buffing abrasive compounds from polished surfaces such as metal, as displacement drying agents for removing water, such as from jewelry or metal parts, as resist developers in conventional circuit manufacturing techniques including chlorine-type developing agents, and as strippers for photoresists when used with, for example, a chlorohydrocarbon such as 1,1,1-trichloroethane or trichloroethylene.

SUMMARY OF THE INVENTION

The present invention relates to the discovery of refrigerant compositions which include a first component of bis(trifluoromethyl)sulfide, difluoromethyl(trifluoromethyl)sulfide, pentafluoroethyl sulfur pentafluoride, difluoromethyl sulfur pentafluoride, trifluoromethylsulfur pentafluoride or bis(pentafluoroethyl)sulfide and a second component of difluoromethane, 1,1,2,2-tetrafluoroethane, 1,1,1,2-tetrafluoroethane, 1,1,2-trifluoroethane, 1,1-difluoroethane, fluoroethane, dimethyl ether, ammonia, fluoromethyl trifluoromethyl ether, trifluoromethyl methyl ether, 1,1,1,2,2-pentafluoropropane, 2-fluoropropane, cyclopropane, bis(difluoromethyl)ether, 1,1,2,2-tetrafluoropropane, 1,1,1,2-tetrafluoropropane, 2,2-difluoropropane, 1-fluoropropane, 1,1,1,3,3-pentafluoropropane, 1,2,2-trifluoropropane, 2,2-difluoropropane, 1,2-difluoropropane, 1,1-difluoropropane, 1-fluoropropane, 1-trifluoromethoxy-2,2,2-trifluoroethane, tris(trifluoromethyl)amine or 1,1,2,2,3-pentafluoropropane, as well as azeotrope or azeotrope-like compositions of these components.

The compositions of the invention are also useful as cleaning agents, expansion agents for polyolefins and polyurethanes, aerosol propellants, refrigerants, heat transfer media, gaseous dielectrics, fire extinguishing agents, power cycle working fluids, polymerization media, particulate removal fluids, carrier fluids, buffing abrasive agents, and displacement drying agents.

DETAILED DESCRIPTION

Figure 1:
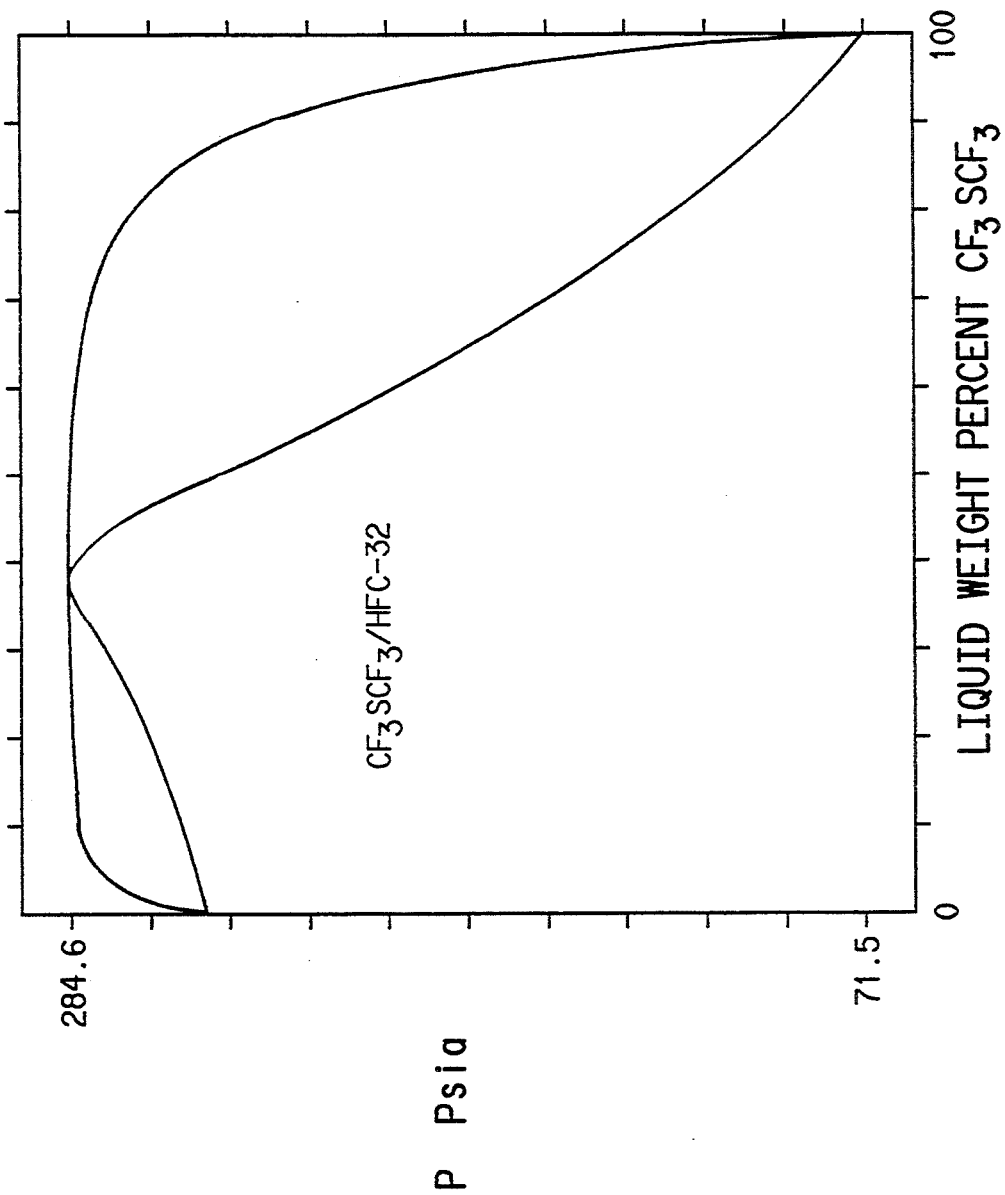
FIG. 1 is a graph of the vapor/liquid equilibrium curve for mixtures of $CF_3SCF_3$ and HFC-32 at 25° C.
Figure 2:
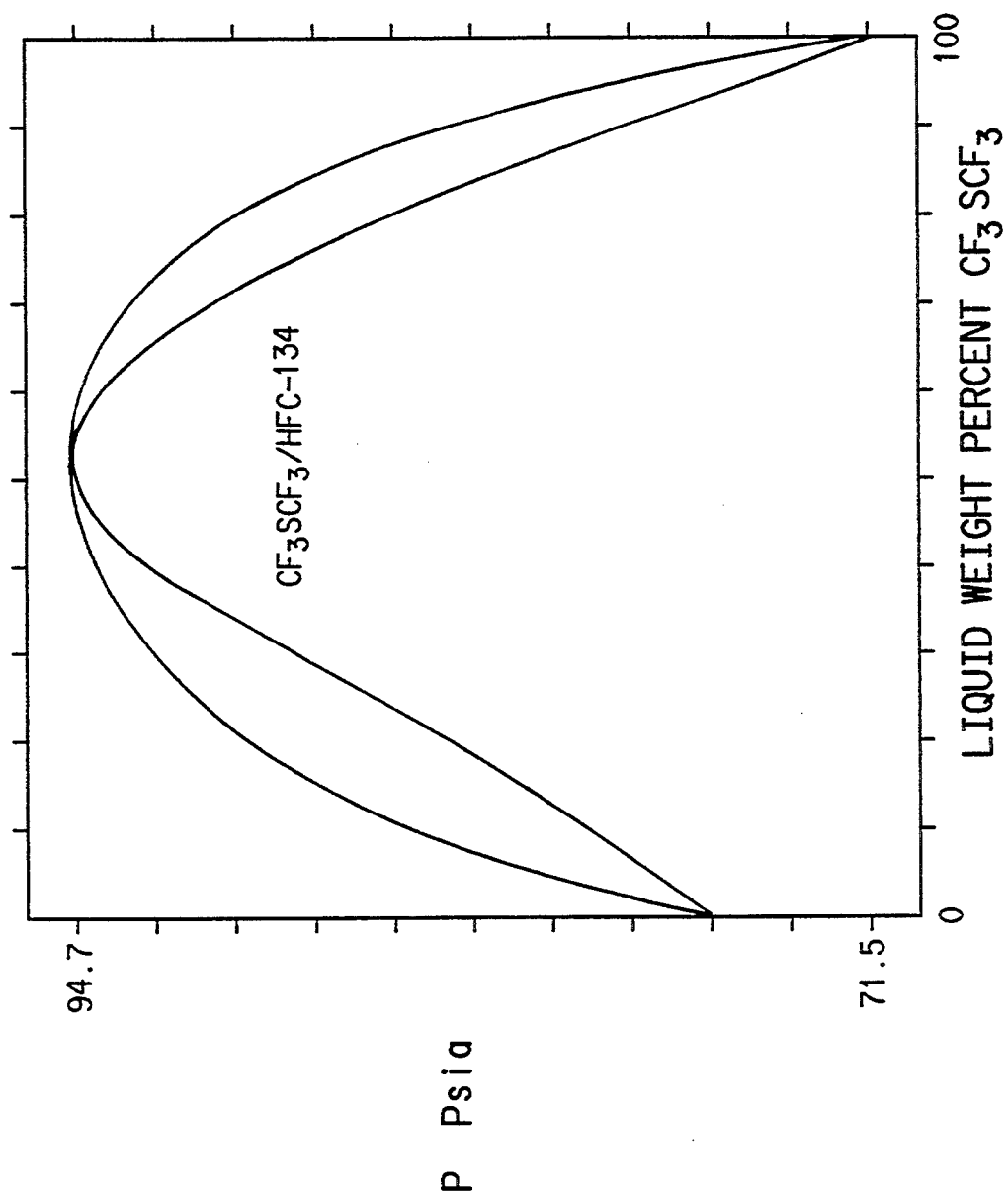
FIG. 2 is a graph of the vapor/liquid equilibrium curve for mixtures of $CF_3SCF_3$ and HFC-134 at 25° C.
Figure 3:
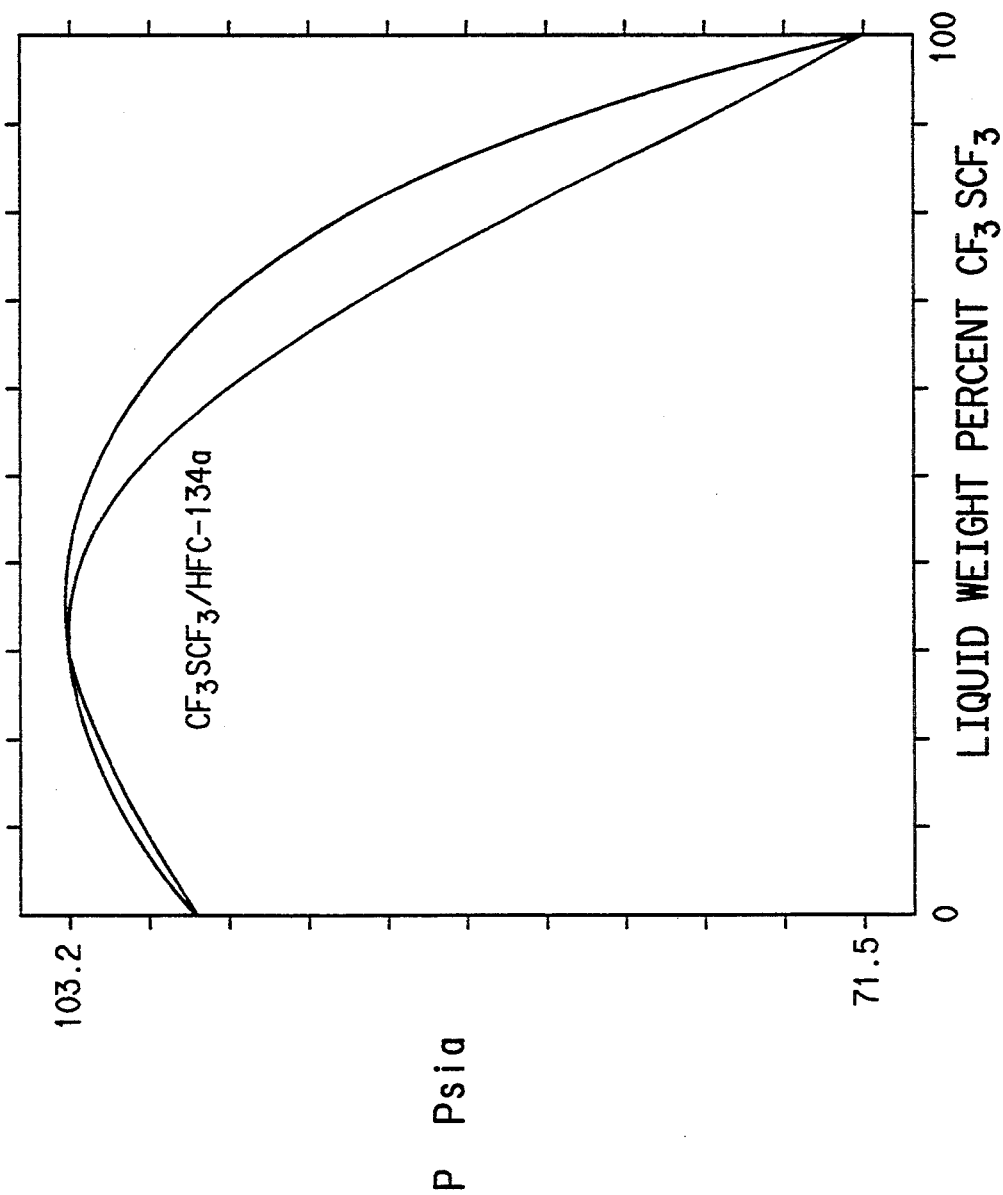
FIG. 3 is a graph of the vapor/liquid equilibrium curve for mixtures of $CF_3SCF_3$ and HFC-134a at 25° C.
Figure 4:
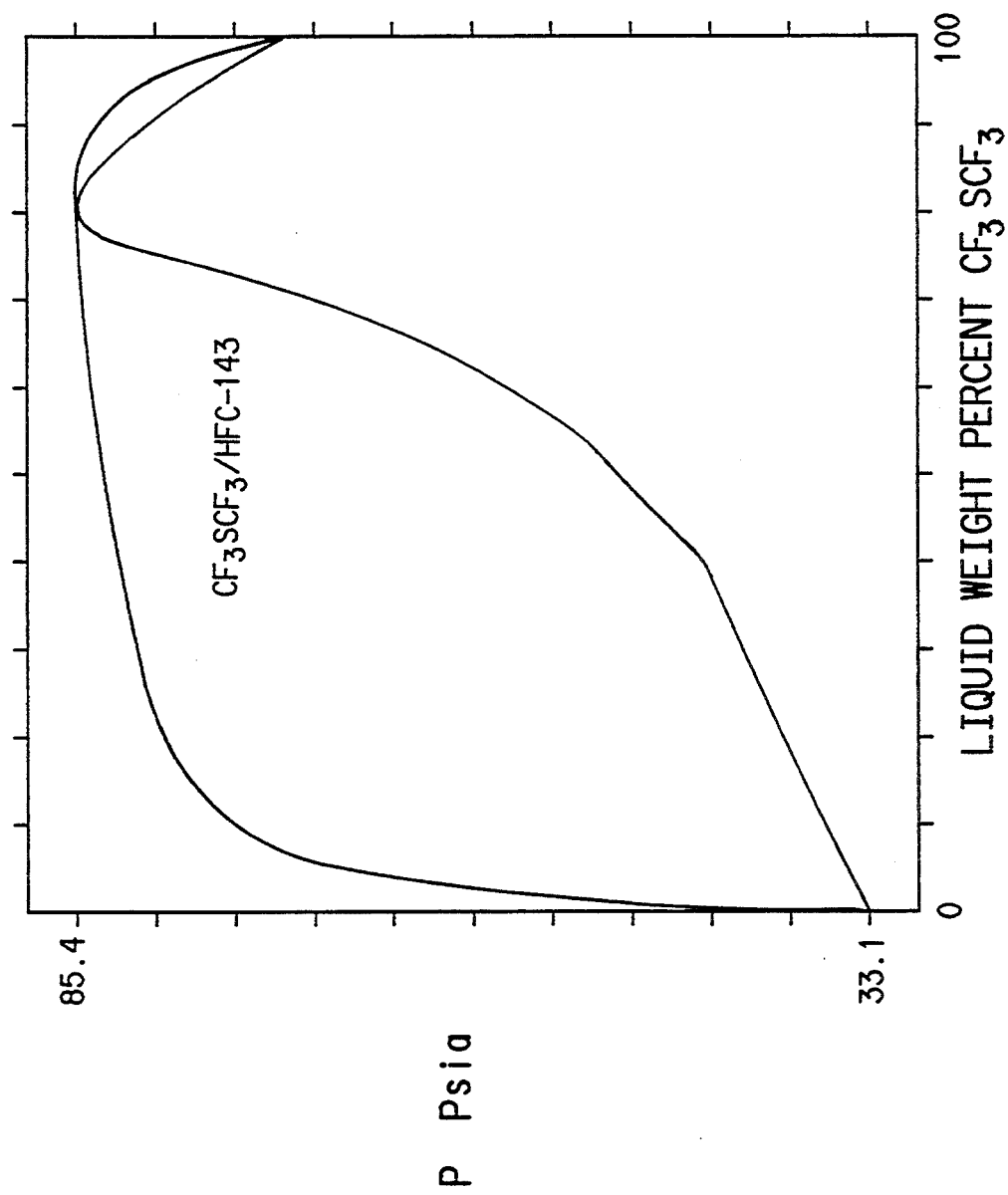
FIG. 4 is a graph of the vapor/liquid equilibrium curve for mixtures of $CF_3SCF_3$ and HFC-143 at 25° C.
Figure 5:
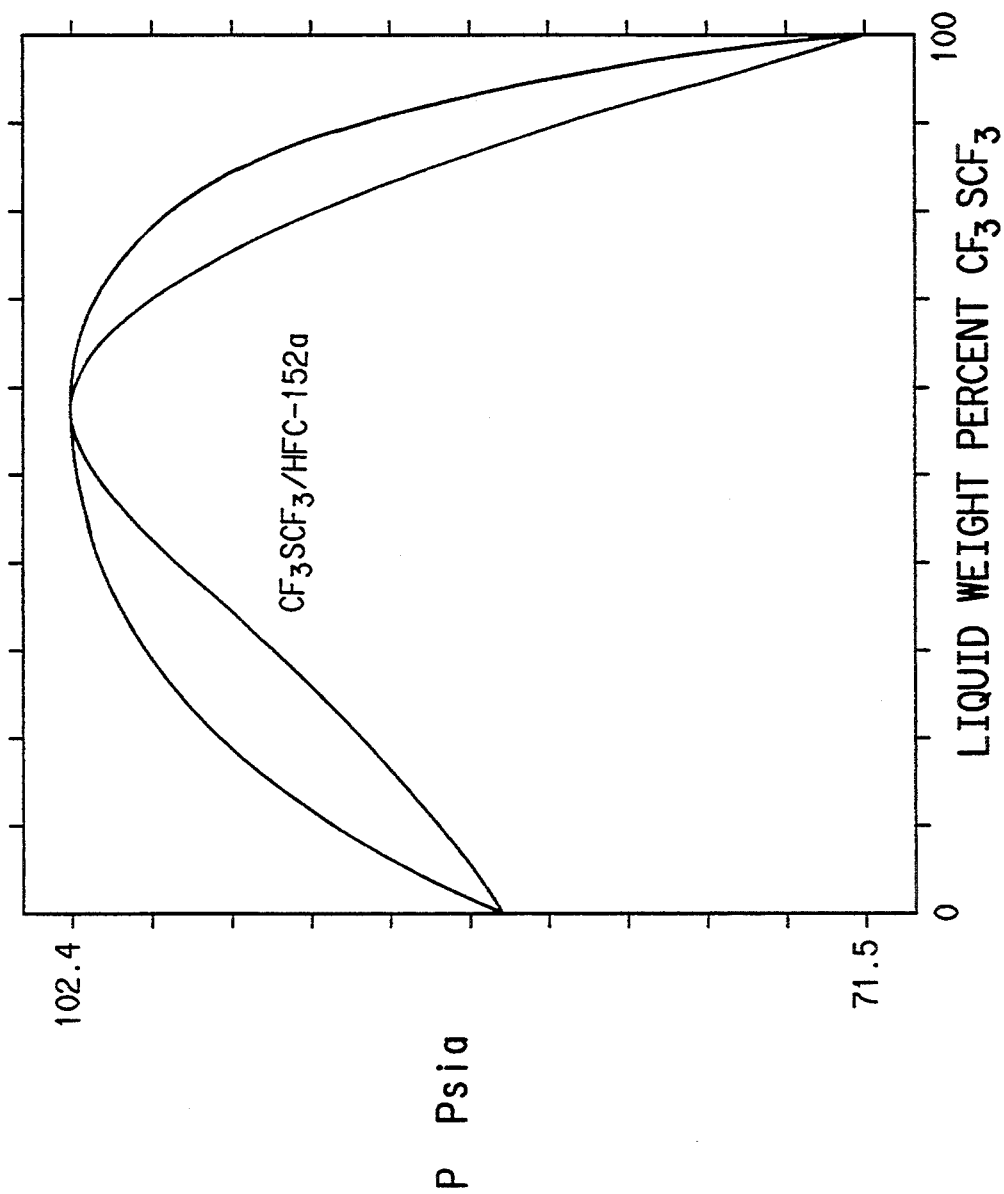
FIG. 5 is a graph of the vapor/liquid equilibrium curve for mixtures of $CF_3SCF_3$ and HFC-152a at 25° C.
Figure 6:
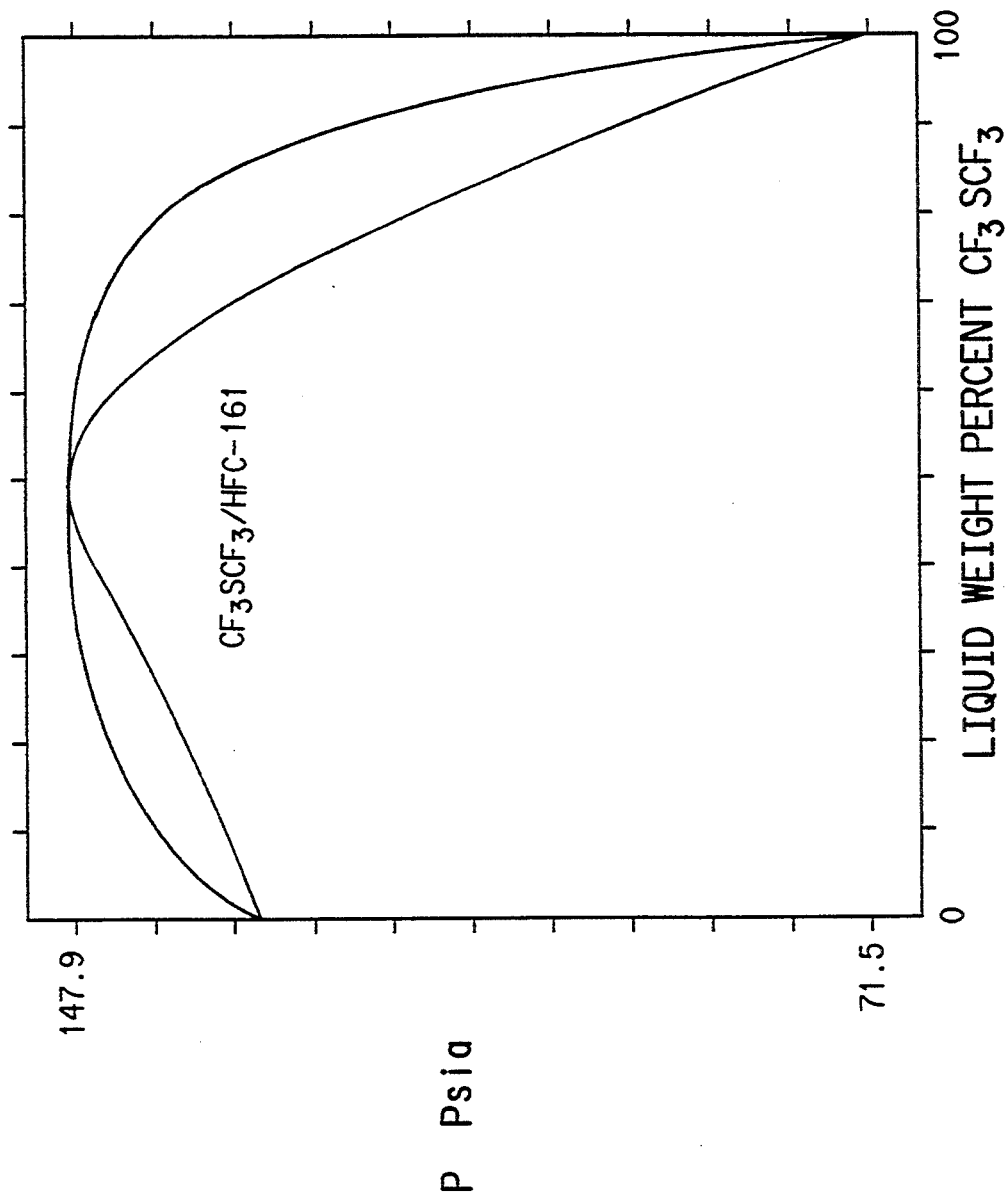
FIG. 6 is a graph of the vapor/liquid equilibrium curve for mixtures of $CF_3SCF_3$ and HFC-161 at 25° C.
Figure 7:
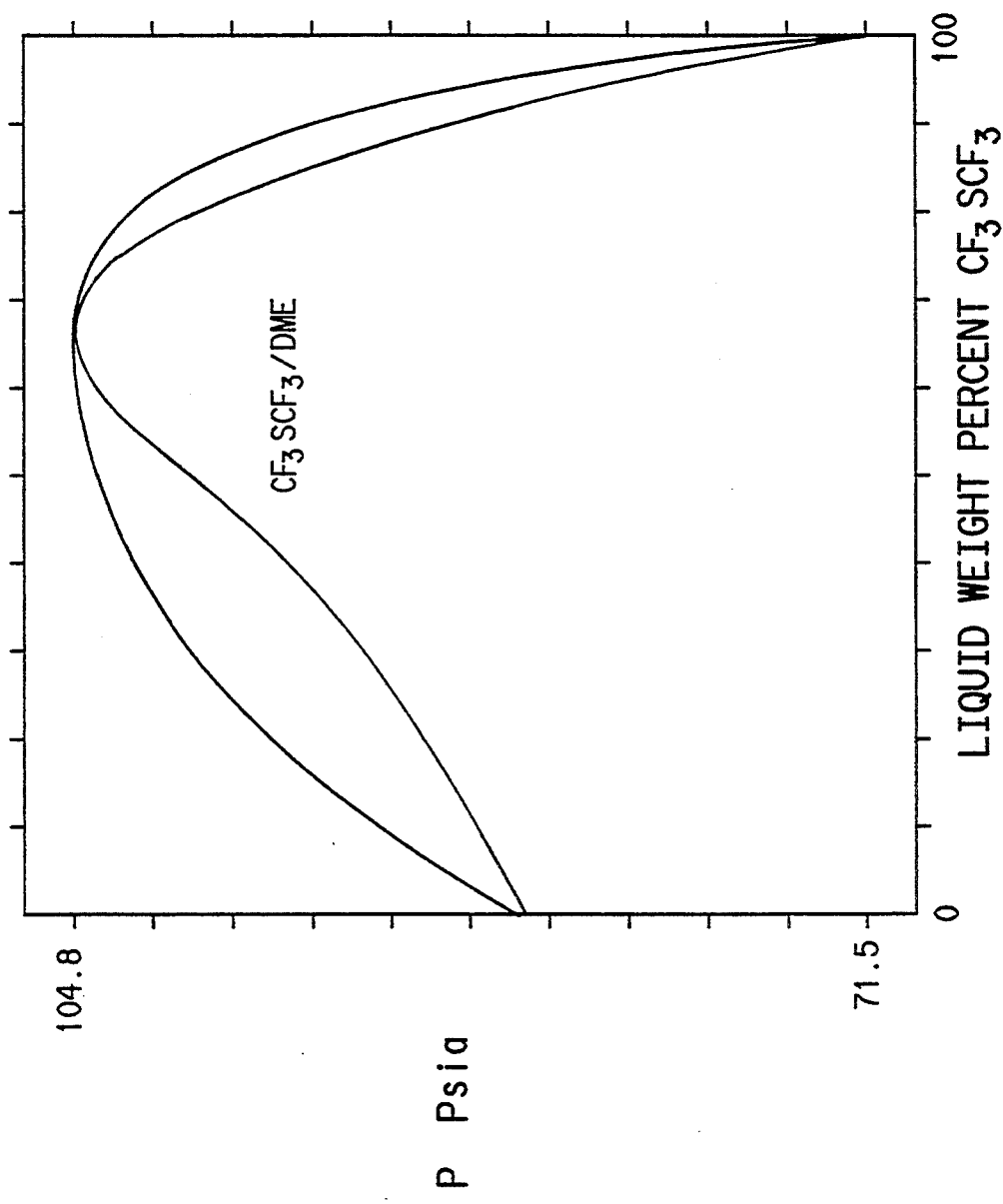
FIG. 7 is a graph of the vapor/liquid equilibrium curve for mixtures of $CF_3SCF_3$ and DME at 25° C.
Figure 8:
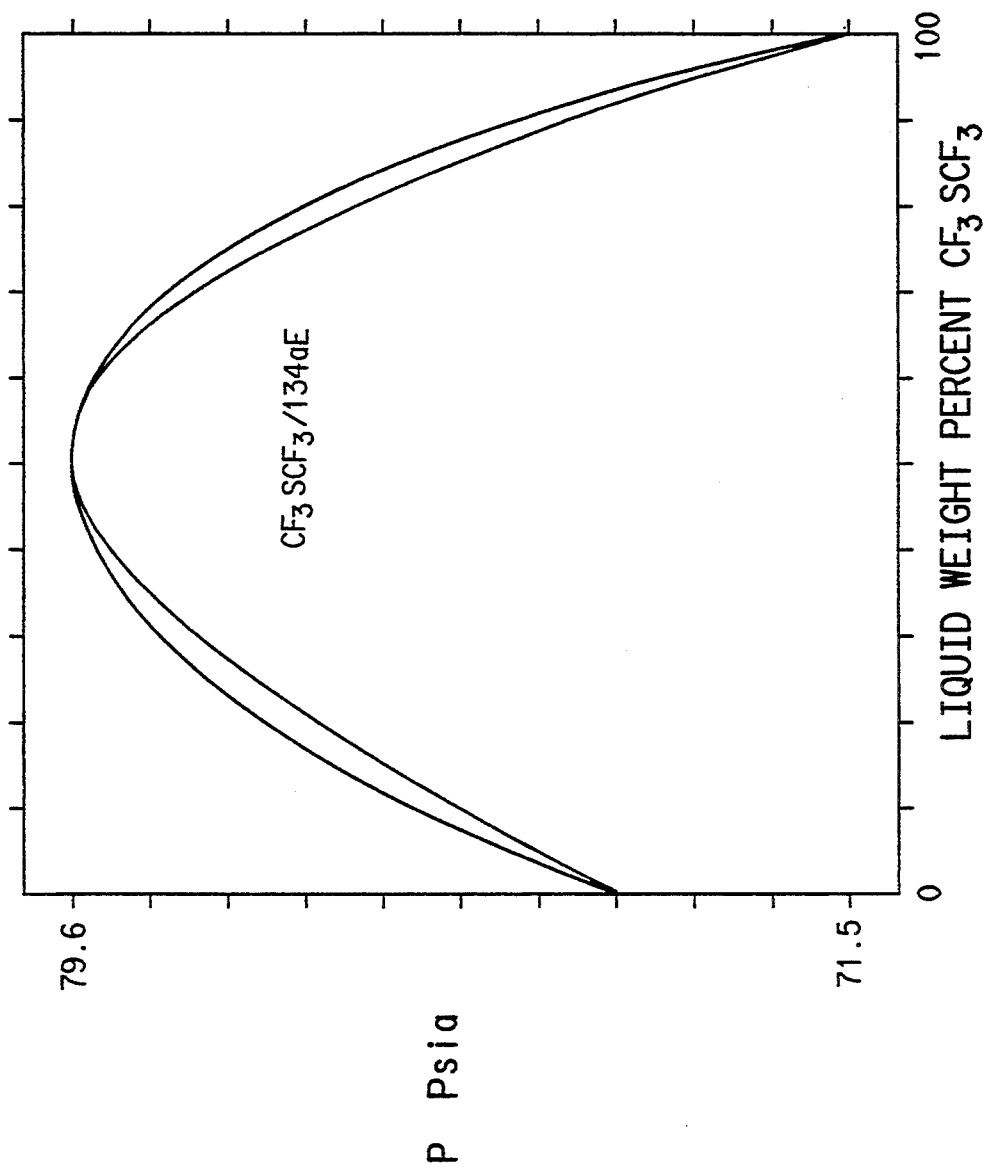
FIG. 8 is a graph of the vapor/liquid equilibrium curve for mixtures of $CF_3SCF_3$ and 134aE at 25° C.
Figure 9:
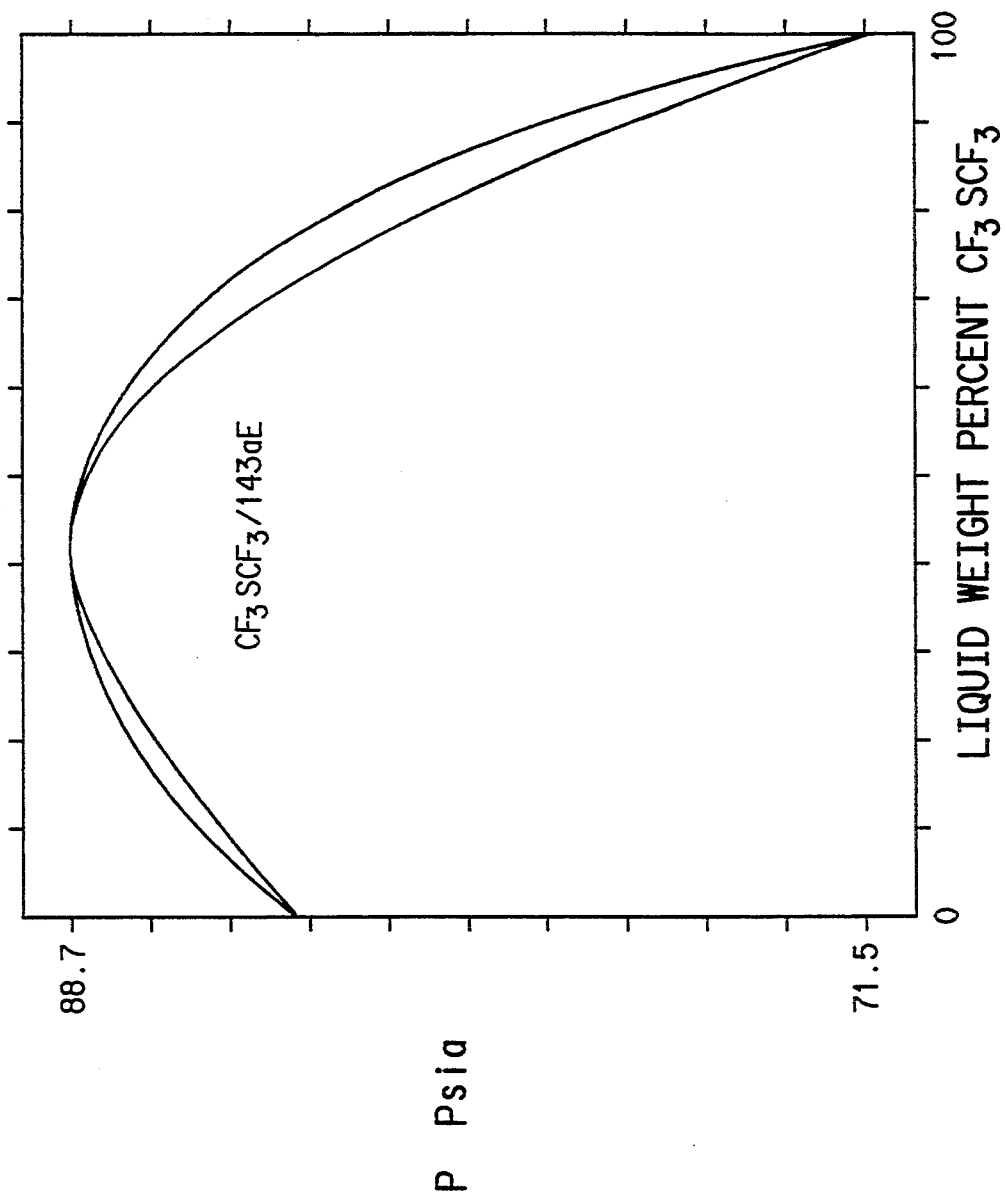
FIG. 9 is a graph of the vapor/liquid equilibrium curve for mixtures of $CF_3SCF_3$ and 143aE at 25° C.
Figure 10:
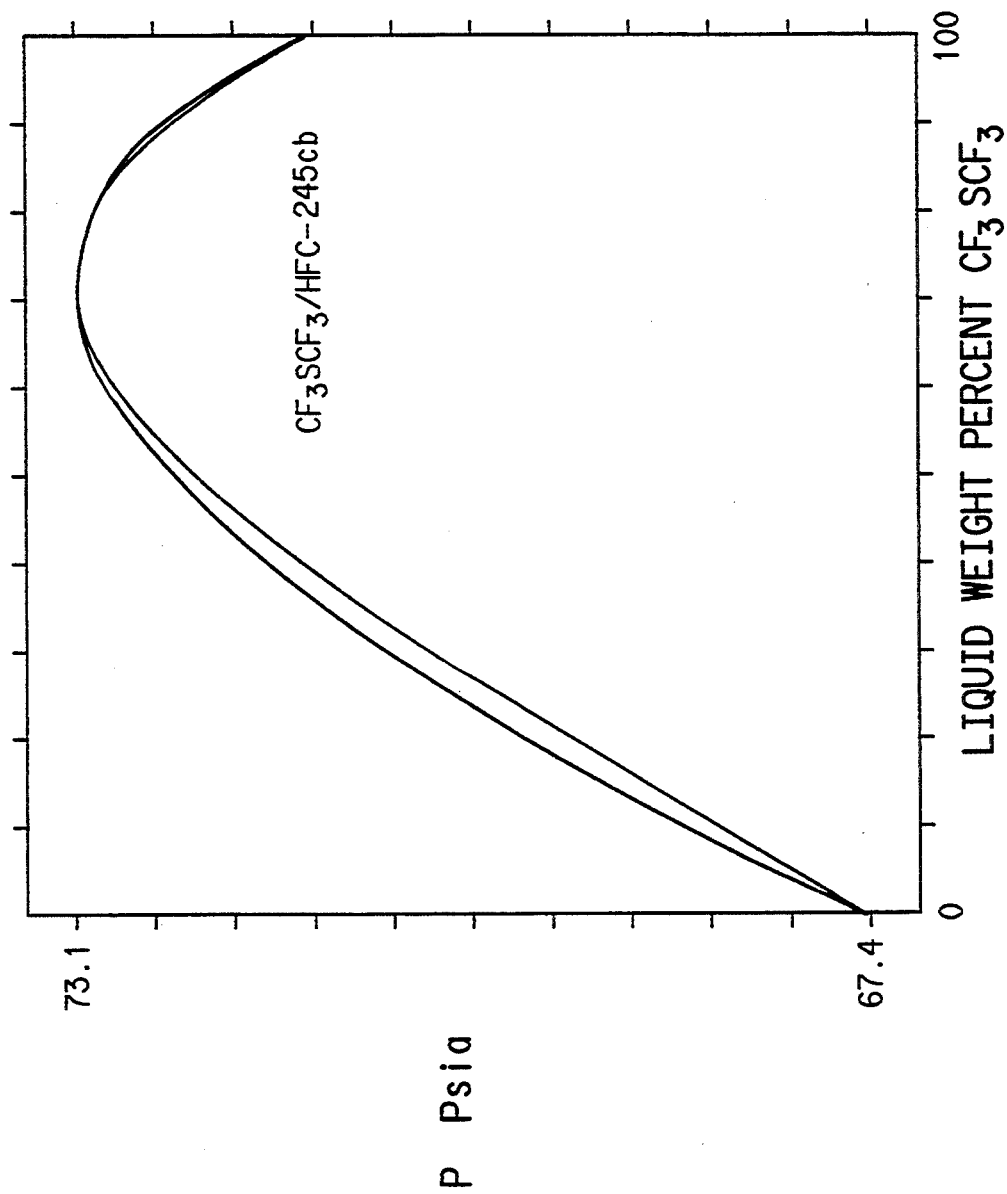
FIG. 10 is a graph of the vapor/liquid equilibrium curve for mixtures of $CF_3SCF_3$ and HFC-245cb at 25° C.
Figure 11:
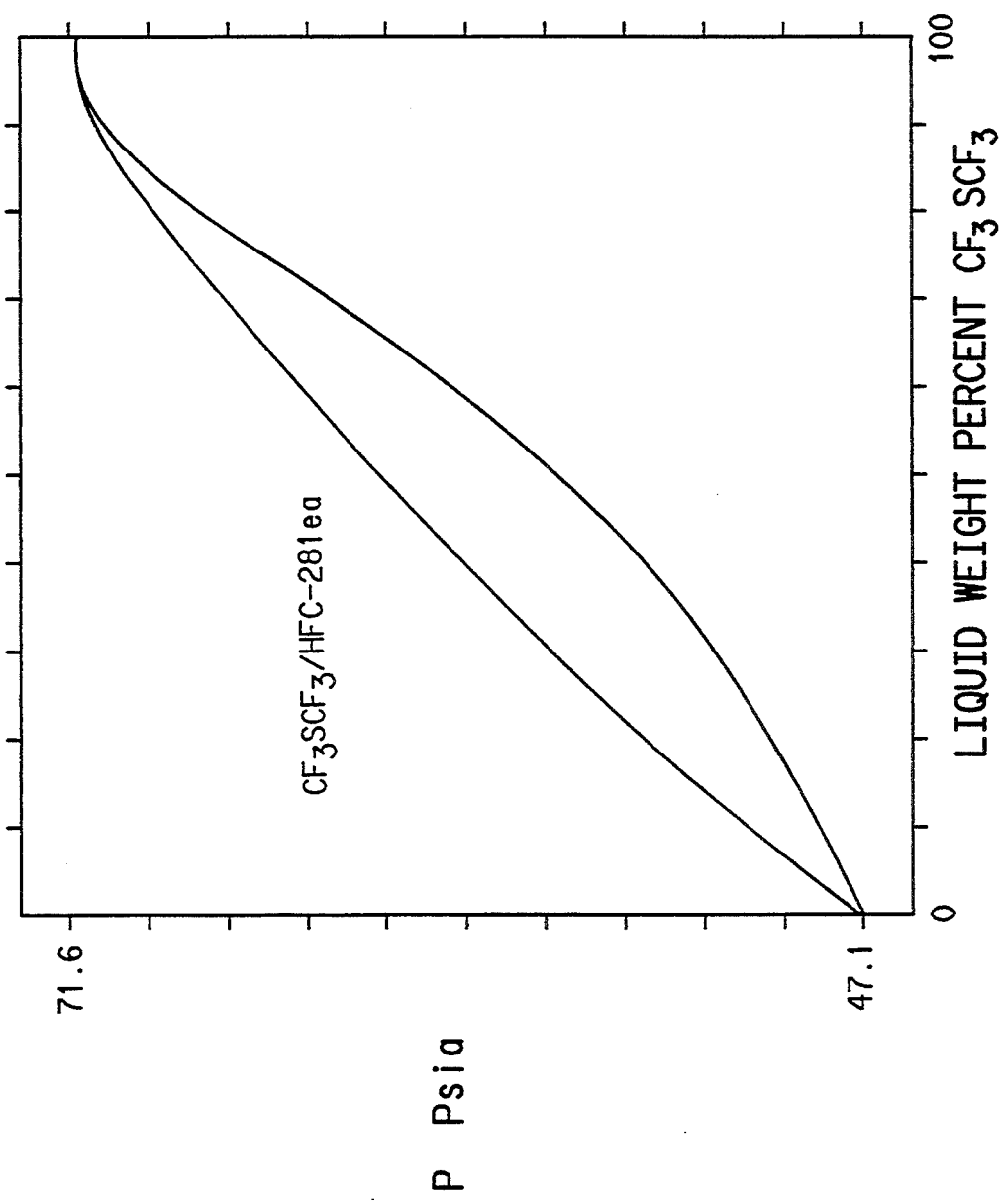
FIG. 11 is a graph of the vapor/liquid equilibrium curve for mixtures of CF$_3$SCF$_3$ and HFC-281ea at 25° C.
Figure 12:
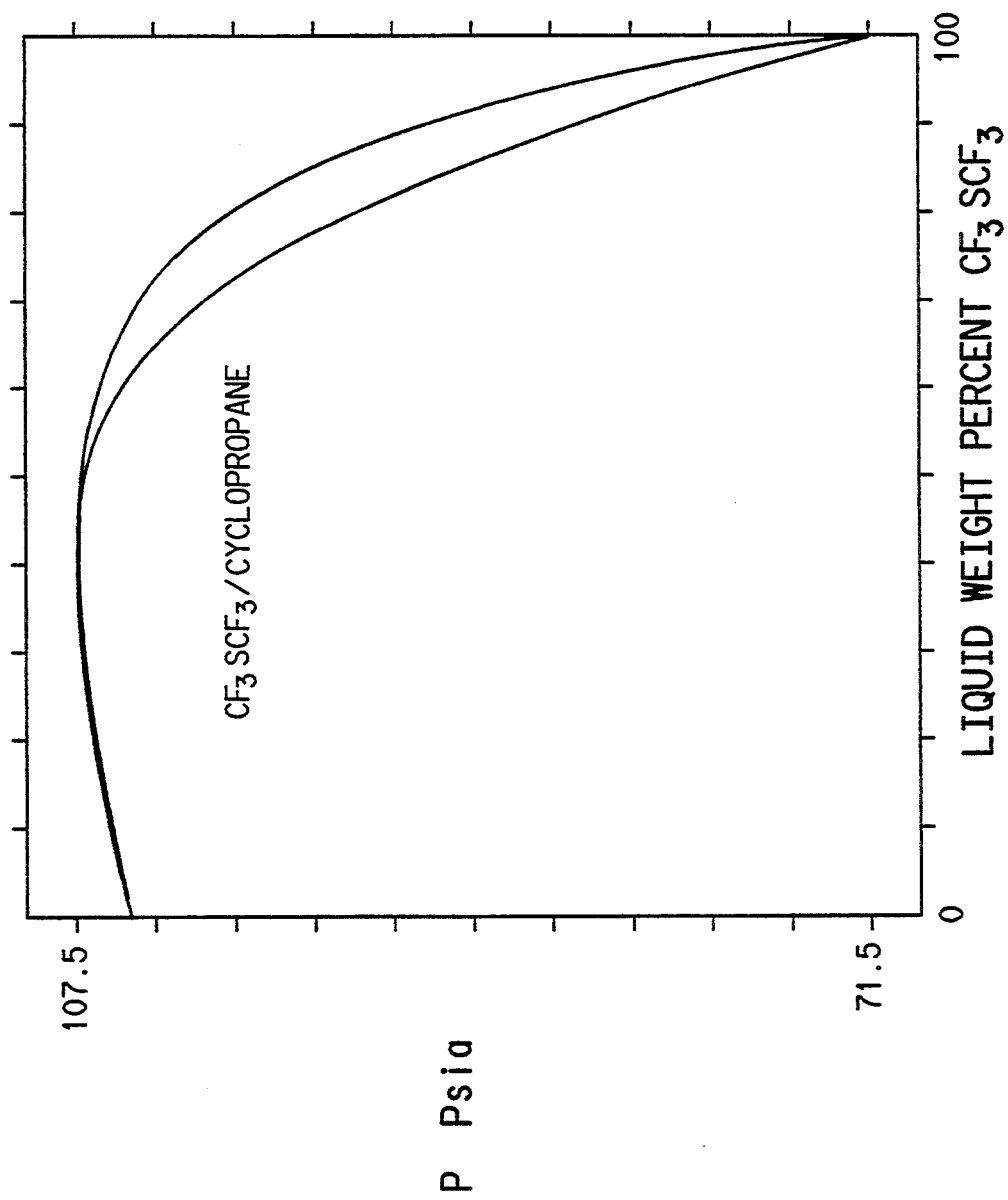
FIG. 12 is a graph of the vapor/liquid equilibrium curve for mixtures of CF$_3$SCF$_3$ and cyclopropane at 25° C.
Figure 13:
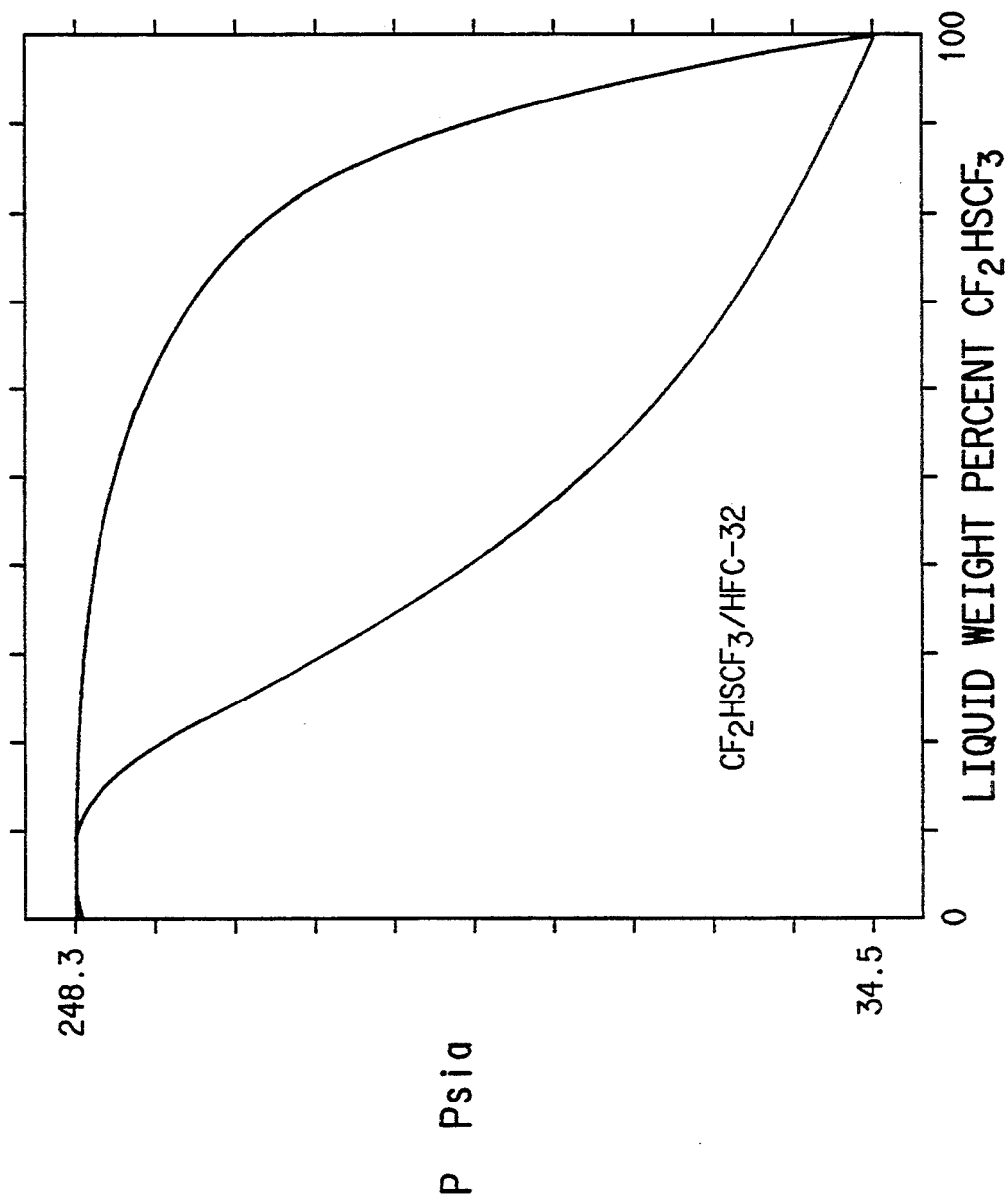
FIG. 13 is a graph of the vapor/liquid equilibrium curve for mixtures of CF$_2$HSCF$_3$ and HFC-32 at 25° C.
Figure 14:
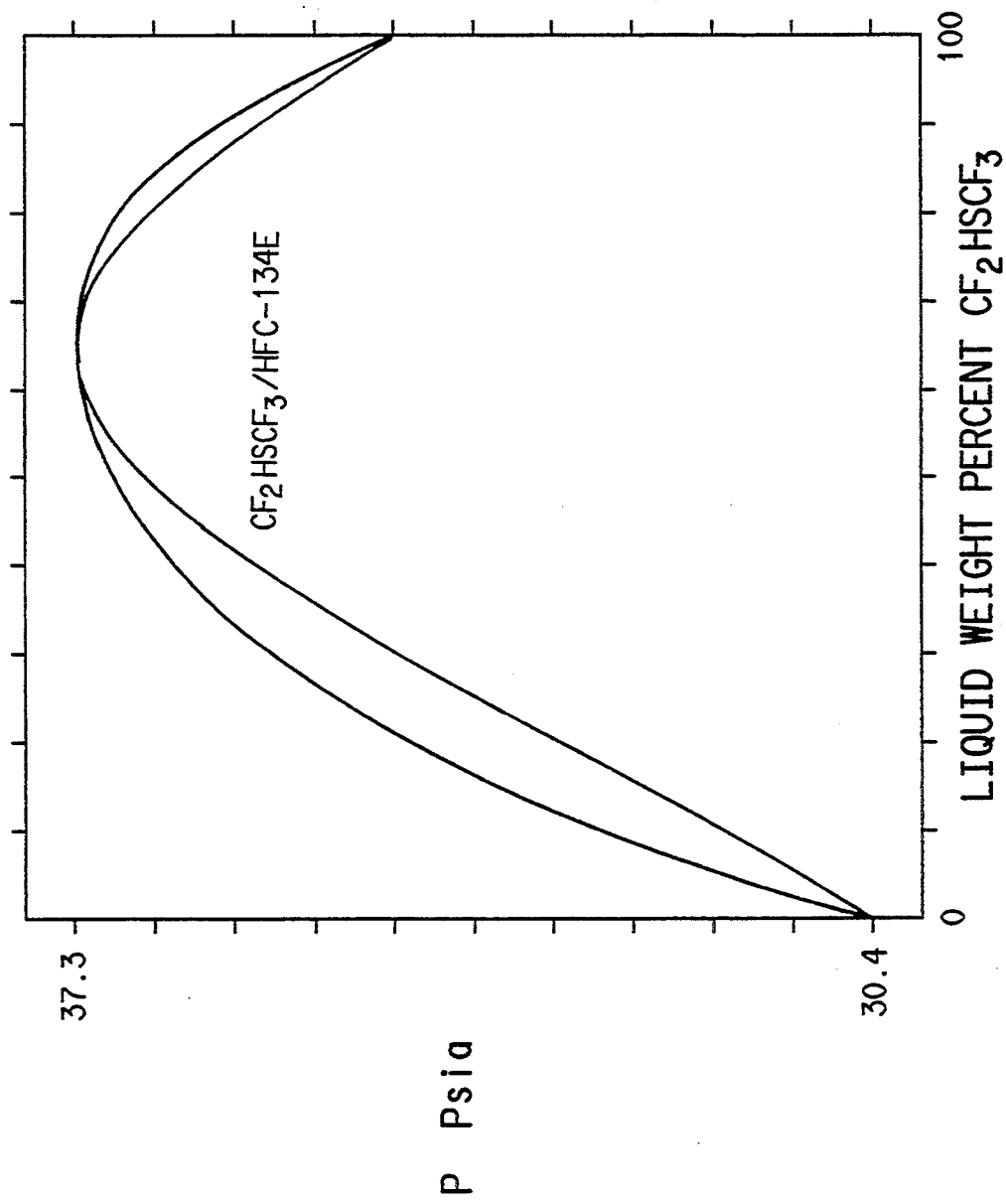
FIG. 14 is a graph of the vapor/liquid equilibrium curve for mixtures of CF$_2$HSCF$_3$ and 134E at 25° C.
Figure 15:
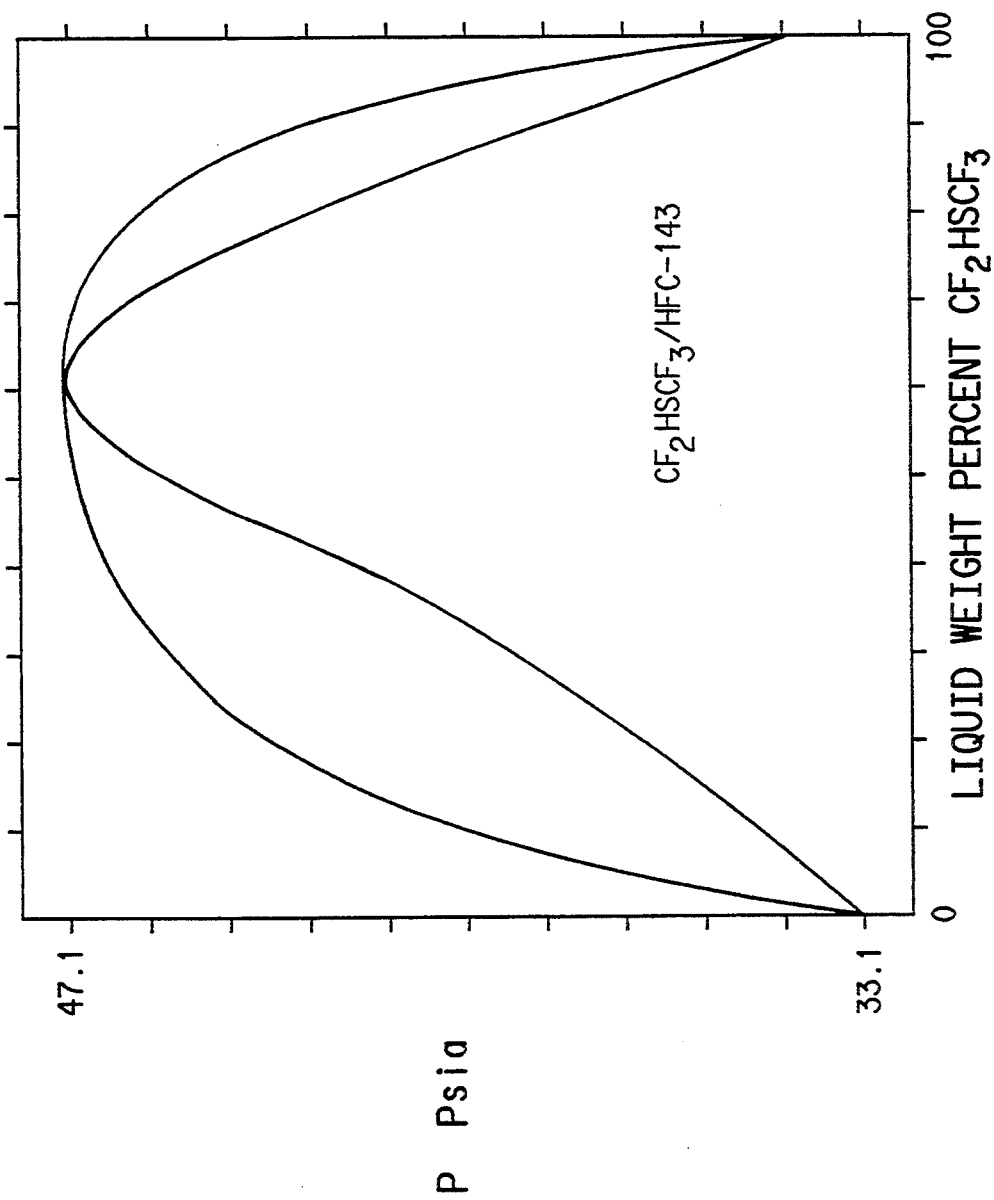
FIG. 15 is a graph of the vapor/liquid equilibrium curve for mixtures of CF$_2$HSCF$_3$ and HFC-143 at 25° C.
Figure 16:
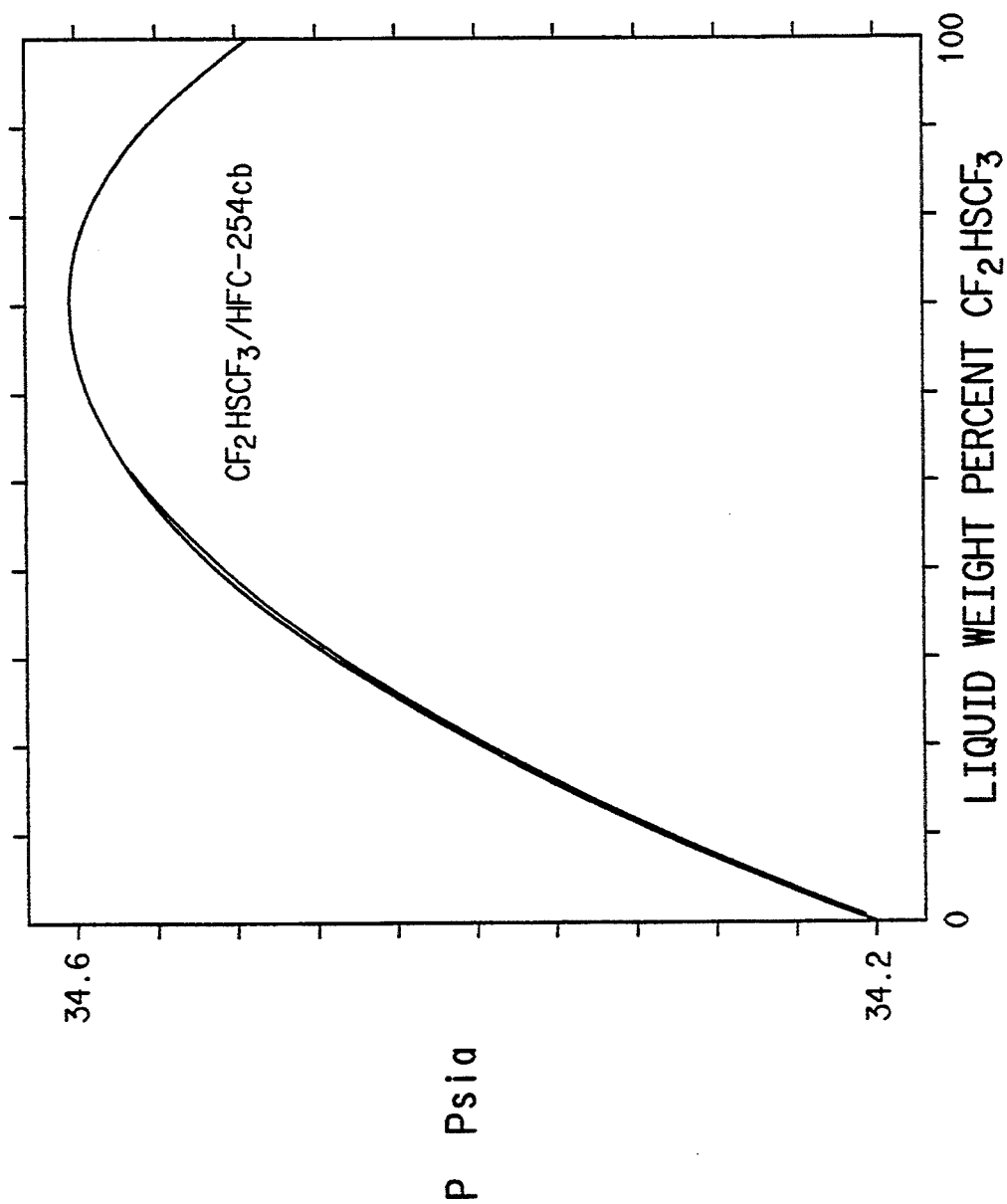
FIG. 16 is a graph of the vapor/liquid equilibrium curve for mixtures of CF$_2$HSCF$_3$ and HFC-254cb at 25° C.
Figure 17:
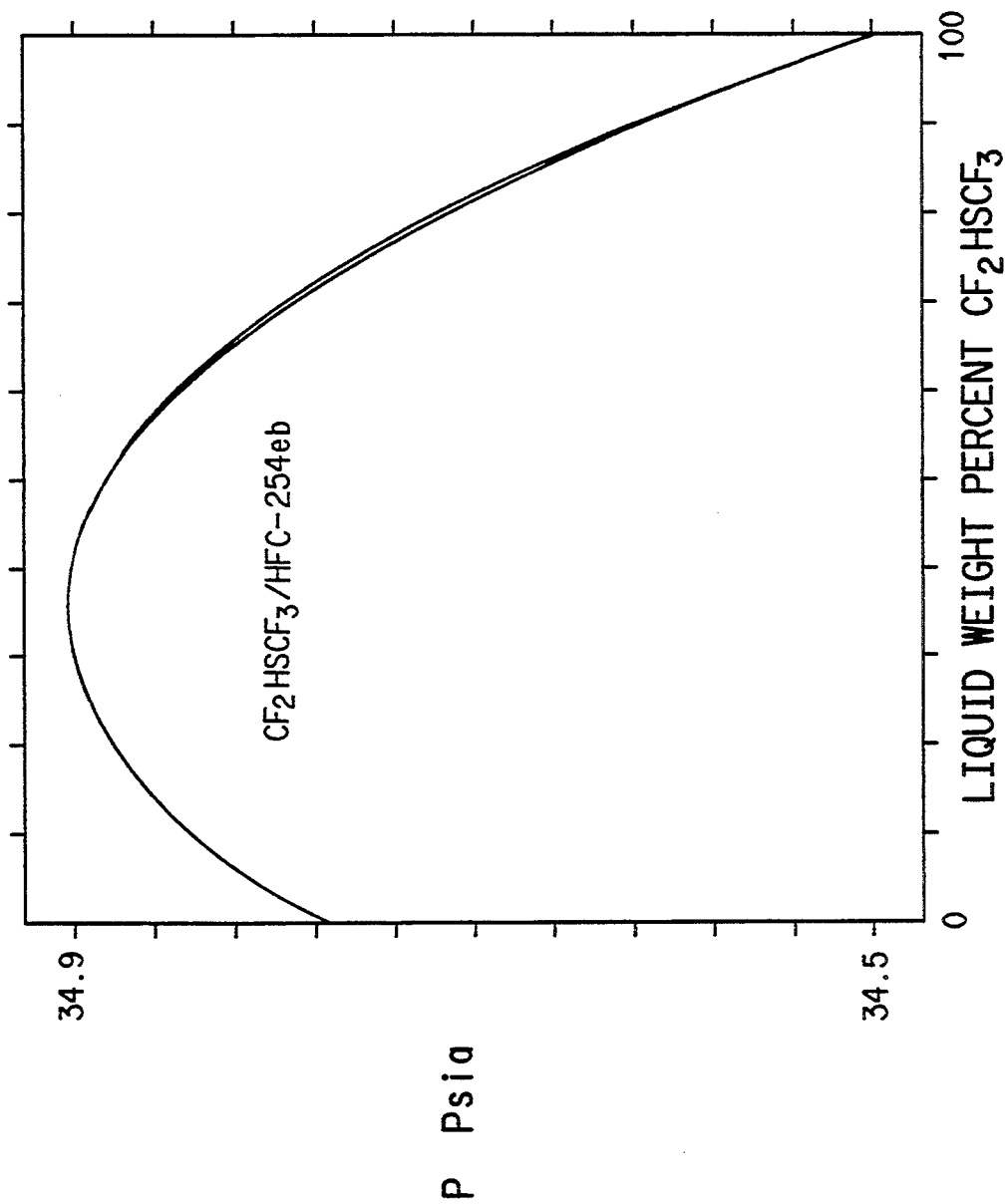
FIG. 17 is a graph of the vapor/liquid equilibrium curve for mixtures of CF$_2$HSCF$_3$ and HFC-254eb at 25° C.
Figure 18:
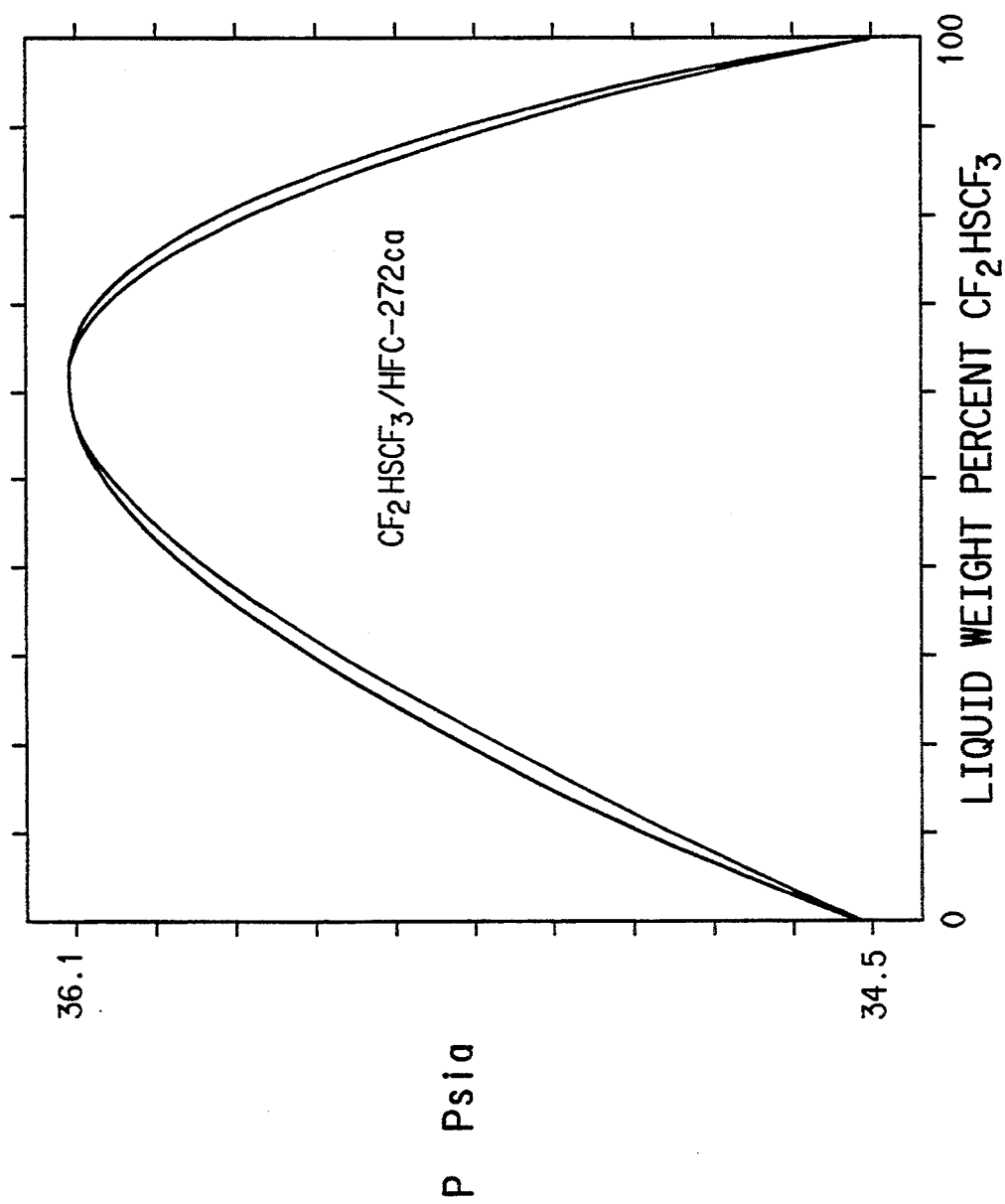
FIG. 18 is a graph of the vapor/liquid equilibrium curve for mixtures of CF$_2$HSCF$_3$ and HFC-272ca at 25° C.
Figure 19:
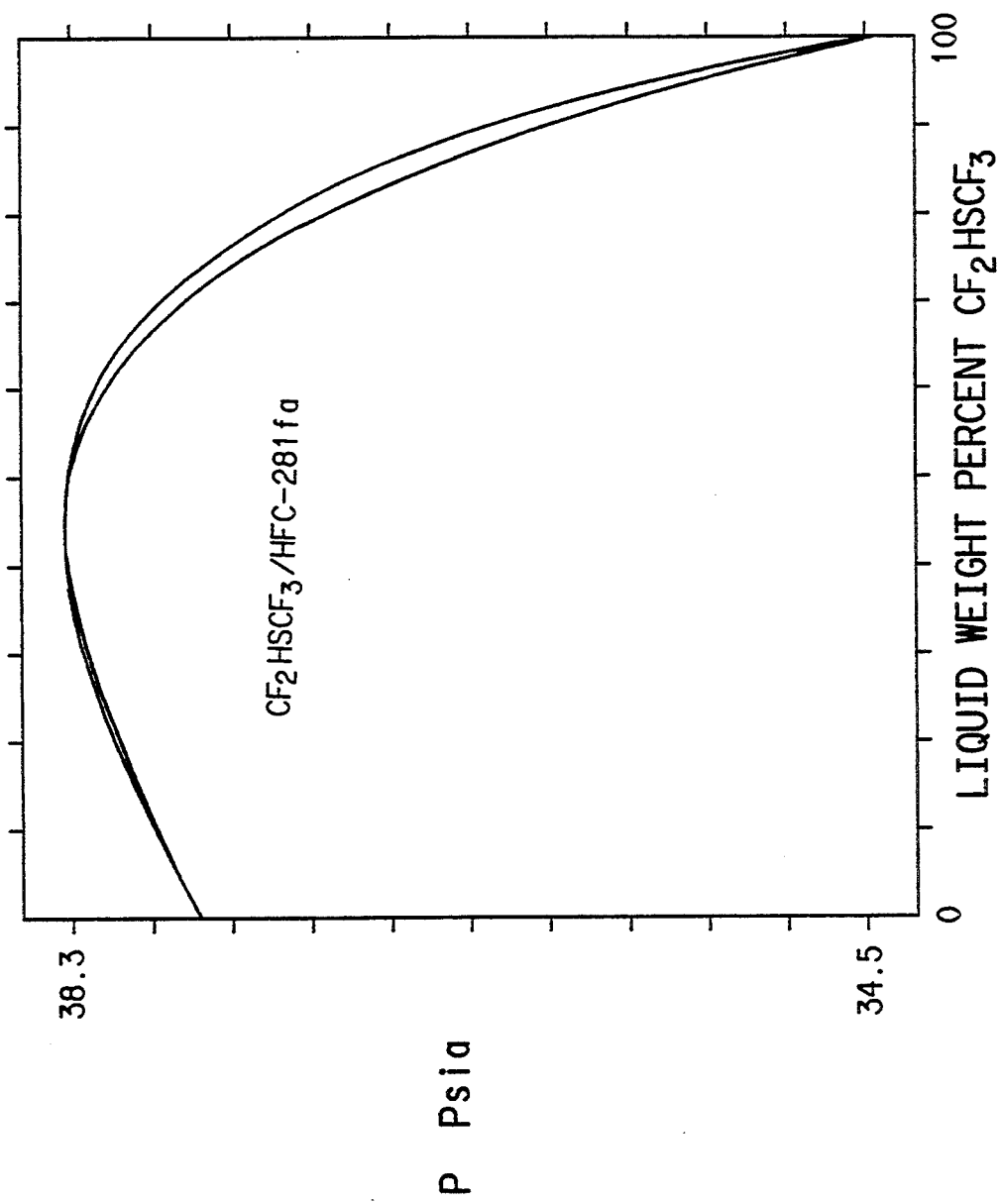
FIG. 19 is a graph of the vapor/liquid equilibrium curve for mixtures of CF$_2$HSCF$_3$ and HFC-281fa at 25° C.
Figure 20:
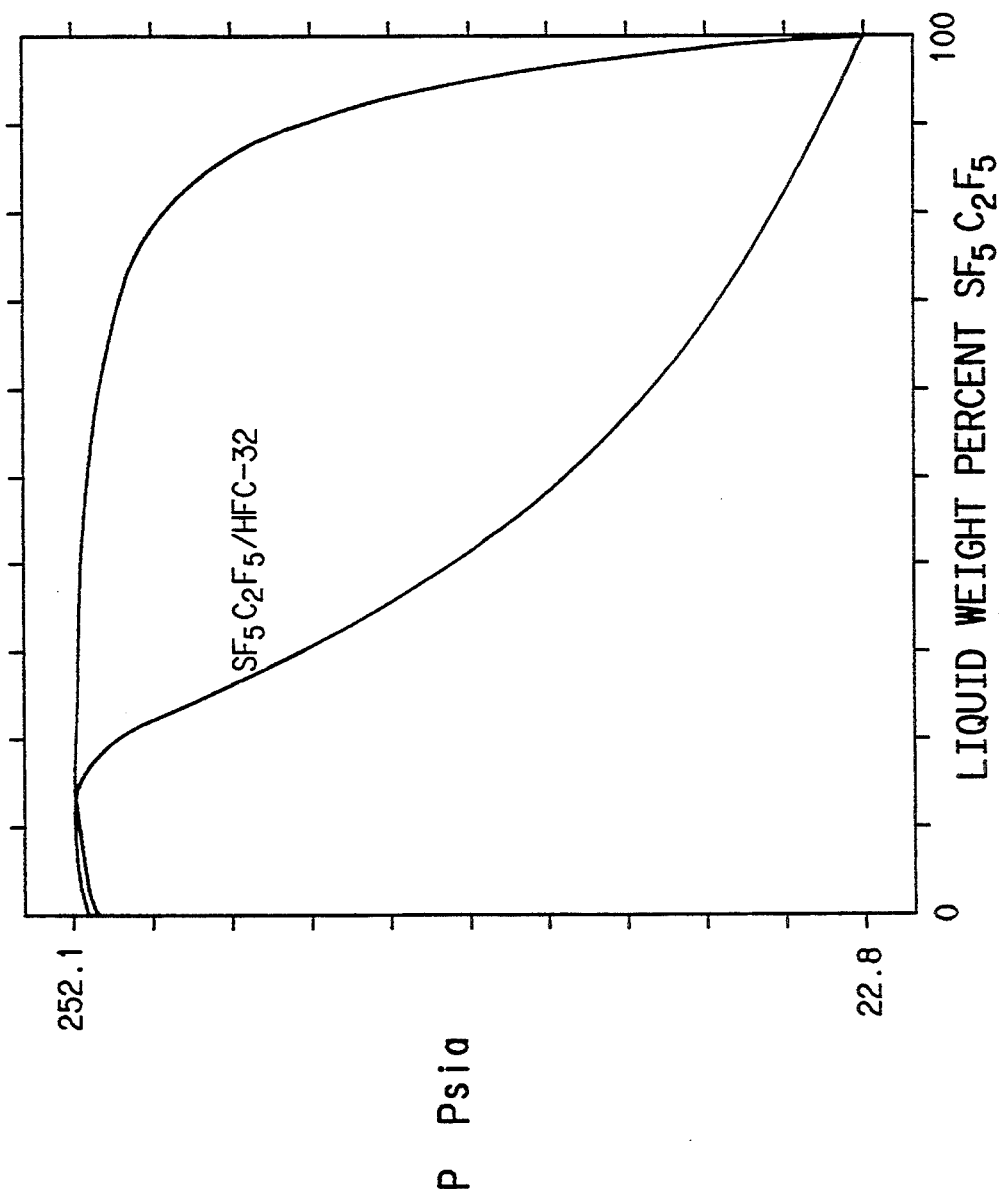
FIG. 20 is a graph of the vapor/liquid equilibrium curve for mixtures of SF$_5$C$_2$F$_5$ and HFC-32 at 25° C.
Figure 21:
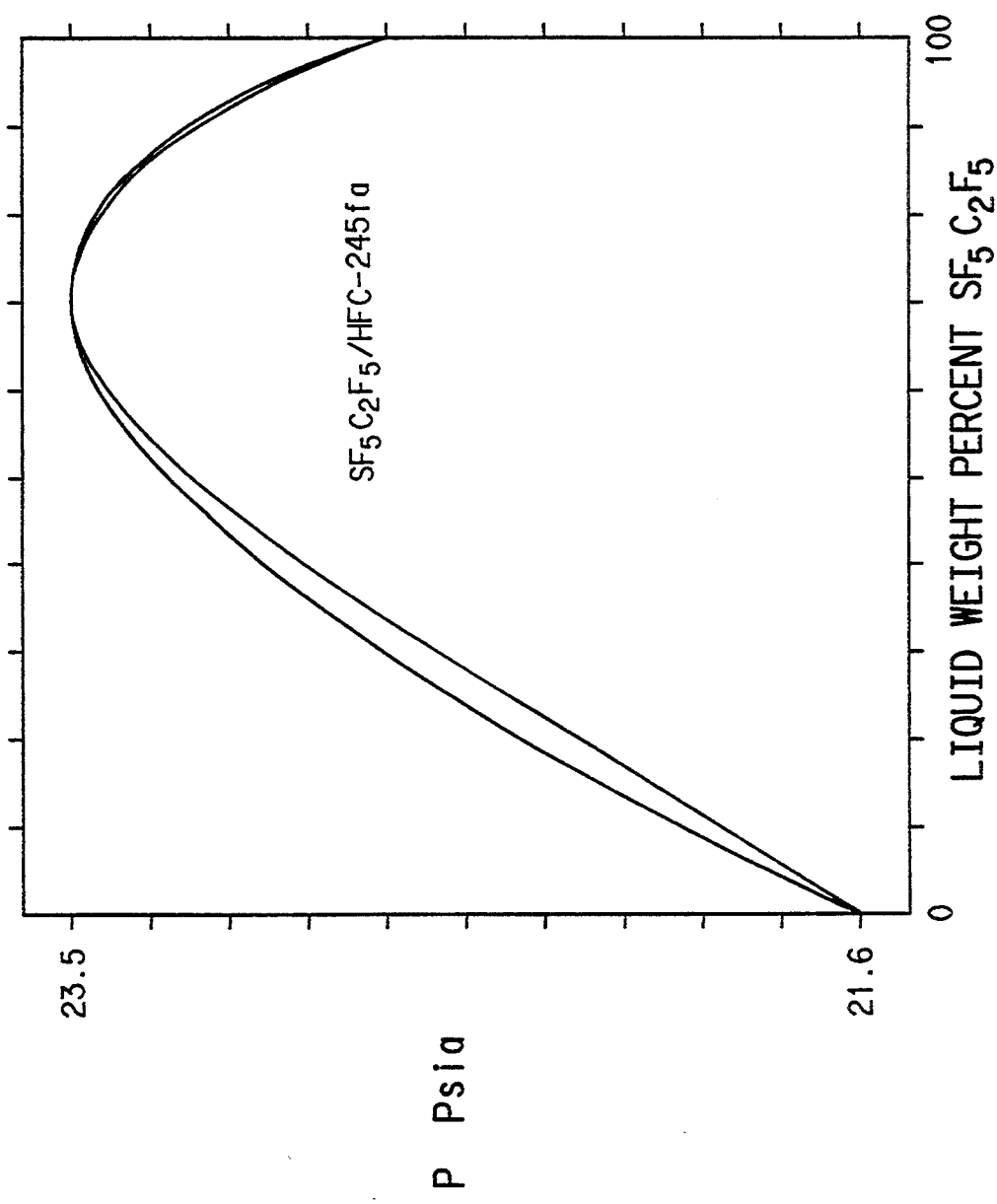
FIG. 21 is a graph of the vapor/liquid equilibrium curve for mixtures of SF$_5$C$_2$F$_5$ and HFC-245fa at 25° C.
Figure 22:
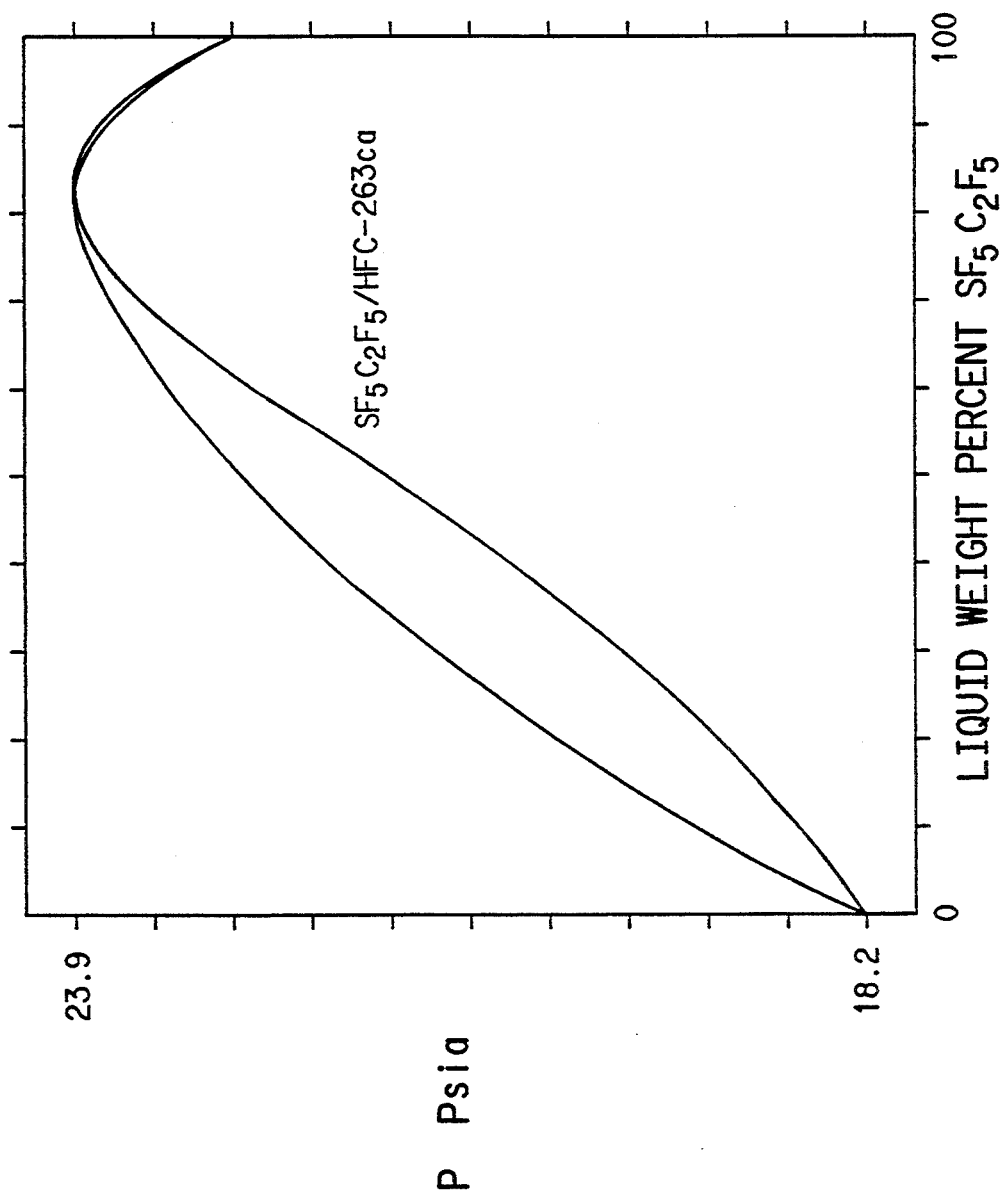
FIG. 22 is a graph of the vapor/liquid equilibrium curve for mixtures of SF$_5$C$_2$F$_5$ and HFC-263ca at 25° C.
Figure 23:
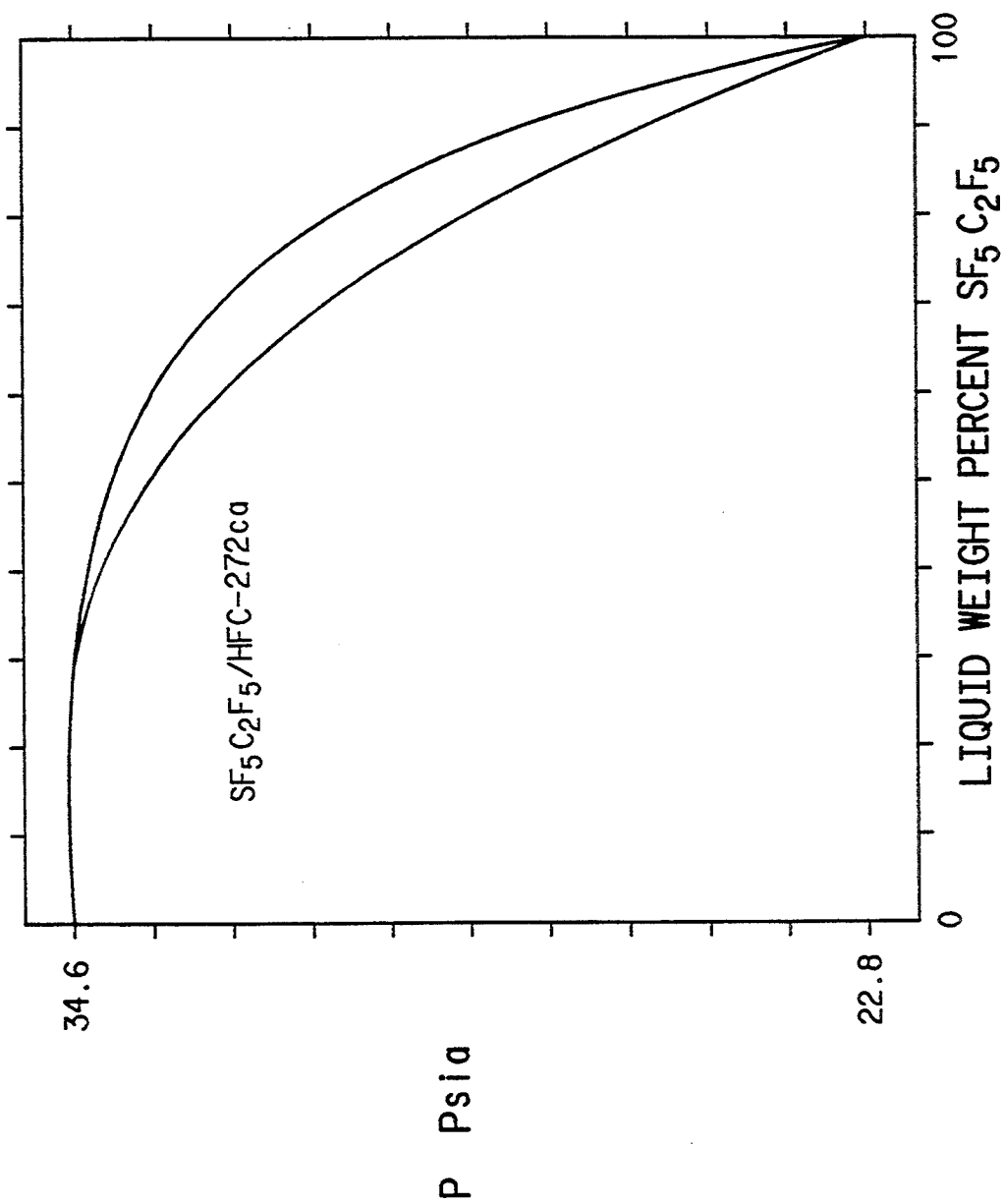
FIG. 23 is a graph of the vapor/liquid equilibrium curve for mixtures of SF$_5$C$_2$F$_5$ and HFC-272ca at 25° C.
Figure 24:
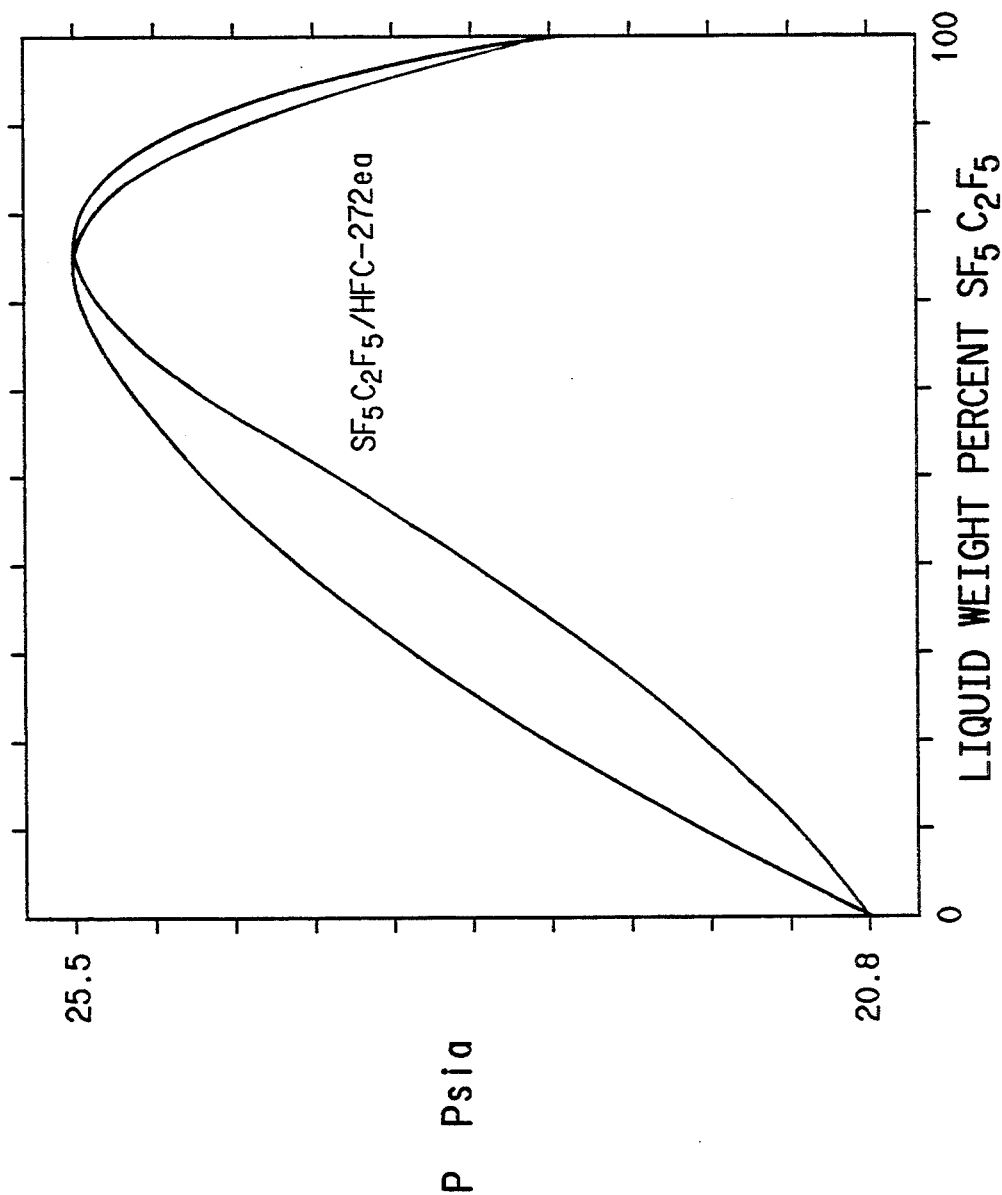
FIG. 24 is a graph of the vapor/liquid equilibrium curve for mixtures of SF$_5$C$_2$F$_5$ and HFC-272ea at 25° C.
Figure 25:
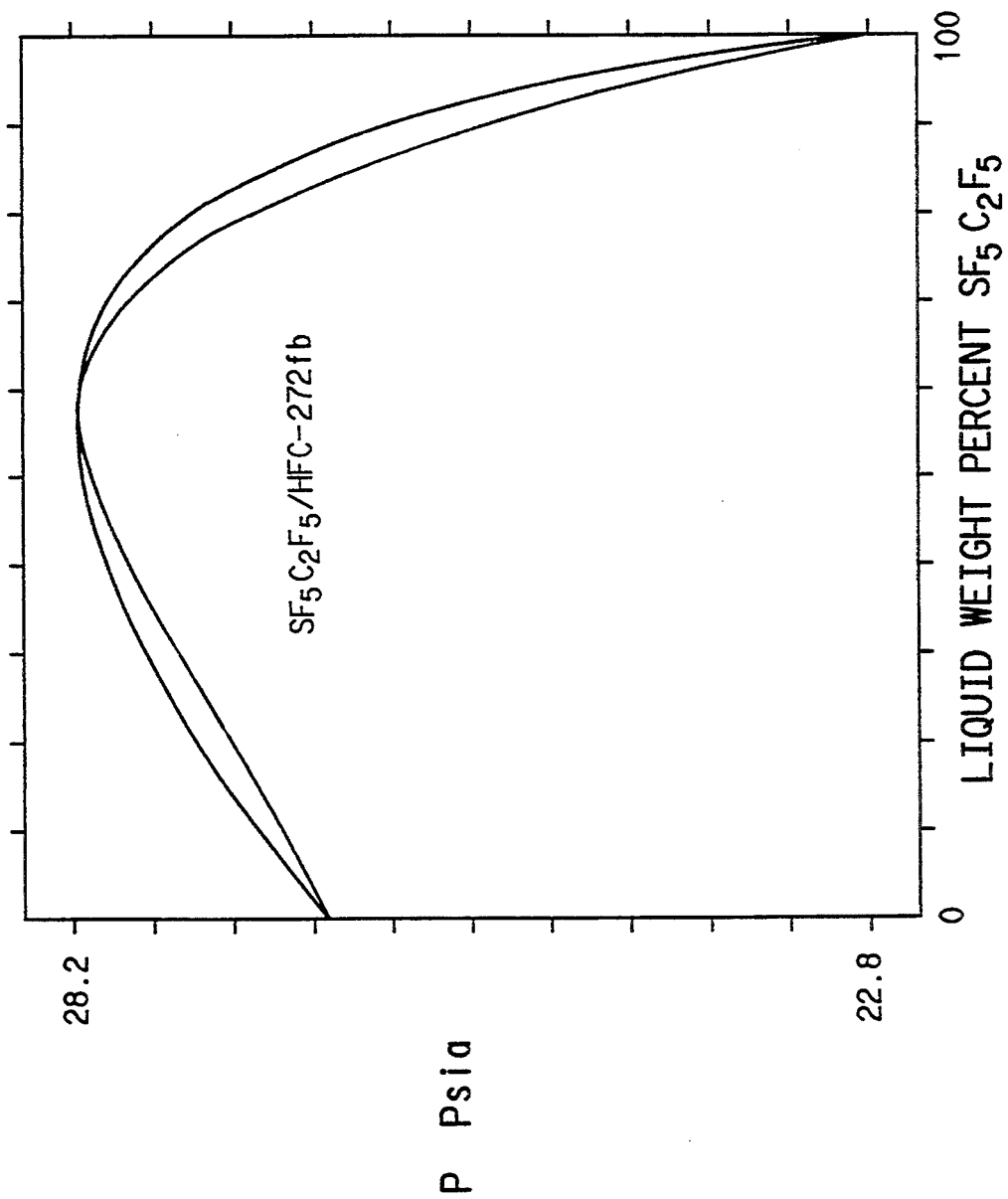
FIG. 25 is a graph of the vapor/liquid equilibrium curve for mixtures of SF$_5$C$_2$F$_5$ and HFC-272fb at 25° C.
Figure 26:
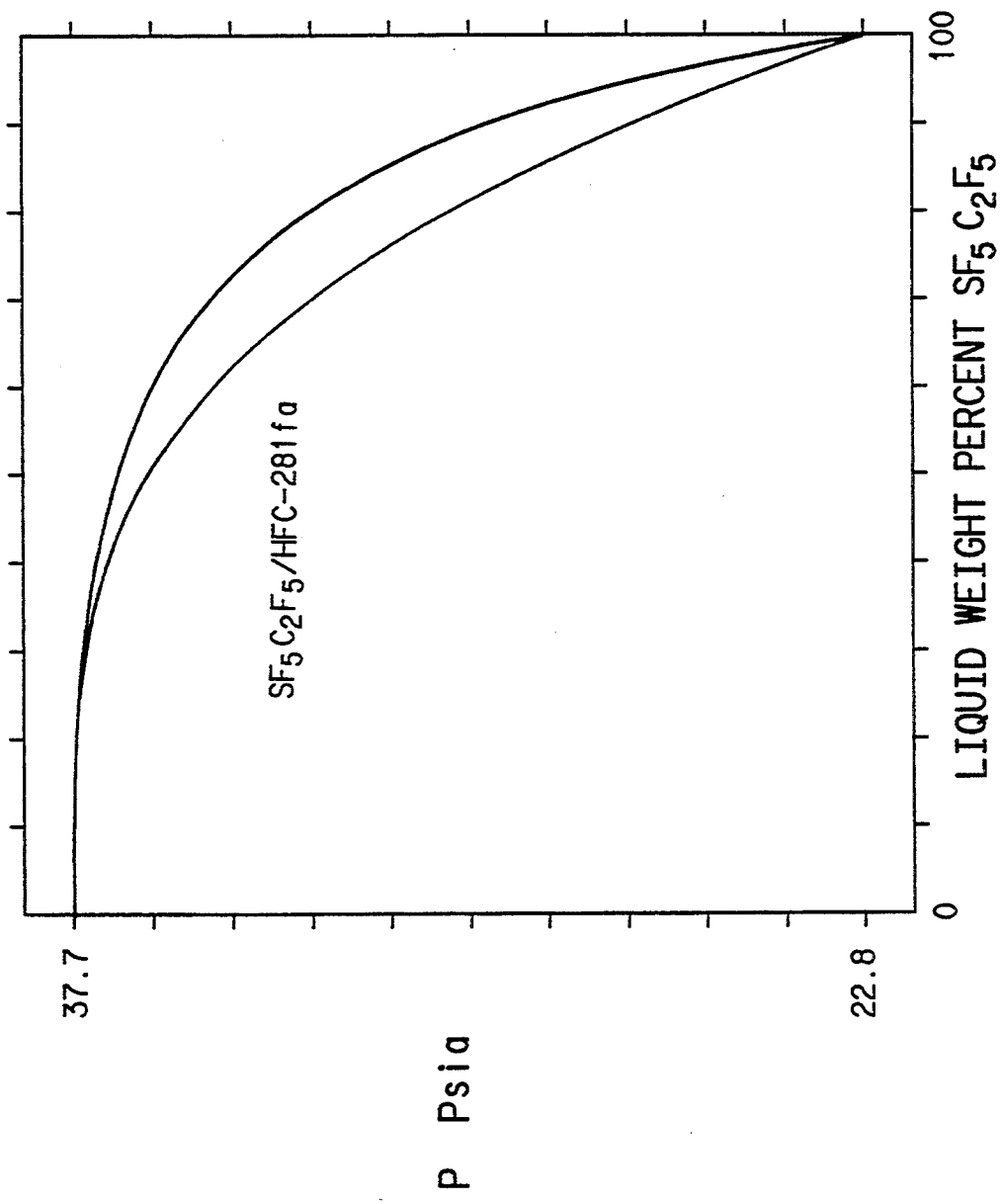
FIG. 26 is a graph of the vapor/liquid equilibrium curve for mixtures of SF$_5$C$_2$F$_5$ and HFC-281fa at 25° C.
Figure 27:
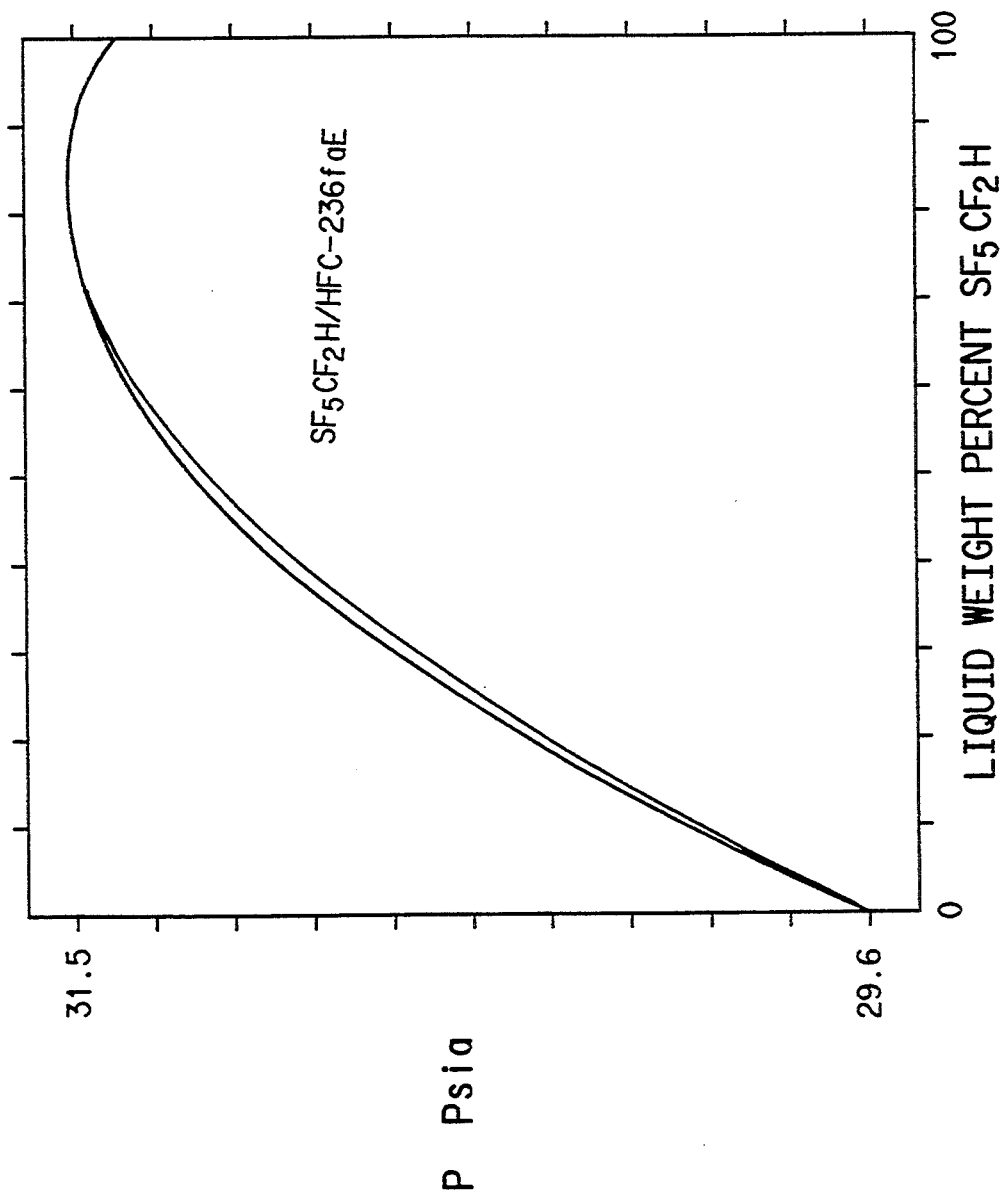
FIG. 27 is a graph of the vapor/liquid equilibrium curve for mixtures of SF$_5$CF$_2$H and 236faE at 25° C.
Figure 28:
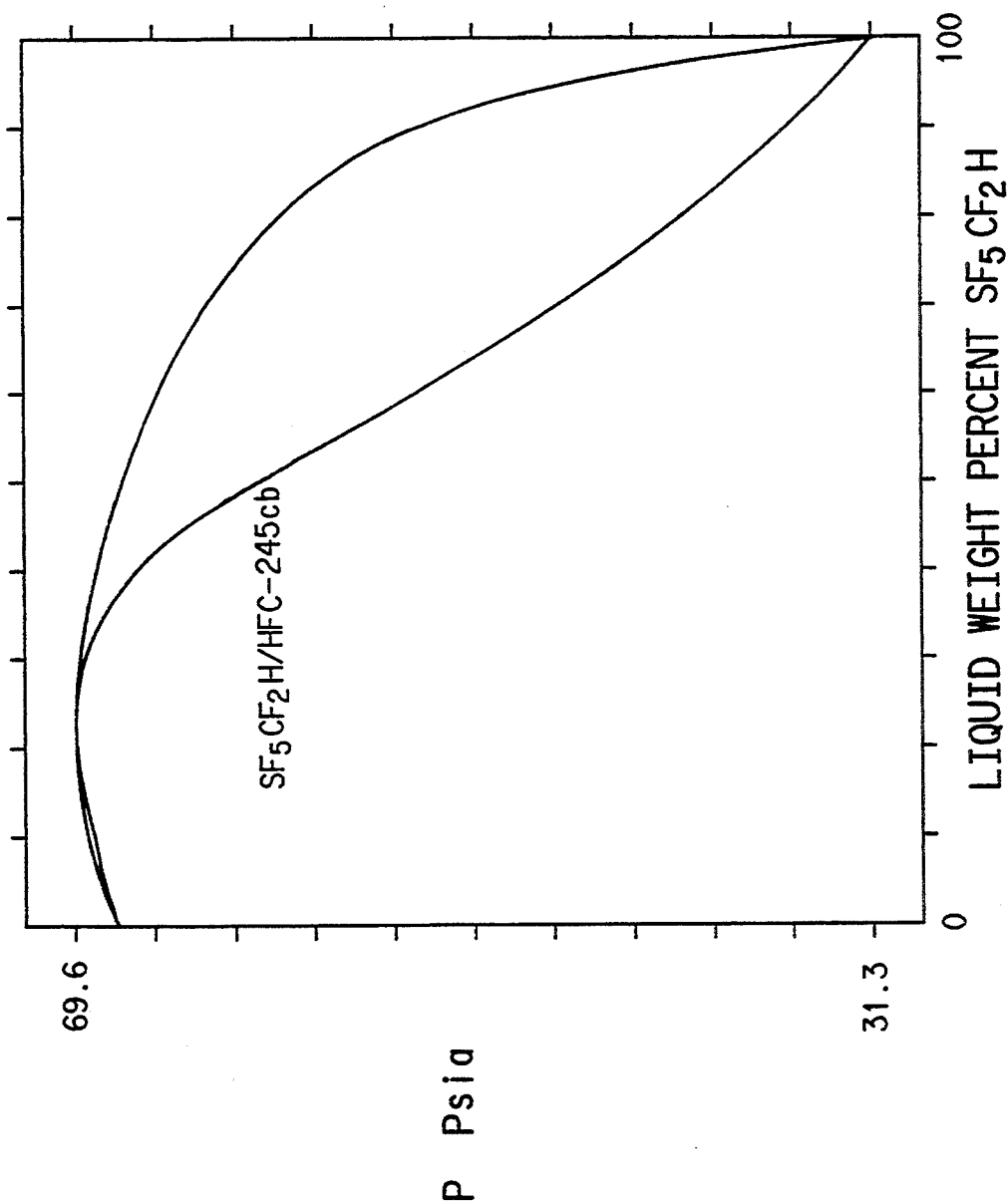
FIG. 28 is a graph of the vapor/liquid equilibrium curve for mixtures of SF$_5$CF$_2$H and HFC-245cb at 25° C.
Figure 29:
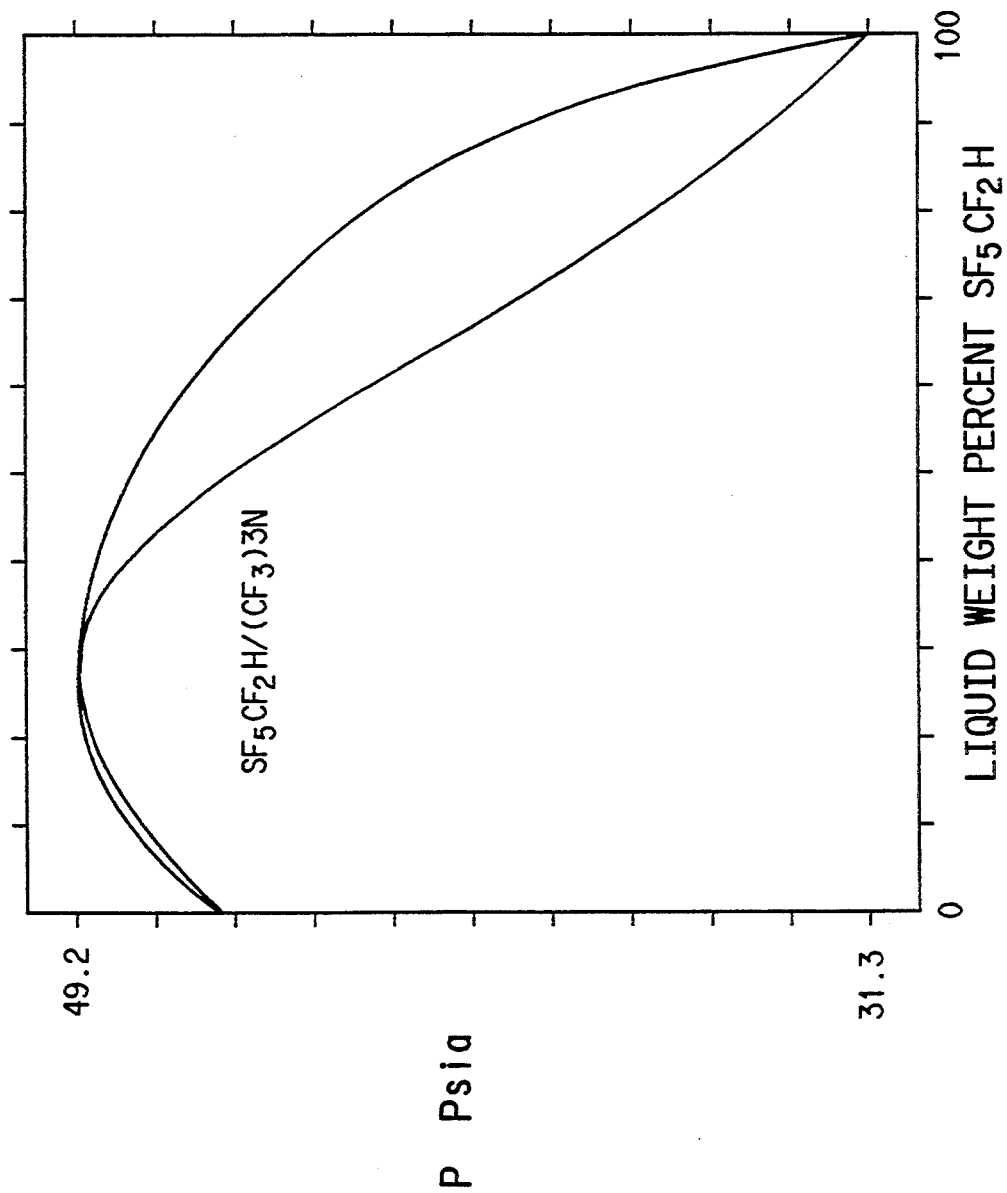
FIG. 29 is a graph of the vapor/liquid equilibrium curve for mixtures of SF$_5$CF$_2$H and (CF$_3$)$_3$N at 25° C.

The present invention relates to compositions of at least one component selected from the following Table 1 and at least one component from the following Table 2.

TABLE 1

1. bis(trifluoromethyl)sulfide (116S or CF$_3$SCF$_3$, boiling point = −20.0° C.)
2. difluoromethyl(trifluoromethyl)sulfide (125S or CHF$_2$SCF$_3$, boiling point = 1.0° C.)
3. pentafluoroethyl sulfur pentafluoride (SF$_5$C$_2$F$_5$, boiling point = 13.5° C.)
4. difluoromethyl sulfur pentafluoride (SF$_5$CF$_2$H, boiling point = 5.1° C.)
5. trifluoromethylsulfur pentafluoride (SF$_5$CF$_3$, boiling point = −20.4° C.)
6. bis(pentafluoroethyl)sulfide (3110Sbg or C$_2$F$_5$SC$_2$F$_5$, boiling point = 37.0° C.)

TABLE 2

1. difluoromethane (HFC-32 or CH$_2$F$_2$, boiling point = −51.7° C.)
2. 1,1,2,2-tetrafluoroethane (HFC-134 or CHF$_2$CHF$_2$, boiling point = −19.7° C.)
3. 1,1,1,2-tetrafluoroethane (HFC-134a or CF$_3$CH$_2$F, boiling point = −26.5° C.)
4. bis(difluoromethyl)ether (134E or CHF$_2$OCHF$_2$, boiling point = 6.2° C.)
5. fluoromethyl trifluoromethyl ether (134aE or CH$_2$FOCF$_3$, boiling point = −20.0° C.)
6. 1,1,2-trifluoroethane (HFC-143 or CHF$_2$CH$_2$F, boiling point = 5.0° C.)
7. trifluoromethyl methyl ether (143aE or CH$_3$OCF$_3$, boiling point = −24.2° C.)
8. 1,1-difluoroethane (HFC-152a or CHF$_2$CH$_3$, boiling point = −24.7° C.)
9. fluoroethane (HFC-161 or CH$_2$FCH$_3$, boiling point = −37.1° C.)
10. 1-trifluoromethoxy-2,2,2-trifluoroethane (236faE or CF$_3$OCH$_2$CF$_3$, boiling point = 5.6° C.)
11. 1,1,1,2,2-pentafluoropropane (HFC-245cb or CF$_3$CF$_2$CH$_3$, boiling point = −17.7° C.)
12. 1,1,1,3,3-pentafluoropropane (HFC-245fa or CF$_3$CH$_2$CHF$_2$, boiling point = 14.0° C.)
13. 1,1,2,2-tetrafluoropropane (HFC-254cb or CHF$_2$CF$_2$CH$_3$, boiling point = 0.5° C.)
14. 1,1,1,2-tetrafluoropropane (HFC-254eb or CF$_3$CHFCH$_3$, boiling point = 0.0° C.)
15. 1,2,2-trifluoropropane (HFC-263ca or CH$_3$CF$_2$CH$_2$F, boiling point = 18.7° C.)
16. 2,2-difluoropropane (HFC-272ca or CH$_3$CF$_2$CH$_3$, boiling point = −0.4° C.)
17. 1,2-difluoropropane (HFC-272ea or CH$_2$FCHFCH$_3$, boiling point = 15.0° C.)
18. 1,1-difluoropropane (HFC-272fb or CH$_3$CH$_2$CHF$_2$, boiling point = 8.0° C.)
19. 2-fluoropropane (HFC-281ea or CH$_3$CHFCH$_3$, boiling point = −9.4° C.)

20. 1-fluoropropane (HFC-281fa or CH$_2$FCH$_2$CH$_3$, boiling point= —2.5° C.)
21. ammonia (NH$_3$)
22. cyclopropane (C$_3$H$_6$(cyclic), boiling point= —32.8° C.),
23. dimethyl ether (DME, CH$_3$OCH$_3$, boiling point= —24.8° C.)
24. tris(trifluoromethyl)amine ((CF$_3$)$_3$N, boiling point= —6.5° C.)
25. 1,1,2,2,3-pentafluoropropane (HFC-245ca, boiling point=26.0° C.)

116S (CAS Reg. No. 371-78-8) has been prepared by the thermal decomposition of CF$_3$C(O)OSCF$_3$ as described by Haas and Oh in Chem. Ber., Vol. 102, pages 77–82 (1969).

125S (CAS Reg. No. 371-72-2) has been prepared by the photolysis of CF$_2$HC(O)OSCF$_3$ as described by Yu et. al. in Inorg. Chem., Vol. 13, pages 484–486 (1974).

SF$_5$C$_2$F$_5$ (CAS Reg. No. 354-67-6) has been prepared by electrochemical fluorination of ethyl sulfide in anhydrous hydrogen fluoride as reported by Dresdner in J. Am. Chem. Soc., Vol. 79, pages 69–70 (1957).

SF$_5$CF$_2$H (CAS Reg. No. 420-67-7) has been prepared by reaction of methyl mercaptan with fluorine gas as disclosed by Silvey and Cady in U.S. Pat. No. 2,697,726 and J. Am. Chem. Soc., Vol. 72, pages 3624–26 (1950).

SF$_5$CF$_3$ (CAS Reg. No. 373-80-8) has been prepared by the reaction of methyl mercaptan with either cobalt trifluoride or fluorine gas as disclosed by Silvey and Cady in U.S. Pat. No. 2,697,726 and J. Am. Chem. Soc., Vol. 79, pages 3624–3626 (1950).

134E (CAS Reg. No. 1691-17-4) can be prepared by reaction of antimony trifluoride with CHF$_2$OCHCl$_2$ as disclosed by O'Neill in GB 2,248,617.

134aE (CAS Reg. No. 2261-01-0) has been made by the electrochemical fluorination of methyl 2-methoxypropionate as reported by Berenblit, et. al. Zh. Org. Khim., Vol. 12, pp. 767–770 (1976).

143aE (CAS Reg. No. 421-14-7) has been made by the reaction of methyl fluoroformate with sulfur tetrafluoride as reported by Aldrich and Sheppard, J. Am. Chem. Soc., Vol. 29, 11–15 (1964).

(CF$_3$)$_3$N (CAS Reg. No. 432-03-1) has been made by electrochemical fluorination of trimethyl amine in anhydrous hydrogen fluoride as disclosed by Kauck and Simons in U.S. Pat. No. 2,616,927.

C$_2$F$_5$SC$_2$F$_5$ has been prepared by reaction of perfluoroethyl iodide with elemental sulfur at 300° C. under pressure as disclosed by Tiers, Journal of Organic Chemistry, Vol. 26, page 3515 (1961).

The present invention also relates to the discovery of azeotropic or azeotrope-like compositions of effective amounts of 116S and HFC-32, HFC-134, HFC-134a, HFC-143, HFC-152a, HFC-161, DME, NH$_3$, 134aE, 143aE, HFC-245cb, HFC-281ea, or cyclopropane; 125S and HFC-32, 134E, HFC-143, NH$_3$, HFC-254cb, HFC-254eb, HFC-272ca or HFC-281fa; SF$_5$C$_2$F$_5$ and HFC-32, HFC-245fa, HFC-263ca, HFC-272ca, HFC-272ea, HFC-272fb, HFC-281fa or NH$_3$; SF$_5$CF$_2$H and 236faE, HFC-245cb, NH$_3$ or (CF$_3$)$_3$N; SF$_5$CF$_3$ and HFC-32, HFC-134a, HFC-152a, 134aE, HFC-161, DME, cyclopropane, 143aE, HFC-245cb, HFC-143 or NH$_3$; 3110Sbg and HFC-245ca to form an azeotropic or azeotrope-like composition.

By "azeotropic" composition is meant a constant boiling liquid admixture of two or more substances that behaves as a single substance. One way to characterize an azeotropic composition is that the vapor produced by partial evaporation or distillation of the liquid has the same composition as the liquid from which it was evaporated or distilled, that is, the admixture distills/refluxes without compositional change. Constant boiling compositions are characterized as azeotropic because they exhibit either a maximum or minimum boiling point, as compared with that of the non-azeotropic mixtures of the same components.

By "azeotrope-like" composition is meant a constant boiling, or substantially constant boiling, liquid admixture of two or more substances that behaves as a single substance. One way to characterize an azeotrope-like composition is that the vapor produced by partial evaporation or distillation of the liquid has substantially the same composition as the liquid from which it was evaporated or distilled, that is, the admixture distills/refluxes without substantial composition change.

It is recognized in the art that a composition is azeotropic or azeotrope-like if, after 50 weight percent of the composition is removed such as by evaporation or boiling off, the difference in vapor pressure between the original composition and the composition remaining after 50 weight percent of the original composition has been removed is less than 10 percent, when measured in absolute units. By absolute units, it is meant measurements of pressure and, for example, psia, atmospheres, bars, torr, dynes per square centimeter, millimeters of mercury, inches of water and other equivalent terms well known in the art.

Therefore, included in this invention are compositions of effective amounts of sulfur component, wherein the sulfur component is 116S, 125S, SF$_5$C$_2$F$_5$, SF$_5$CF$_2$H, SF$_5$CF$_3$ or 3110Sbg and a second component, wherein the second component is HFC-32, HFC-134, HFC-134a, HFC-143, HFC-152a, HFC-161, DME, NH$_3$, 134aE, 143aE, HFC-245cb, HFC-281ea, cyclopropane, 134E, HFC-254eb, HFC-272ca or HFC-281fa such that after 50 weight percent of an original composition is evaporated or boiled off to produce a remaining composition, the difference in the vapor pressure between the original composition and the remaining composition is 10 percent or less.

For compositions that are azeotropic, there is usually some range of compositions around the azeotrope point that, for a maximum boiling azeotrope, have boiling points at a particular pressure higher than the pure components of the composition at that pressure and have vapor pressures at a particular temperature lower than the pure components of the composition at that temperature, and that, for a minimum boiling azeotrope, have boiling points at a particular pressure lower than the pure components of the composition at that pressure and have vapor pressures at a particular temperature higher than the pure components of the composition at that temperature. Boiling temperatures and vapor pressures above or below that of the pure components are caused by unexpected intermolecular forces between and among the molecules of the compositions, which can be a combination of repulsive and attractive forces such as van der Waals forces and hydrogen bonding.

The components of the compositions of this invention have the following vapor pressures at 25° C.

| COMPONENTS | PSIA | KPA |
| --- | --- | --- |
| CF$_3$SCF$_3$ | 71.5 | 493 |

| COMPONENTS | PSIA | KPA |
|---|---|---|
| CF$_2$HSCF$_3$ | 34.5 | 238 |
| SF$_5$C$_2$F$_5$ | 22.8 | 157 |
| SF$_5$CF$_2$H | 31.3 | 216 |
| SF$_5$CF$_3$ | 74.7 | 515 |
| 3110Sbg | 9.5 | 66 |
| HFC-32 | 246.7 | 1701 |
| HFC-134 | 76.1 | 525 |
| HFC-134a | 98.3 | 677 |
| 134E | 30.4 | 210 |
| 134aE | 73.8 | 509 |
| HFC-143 | 33.1 | 228 |
| 143aE | 83.8 | 578 |
| HFC-152a | 85.8 | 591 |
| HFC-161 | 130.2 | 898 |
| 236faE | 29.6 | 204 |
| HFC-245cb | 67.4 | 465 |
| HFC-245fa | 21.6 | 149 |
| HFC-254cb | 34.2 | 236 |
| HFC-254eb | 34.8 | 240 |
| HFC-263ca | 18.2 | 126 |
| HFC-272ca | 34.5 | 238 |
| HFC-272ea | 20.8 | 143 |
| HFC-272fb | 26.5 | 182 |
| HFC-281ea | 47.1 | 325 |
| HFC-281fa | 37.7 | 260 |
| Ammonia | 142.6 | 983 |
| Cyclopropane | 105.0 | 724 |
| DME | 85.7 | 591 |
| (CF$_3$)$_3$N | 45.8 | 316 |
| HFC-245ca | 14.2 | 98 |

Substantially constant boiling, azeotropic or azeotrope-like compositions of this invention comprise the following (except where indicated, all compositions are measured at 25° C.):

| Component | Azeotrope-Like Range | Preferred Range |
|---|---|---|
| 116S/HFC-32 | 19–70/30–81 | 30–70/30–70 |
| 116S/HFC-134 | 1–99/1–99 | 30–99/1–70 |
| 116S/HFC-134a | 1–99/1–99 | 30–99/1–70 |
| 116S/HFC-143 | 51–99/1–49 | 41–99/1–49 |
| 116S/HFC-152a | 1–99/1–99 | 40–99/1–60 |
| 116S/HFC-161 | 1–79/21–99 | 50–79/21–50 |
| 116S/DME | 1–99/1–99 | 50–99/1–50 |
| 116S/NH$_3$ | 67–94/6–33 | 67–94/6–33 |
| 116S/134aE | 1–99/1–99 | 30–99/1–70 |
| 116S/143aE | 1–99/1–99 | 30–99/1–70 |
| 116S/HFC-245cb | 1–99/1–99 | 10–99/1–90 |
| 116S/HFC-281ea | 1–99/1–99 | 50–99/1–50 |
| 116S/cyclopropane | 1–99/1–99 | 50–99/1–50 |
| 125S/HFC-32 | 1–53/47–99 | 1–53/47–99 |
| 125S/134E | 1–99/1–99 | 30–99/1–70 |
| 125S/HFC-143 | 30–99/1–70 | 40–99/1–60 |
| 125S/NH$_3$ | 48–91/9–52 | 48–91/9–52 |
| 125S/HFC-254cb | 1–99/1–99 | 30–99/1–70 |
| 125S/HFC-254eb | 1–99/1–99 | 30–99/1–70 |
| 125S/HFC-272ca | 1–99/1–99 | 40–99/1–60 |
| 125S/HFC-281fa | 1–99/1–99 | 50–99/1–50 |
| SF$_5$C$_2$F$_5$/HFC-32 | 1–64/36–99 | 10–64/36–90 |
| SF$_5$C$_2$F$_5$/HFC-245fa | 1–99/1–99 | 40–99/1–60 |
| SF$_5$C$_2$F$_5$/HFC-263ca | 1–99/1–99 | 40–99/1–60 |
| SF$_5$C$_2$F$_5$/HFC-272ca | 1–99/1–99 | 40–99/1–60 |
| SF$_5$C$_2$F$_5$/HFC-272ea | 1–99/1–99 | 40–99/1–60 |
| SF$_5$C$_2$F$_5$/HFC-272fb | 1–99/1–99 | 40–99/1–60 |
| SF$_5$C$_2$F$_5$/HFC-281fa | 1–99/1–99 | 50–99/1–50 |
| SF$_5$C$_2$F$_5$/NH$_3$ | 50–94/6–50 | 50–94/6–50 |
| SF$_5$CF$_2$H/NH$_3$ | 48–91/9–52 | 48–91/9–52 |
| SF$_5$CF$_2$H/236faE | 1–99/1–99 | 40–99/1–60 |
| SF$_5$CF$_2$H/HFC-245cb | 1–66/34–99 | 10–66/34–90 |
| SF$_5$CF$_2$H/(CF$_3$)$_3$N | 1–71/29–99 | 10–71/29–90 |
| SF$_5$CF$_3$/HFC-32 | 1–72/28–99 | 20–72/28–80 |
| SF$_5$CF$_3$/HFC-134a | 1–99/1–99 | 20–80/20–80 |
| SF$_5$CF$_3$/HFC-152a | 1–99/1–99 | 40–99/1–60 |
| SF$_5$CF$_3$/134aE | 1–99/1–99 | 20–90/10–80 |
| SF$_5$CF$_3$/HFC-161 | 1–82/18–99 | 40–82/18–60 |
| SF$_5$CF$_3$/DME | 35–99/1–65 | 50–99/1–50 |
| SF$_5$CF$_3$/cyclopropane | 1–99/1–99 | 50–99/1–50 |
| SF$_5$CF$_3$/143aE | 1–99/1–99 | 30–99/1–70 |
| SF$_5$CF$_3$/HFC-245cb | 1–99/1–99 | 50–99/1–50 |
| SF$_5$CF$_3$/HFC-143 | 55–99/1–45 | 55–99/1–45 |
| SF$_5$CF$_3$/NH$_3$ | 71–95/5–29 | 71–95/5–29 |
| 3110Sbg/HFC-245ca | 1–77/23–99 | 20–77/23–80 |

For purposes of this invention, "effective amount" is defined as the amount of each component of the inventive compositions which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points.

Therefore, effective amount includes the amounts, such as may be expressed in weight percentages, of each component of the compositions of the instant invention which form azeotropic or azeotrope-like compositions at temperatures or pressures other than as described herein.

For the purposes of this discussion, azeotropic or constant-boiling is intended to mean also essentially azeotropic or essentially-constant boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which will not only exhibit essentially equivalent properties for refrigeration and other applications, but which will also exhibit essentially equivalent properties to the true azeotropic composition in terms of constant boiling characteristics or tendency not to segregate or fractionate on boiling.

It is possible to characterize, in effect, a constant boiling admixture which may appear under many guises, depending upon the conditions chosen, by any of several criteria:

The composition can be defined as an azeotrope of A, B, C (and D ... ) since the very term "azeotrope" is at once both definitive and limitative, and requires that effective amounts of A, B, C (and D .. . ) for this unique composition of matter which is a constant boiling composition.

It is well known by those skilled in the art, that, at different pressures, the composition of a given azeotrope will vary at least to some degree, and changes in pressure will also change, at least to some degree, the boiling point temperature. Thus, an azeotrope of A, B, C (and D ... ) represents a unique type of relationship but with a variable composition which depends on temperature and-/or pressure. Therefore, compositional ranges, rather than fixed compositions, are often used to define azeotropes.

The composition can be defined as a particular weight percent relationship or mole percent relationship of A, B, C (and D ... ), while recognizing that such specific values point out only one particular relationship and that in actuality, a series of such relationships, represented by A, B, C (and D ...) actually exist for a given azeotrope, varied by the influence of pressure.

An azeotrope of A, B, C (and D ...) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The azeotrope or azeotrope-like compositions of the present invention can be prepared by any convenient method including mixing or combining the desired amounts. A preferred method is to weigh the desired component amounts and thereafter combine them in an appropriate container.

Specific examples illustrating the invention are given below. Unless otherwise stated therein, all percentages are by weight. It is to be understood that these examples are merely illustrative and in no way are to be interpreted as limiting the scope of the invention.

EXAMPLE 1

Phase Study

A phase study on the following compositions, wherein the composition is varied and the vapor pressures is measured, at a constant temperature of 25° C., shows that the following compositions are azeotropic (all amounts of components are weight percent).

| Composition | Weight percents | Vapor pressure, psia (kPa) |
|---|---|---|
| 116S/HFC-32 | 36.7/63.3 | 284.6 (1962) |
| 116S/HFC-134 | 53.5/46.5 | 94.7 (653) |
| 116S/HFC-134a | 32.8/67.2 | 103.2 (712) |
| 116S/HFC-143 | 81.1/18.9 | 85.4 (589) |
| 116S/HFC-152a | 57.2/42.8 | 102.4 (706) |
| 116S/HFC-161 | 48.8/51.2 | 147.9 (1020) |
| 116S/DME | 66.0/34.0 | 104.8 (723) |
| 116S/NH$_3$ | 82.8/17.2 | 211.5 (1458) |
| 116S/134aE | 50.9/49.1 | 79.6 (549) |
| 116S/143aE | 41.5/58.5 | 88.7 (612) |
| 116S/HFC-245cb | 72.9/27.1 | 73.1 (504) |
| 116S/HFC-281ea | 97.5/2.5 | 71.6 (494) |
| 116S/cyclopropane | 41.6/58.4 | 107.5 (741) |
| 125S/HFC-32 | 8.0/92.0 | 248.3 (1712) |
| 125S/134E | 65.0/35.0 | 37.3 (257) |
| 125S/HFC-143 | 60.6/39.4 | 47.1 (325) |
| 125S/NH$_3$ | 66.6/33.4 | 174.4 (1202) |
| 125S/HFC-254cb | 69.0/31.0 | 34.6 (239) |
| 125S/HFC-254eb | 36.7/63.3 | 34.9 (241) |
| 125S/HFC-272ca | 61.6/38.4 | 36.1 (249) |
| 125S/HFC-281fa | 45.1/54.9 | 38.3 (264) |
| SF$_5$C$_2$F$_5$/HFC-32 | 15.0/85.0 | 252.1 (1738) |
| SF$_5$C$_2$F$_5$/HFC-245fa | 71.8/28.2 | 23.5 (162) |
| SF$_5$C$_2$F$_5$/HFC-263ca | 82.6/17.4 | 23.9 (165) |
| SF$_5$C$_2$F$_5$/HFC-272ca | 16.5/83.5 | 34.6 (239) |
| SF$_5$C$_2$F$_5$/HFC-272ea | 73.6/23.7 | 25.5 (176) |
| SF$_5$C$_2$F$_5$/HFC-272fb | 56.5/43.5 | 28.2 (194) |
| SF$_5$C$_2$F$_5$/HFC-281fa | 6.9/93.1 | 37.7 (260) |
| SF$_5$C$_2$F$_5$/NH$_3$ | 68.5/31.5 | 163.2 (1125) |
| SF$_5$CF$_2$H/236faE | 81.5/18.5 | 31.5 (217) |
| SF$_5$CF$_2$H/HFC-245cb | 23.1/76.9 | 69.6 (480) |
| SF$_5$CF$_2$H/(CF$_3$)$_3$N | 27.2/72.8 | 49.2 (339) |
| SF$_5$CF$_2$H/NH$_3$ | 66.8/33.2 | 170.0 (1172) |
| SF$_5$CF$_3$/HFC-32 | 34.0/66.0 | 260.3 (1795) |
| SF$_5$CF$_3$/HFC-134a | 42.8/57.2 | 107.1 (738) |
| SF$_5$CF$_3$/HFC-152a | 63.5/36.5 | 107.5 (741) |
| SF$_5$CF$_3$/134aE | 60.1/39.9 | 83.2 (574) |
| SF$_5$CF$_3$/HFC-161 | 55.9/44.1 | 153.6 (1059) |
| SF$_5$CF$_3$/DME | 71.5/28.5 | 110.1 (759) |
| SF$_5$CF$_3$/cyclopropane | 55.6/44.4 | 110.6 (763) |

-continued

| Composition | Weight percents | Vapor pressure, psia (kPa) |
|---|---|---|
| SF$_5$CF$_3$/143aE | 52.0/48.0 | 92.3 (636) |
| SF$_5$CF$_3$/HFC-245cb | 96.4/3.6 | 74.7 (515) |
| SF$_5$CF$_3$/HFC-143 | 83.6/16.4 | 90.3 (623) |
| SF$_5$CF$_3$/NH$_3$ | 85.4/14.6 | 215.0 (1482) |
| 3110Sbg/HFC-245ca | 48.8/51.2 | 17.3 (119) |

EXAMPLE 2

Impact of Vapor Leakage on Vapor Pressure at 25° C.

A vessel is charged with an initial composition at 25° C., and the vapor pressure of the composition is measured. The composition is allowed to leak from the vessel, while the temperature is held constant at 25° C., until 50 weight percent of the initial composition has been removed, at which time the vapor pressure of the composition remaining in the vessel is measured. The results are summarized below.

| Refrigerant Composition | 0 wt % evaporated psia (kPa) | 50 wt % evaporated psia (kPa) | % change in vapor pressure |
|---|---|---|---|
| 116S/HFC-32 | | | |
| 36.7/63.3 | 284.6 (1962) | 284.6 (1962) | 0.0 |
| 20.0/80.0 | 284.0 (1958) | 267.5 (1844) | 5.8 |
| 19.0/81.0 | 284.0 (1958) | 258.7 (1784) | 8.9 |
| 18.0/82.0 | 283.9 (1957) | 251.8 (1736) | 11.3 |
| 50.0/50.0 | 284.1 (1959) | 282.7 (1949) | 0.5 |
| 70.0/30.0 | 278.6 (1921) | 252.5 (1741) | 9.4 |
| 71.0/29.0 | 277.9 (1916) | 248.3 (1712) | 10.7 |
| 116S/HFC-134 | | | |
| 53.5/46.5 | 94.7 (653) | 94.7 (653) | 0.0 |
| 30.0/70.0 | 92.4 (637) | 89.8 (619) | 2.8 |
| 20.0/80.0 | 89.6 (618) | 84.5 (583) | 5.7 |
| 15.0/85.0 | 87.5 (603) | 81.7 (563) | 6.6 |
| 10.0/90.0 | 84.7 (584) | 79.2 (546) | 6.5 |
| 1.0/99.0 | 77.2 (532) | 76.3 (526) | 1.2 |
| 70.0/30.0 | 93.2 (643) | 91.8 (633) | 1.5 |
| 90.0/10.0 | 83.6 (576) | 79.0 (545) | 5.5 |
| 99.0/1.0 | 73.1 (504) | 72.1 (497) | 1.4 |
| 116S/HFC-134a | | | |
| 32.8/67.2 | 103.2 (712) | 103.2 (712) | 0.0 |
| 15.0/85.0 | 101.9 (703) | 101.5 (700) | 0.4 |
| 1.0/99.0 | 98.6 (680) | 98.5 (679) | 0.1 |
| 50.0/50.0 | 102.1 (704) | 101.4 (699) | 0.7 |
| 70.0/30.0 | 96.9 (668) | 93.4 (644) | 3.6 |
| 80.0/20.0 | 91.8 (633) | 86.6 (597) | 5.7 |
| 90.0/10.0 | 83.3 (578) | 78.7 (543) | 6.1 |
| 99.0/1.0 | 73.0 (503) | 72.1 (497) | 1.2 |
| 116S/HFC-143 | | | |
| 81.1/18.9 | 85.4 (589) | 85.4 (589) | 0.0 |
| 90.0/10.0 | 84.3 (581) | 82.4 (568) | 2.3 |
| 99.1/1.0 | 74.3 (512) | 72.2 (498) | 2.8 |
| 60.0/40.0 | 84.0 (579) | 82.0 (565) | 2.4 |
| 50.0/50.0 | 82.3 (574) | 72.1 (497) | 13.3 |
| 52.0/48.0 | 83.3 (574) | 77.1 (532) | 7.4 |
| 51.0/49.0 | 82.3 (574) | 75.2 (518) | 9.6 |
| 116S/HFC-152a | | | |
| 57.2/42.8 | 102.4 (706) | 102.4 (706) | 0.0 |
| 80.0/20.0 | 98.3 (678) | 94.7 (653) | 3.7 |
| 90.0/10.0 | 90.6 (625) | 83.8 (578) | 7.5 |
| 92.0/8.0 | 88.0 (607) | 81.1 (559) | 7.8 |
| 99.0/1.0 | 74.3 (512) | 72.5 (500) | 2.4 |
| 30.0/70.0 | 99.4 (685) | 96.1 (663) | 3.3 |
| 20.0/80.0 | 96.6 (666) | 91.6 (632) | 5.2 |
| 15.0/85.0 | 94.7 (653) | 89.6 (618) | 5.4 |
| 10.0/90.0 | 92.4 (637) | 87.9 (606) | 4.9 |
| 1.0/99.0 | 86.6 (597) | 85.9 (592) | 0.8 |
| 116S/HFC-161 | | | |
| 48.8/51.2 | 147.9 (1020) | 147.9 (1020) | 0.0 |
| 70.0/30.0 | 145.0 (1000) | 140.2 (967) | 3.3 |
| 80.0/20.0 | 138.9 (958) | 124.4 (858) | 10.4 |
| 79.0/21.0 | 139.8 (964) | 126.6 (873) | 9.4 |

-continued

| Refrigerant Composition | 0 wt % evaporated psia (kPa) | 50 wt % evaporated psia (kPa) | % change in vapor pressure |
|---|---|---|---|
| 30.0/70.0 | 146.5 (1010) | 143.5 (989) | 2.0 |
| 20.0/80.0 | 144.1 (994) | 137.3 (947) | 4.7 |
| 10.0/90.0 | 139.4 (961) | 132.3 (912) | 5.1 |
| 1.0/99.0 | 131.4 (906) | 130.3 (898) | 0.8 |
| 116S/DME | | | |
| 66.0/34.0 | 104.8 (723) | 104.8 (723) | 0.0 |
| 80.0/20.0 | 103.0 (710) | 101.1 (696) | 1.8 |
| 90.0/10.0 | 96.4 (665) | 89.6 (618) | 7.1 |
| 99/1.0 | 75.8 (523) | 72.9 (503) | 3.8 |
| 40.0/60.0 | 102.0 (703) | 98.2 (677) | 3.7 |
| 35.0/65.0 | 101.0 (696) | 95.8 (661) | 5.1 |
| 25.0/75.0 | 98.2 (677) | 91.2 (629) | 7.1 |
| 15.0/85.0 | 94.4 (651) | 87.9 (606) | 6.9 |
| 1.0/99.0 | 86.4 (596) | 85.8 (592) | 0.7 |
| 116S/NH$_3$ | | | |
| 82.8/17.2 | 211.5 (1458) | 211.5 (1458) | 0.0 |
| 90.0/10.0 | 211.5 (1458) | 211.4 (1458) | 0.0 |
| 99.0/1.0 | 205.9 (1420) | 71.5 (493) | 65.3 |
| 95.0/5.0 | 211.3 (1457) | 161.0 (1110) | 23.8 |
| 93.0/7.0 | 211.4 (1458) | 210.2 (1449) | 0.6 |
| 94.0/6.0 | 211.4 (1458) | 207.0 (1427) | 2.1 |
| 70.0/30.0 | 211.5 (1458) | 211.5 (1458) | 0.0 |
| 69.0/31.0 | 211.5 (1458) | 211.5 (1458) | 0.0 |
| 68.0/32.0 | 211.5 (1458) | 211.5 (1458) | 0.0 |
| 67.0/33.0 | 211.5 (1458) | 211.5 (1458) | 0.0 |
| 116S/134aE | | | |
| 50.9/49.1 | 79.6 (549) | 79.6 (549) | 0.0 |
| 70.0/30.0 | 78.7 (543) | 78.4 (541) | 0.4 |
| 90.0/10.0 | 75.0 (517) | 74.4 (513) | 0.8 |
| 99.0/1.0 | 71.9 (496) | 71.8 (495) | 0.1 |
| 30.0/70.0 | 78.7 (543) | 78.4 (541) | 0.4 |
| 10.0/90.0 | 75.9 (523) | 75.6 (521) | 0.4 |
| 1.0/99.0 | 74.1 (511) | 74.0 (510) | 0.1 |
| 116S/143aE | | | |
| 41.5/58.5 | 88.6 (612) | 88.7 (612) | 0.0 |
| 60.0/40.0 | 87.6 (604) | 87.2 (601) | 0.5 |
| 80.0/20.0 | 83.1 (573) | 81.4 (561) | 2.0 |
| 99.0/1.0 | 72.3 (498) | 72.0 (496) | 0.4 |
| 20.0/80.0 | 87.4 (603) | 87.1 (601) | 0.3 |
| 10.0/90.0 | 86.0 (593) | 85.6 (590) | 0.5 |
| 1.0/99.0 | 84.1 (580) | 84.0 (579) | 0.1 |
| 116S/HFC-245cb | | | |
| 72.9/27.1 | 73.1 (504) | 73.1 (504) | 0.0 |
| 90.0/10.0 | 72.5 (500) | 72.5 (500) | 0.0 |
| 99.1/1.0 | 71.6 (494) | 71.6 (494) | 0.0 |
| 50.0/50.0 | 72.3 (498) | 72.2 (498) | 0.1 |
| 30.0/70.0 | 70.8 (488) | 70.6 (487) | 0.3 |
| 10.0/90.0 | 68.7 (474) | 68.5 (472) | 0.3 |
| 1.0/99.0 | 67.5 (465) | 67.5 (465) | 0.0 |
| 116S/HFC-281ea | | | |
| 97.5/2.5 | 71.6 (494) | 71.6 (494) | 0.0 |
| 70.0/30.0 | 66.9 (461) | 65.2 (450) | 2.5 |
| 50.0/50.0 | 61.9 (427) | 58.1 (401) | 6.1 |
| 40.0/60.0 | 59.3 (409) | 54.7 (377) | 7.8 |
| 30.0/70.0 | 56.6 (390) | 51.9 (358) | 8.3 |
| 20.0/80.0 | 53.6 (370) | 49.7 (343) | 7.3 |
| 10.0/90.0 | 50.5 (348) | 48.2 (332) | 4.6 |
| 1.0/99.0 | 47.5 (328) | 47.2 (325) | 0.6 |
| 99.0/1.0 | 71.6 (494) | 71.6 (494) | 0.0 |
| 116S/cyclopropane | | | |
| 41.6/58.4 | 107.5 (741) | 107.5 (741) | 0.0 |
| 60.0/40.0 | 106.6 (735) | 106.1 (732) | 0.5 |
| 80.0/20.0 | 101.0 (696) | 99.8 (674) | 1.2 |
| 90.0/10.0 | 92.7 (639) | 87.1 (601) | 6.0 |
| 99.0/1.0 | 74.7 (515) | 73.0 (503) | 2.3 |
| 20.0/80.0 | 106.7 (736) | 106.6 (735) | 0.1 |
| 1.0/99.0 | 105.1 (725) | 105.1 (725) | 0.0 |
| 125S/HFC-32 | | | |
| 8.0/92.0 | 248.3 (1712) | 248.3 (1712) | 0.0 |
| 1.0/99.0 | 247.2 (1704) | 247.0 (1703) | 0.1 |
| 30.0/70.0 | 244.9 (1689) | 241.4 (1664) | 1.4 |
| 40.0/60.0 | 242.1 (1669) | 233.9 (1613) | 3.4 |
| 50.0/50.0 | 237.8 (1640) | 219.8 (1515) | 7.6 |
| 55.0/45.0 | 234.8 (1619) | 208.6 (1438) | 11.2 |
| 53.0/47.0 | 236.1 (1628) | 213.5 (1472) | 9.6 |
| 125S/134E | | | |
| 65.0/35.0 | 37.3 (257) | 37.3 (257) | 0.0 |
| 85.0/15.0 | 36.5 (252) | 36.3 (250) | 0.0 |
| 99.1/1.0 | 34.7 (239) | 34.6 (239) | 0.3 |
| 40.0/60.0 | 36.4 (251) | 36.0 (248) | 1.1 |
| 20.0/80.0 | 34.3 (236) | 33.3 (230) | 2.9 |
| 1.0/99.0 | 30.7 (212) | 30.5 (210) | 0.7 |
| 125/HFC-143 | | | |
| 60.6/39.4 | 47.1 (325) | 47.1 (325) | 0.0 |
| 70.0/30.0 | 46.9 (323) | 46.5 (321) | 0.9 |
| 90.0/10.0 | 42.5 (293) | 39.1 (270) | 8.0 |
| 92.0/8.0 | 41.4 (285) | 38.0 (262) | 8.2 |
| 99.0/1.0 | 35.7 (246) | 34.8 (240) | 2.5 |
| 40.0/60.0 | 46.3 (319) | 44.8 (309) | 3.2 |
| 30.0/70.0 | 45.3 (312) | 41.0 (283) | 9.5 |
| 28.0/72.0 | 45.0 (310) | 39.9 (275) | 11.3 |
| 29.0/71.0 | 45.1 (311) | 40.5 (279) | 10.2 |
| 125/NH$_3$ | | | |
| 66.6/33.4 | 174.4 (1202) | 174.4 (1202) | 0.0 |
| 80.0/20.0 | 174.4 (1202) | 174.3 (1202) | 0.1 |
| 90.0/10.0 | 174.1 (1200) | 168.4 (1161) | 3.3 |
| 91.0/9.0 | 174.0 (1200) | 162.2 (1118) | 6.8 |
| 92.0/8.0 | 173.9 (1199) | 141.6 (976) | 18.6 |
| 50.0/50.0 | 174.4 (1202) | 174.4 (1202) | 0.0 |
| 49.0/51.0 | 174.4 (1202) | 174.4 (1202) | 0.0 |
| 48.0/52.0 | 174.4 (1202) | 174.4 (1202) | 0.0 |
| 125S/HFC-254cb | | | |
| 69.0/31.0 | 34.6 (239) | 34.6 (239) | 0.0 |
| 85.0/15.0 | 34.6 (239) | 34.6 (239) | 0.0 |
| 99.0/1.0 | 34.5 (238) | 34.5 (238) | 0.0 |
| 40.0/60.0 | 34.5 (238) | 34.5 (238) | 0.0 |
| 20.0/80.0 | 34.4 (237) | 34.4 (237) | 0.0 |
| 1.0/99.0 | 34.2 (236) | 34.2 (236) | 0.0 |
| 125S/HFC-254eb | | | |
| 36.7/63.3 | 34.9 (241) | 34.9 (241) | 0.0 |
| 60.0/40.0 | 34.8 (240) | 34.8 (240) | 0.0 |
| 80.0/20.0 | 34.7 (239) | 34.7 (239) | 0.0 |
| 99.0/1.0 | 34.5 (238) | 34.5 (238) | 0.0 |
| 20.0/80.0 | 34.8 (240) | 34.8 (240) | 0.0 |
| 1.0/99.0 | 34.8 (240) | 34.8 (240) | 0.0 |
| 125S/HFC-272ca | | | |
| 61.6/38.4 | 36.1 (249) | 36.1 (249) | 0.0 |
| 80.0/20.0 | 35.8 (247) | 35.8 (247) | 0.0 |
| 99.0/1.0 | 34.6 (239) | 34.6 (239) | 0.0 |
| 30.0/70.0 | 35.6 (245) | 35.6 (245) | 0.0 |
| 1.0/99.0 | 34.6 (239) | 34.6 (239) | 0.0 |
| 125S/HFC-281fa | | | |
| 45.1/54.9 | 38.3 (264) | 38.3 (264) | 0.0 |
| 70.0/30.0 | 37.9 (261) | 37.8 (261) | 0.3 |
| 99.0/1.0 | 34.7 (239) | 34.7 (239) | 0.0 |
| 20.0/80.0 | 38.1 (263) | 38.1 (263) | 0.0 |
| 1.0/99.0 | 37.7 (260) | 37.7 (260) | 0.0 |
| SF$_5$C$_2$F$_5$/HFC-32 | | | |
| 15.0/85.0 | 252.1 (1738) | 252.1 (1738) | 0.0 |
| 5.0/95.0 | 251.0 (1731) | 248.7 (1715) | 0.9 |
| 1.0/99.0 | 248.2 (1711) | 246.9 (1702) | 0.5 |
| 30.0/70.0 | 251.6 (1735) | 250.8 (1729) | 0.3 |
| 40.0/60.0 | 250.8 (1729) | 248.4 (1713) | 1.0 |
| 60.0/40.0 | 246.8 (1702) | 230.8 (1591) | 6.5 |
| 70.0/30.0 | 241.1 (1662) | 201.1 (1387) | 16.6 |
| 65.0/35.0 | 244.5 (1686) | 219.3 (1512) | 10.3 |
| 64.0/36.0 | 245.0 (1689) | 222.0 (1531) | 9.4 |
| SF$_5$C$_2$F$_5$/HFC-245fa | | | |
| 71.8/28.2 | 23.5 (162) | 23.5 (162) | 0.0 |
| 85.0/15.0 | 23.4 (161) | 23.3 (161) | 0.4 |
| 99.0/1.0 | 22.8 (157) | 22.8 (157) | 0.0 |
| 50.0/50.0 | 23.2 (160) | 23.2 (160) | 0.0 |
| 30.0/70.0 | 22.7 (157) | 22.6 (156) | 0.4 |
| 10.0/90.0 | 22.0 (152) | 22.0 (152) | 0.0 |
| 1.0/99.0 | 21.7 (150) | 21.6 (149) | 0.5 |
| SF$_5$C$_2$F$_5$/HFC-263ca | | | |
| 82.6/17.4 | 23.9 (165) | 23.9 (165) | 0.0 |
| 90.0/10.0 | 23.7 (163) | 23.7 (163) | 0.0 |
| 99.0/1.0 | 22.9 (158) | 22.9 (158) | 0.0 |
| 60.0/40.0 | 23.2 (160) | 22.9 (158) | 1.3 |
| 40.0/60.0 | 22.0 (152) | 21.1 (145) | 4.1 |
| 20.0/80.0 | 20.4 (141) | 19.4 (134) | 4.9 |

-continued

| Refrigerant Composition | 0 wt % evaporated psia (kPa) | 50 wt % evaporated psia (kPa) | % change in vapor pressure |
|---|---|---|---|
| 10.0/90.0 | 19.4 (134) | 18.7 (129) | 3.6 |
| 1.0/99.0 | 18.4 (127) | 18.3 (126) | 0.5 |
| SF$_5$C$_2$F$_5$/HFC-272ca | | | |
| 16.5/83.5 | 34.6 (239) | 34.6 (239) | 0.0 |
| 5.0/95.0 | 34.6 (239) | 34.6 (239) | 0.0 |
| 1.0/99.0 | 34.5 (238) | 34.5 (238) | 0.0 |
| 40.0/60.0 | 34.3 (236) | 34.3 (236) | 0.0 |
| 20.0/80.0 | 34.6 (239) | 34.6 (239) | 0.0 |
| 60.0/40.0 | 33.4 (230) | 32.9 (227) | 1.5 |
| 80.0/20.0 | 30.8 (212) | 29.5 (203) | 4.2 |
| 90.0/10.0 | 28.0 (193) | 26.4 (182) | 5.7 |
| 99.0/1.0 | 23.5 (162) | 23.1 (159) | 1.7 |
| SF$_5$C$_2$F$_5$/HFC-272ea | | | |
| 76.3/23.7 | 25.5 (176) | 25.5 (176) | 0.0 |
| 90.0/10.0 | 24.9 (172) | 24.7 (170) | 0.8 |
| 1.0/99.0 | 20.9 (144) | 20.8 (143) | 0.5 |
| 99.0/1.0 | 23.1 (159) | 23.1 (159) | 0.0 |
| 50.0/50.0 | 24.7 (170) | 24.2 (167) | 2.0 |
| 30.0/70.0 | 23.4 (161) | 22.5 (155) | 3.8 |
| 15.0/85.0 | 22.2 (153) | 21.5 (148) | 3.2 |
| SF$_5$C$_2$F$_5$/HFC-272fb | | | |
| 56.5/43.5 | 28.2 (194) | 282. (194) | 0.0 |
| 80.0/20.0 | 27.4 (189) | 27.1 (187) | 1.1 |
| 99.0/1.0 | 23.2 (160) | 23.1 (159) | 0.4 |
| 30.0/70.0 | 27.7 (191) | 27.6 (190) | 0.4 |
| 1.0/99.0 | 26.5 (183) | 26.5 (183) | 0.0 |
| SF$_5$C$_2$F$_5$/HFC-281fa | | | |
| 6.9/93.1 | 37.7 (260) | 37.7 (260) | 0.0 |
| 1.0/99.0 | 37.7 (260) | 37.7 (260) | 0.0 |
| 30.0/70.0 | 37.5 (259) | 37.5 (259) | 0.0 |
| 70.0/30.0 | 35.3 (243) | 34.3 (236) | 2.8 |
| 90.0/10.0 | 30.2 (208) | 27.9 (192) | 7.6 |
| 99.0/1.0 | 23.9 (165) | 23.3 (161) | 2.5 |
| SF$_5$C$_2$F$_5$/NH$_3$ | | | |
| 68.5/31.5 | 163.2 (1125) | 163.2 (1125) | 0.0 |
| 85.0/15.0 | 163.1 (1125) | 163.1 (1125) | 0.0 |
| 90.0/10.0 | 163.1 (1125) | 162.5 (1120) | 0.4 |
| 94.0/6.0 | 162.9 (1123) | 149.3 (1029) | 8.3 |
| 50.0/50.0 | 163.1 (1125) | 152.3 (1050) | 6.6 |
| 49.0/51.0 | 163.1 (1125) | 145.1 (1000) | 11.0 |
| SF$_5$CF$_2$H/236faE | | | |
| 81.5/18.5 | 31.5 (217) | 31.5 (217) | 0.0 |
| 90.0/10.0 | 31.4 (216) | 31.4 (216) | 0.0 |
| 99.0/1.0 | 31.3 (216) | 31.3 (216) | 0.0 |
| 60.0/40.0 | 31.3 (216) | 31.3 (216) | 0.0 |
| 40.0/60.0 | 30.9 (213) | 30.9 (213) | 0.0 |
| 20.0/80.0 | 30.4 (210) | 30.3 (209) | 0.3 |
| 1.0/99.0 | 29.7 (205) | 29.7 (205) | 0.0 |
| SF$_5$CF$_2$H/HFC-245cb | | | |
| 23.1/76.9 | 69.6 (480) | 69.6 (480) | 0.0 |
| 10.0/90.0 | 69.0 (476) | 68.8 (474) | 0.3 |
| 1.0/99.0 | 67.6 (466) | 67.6 (466) | 0.0 |
| 30.0/70.0 | 69.5 (479) | 69.4 (478) | 0.1 |
| 50.0/50.0 | 67.5 (465) | 65.8 (454) | 2.5 |
| 70.0/30.0 | 63.5 (438) | 54.9 (379) | 13.5 |
| 60.0/40.0 | 65.8 (454) | 62.1 (428) | 5.6 |
| 65.0/35.0 | 64.7 (446) | 59.2 (408) | 8.5 |
| 67.0/33.0 | 64.3 (443) | 57.7 (398) | 10.3 |
| 66.0/34.0 | 64.5 (445) | 58.5 (403) | 9.3 |
| SF$_5$CF$_2$H/(CF$_3$)$_3$N | | | |
| 27.2/72.8 | 49.2 (339) | 49.2 (339) | 0.0 |
| 10.0/90.0 | 48.0 (331) | 47.7 (329) | 0.6 |
| 1.0/99.0 | 46.1 (318) | 46.0 (317) | 0.2 |
| 50.0/50.0 | 47.9 (330) | 46.9 (323) | 2.1 |
| 70.0/30.0 | 45.0 (310) | 40.7 (281) | 9.6 |
| 71.0/29.0 | 44.7 (308) | 40.3 (278) | 9.8 |
| 72.0/28.0 | 44.5 (307) | 39.8 (274) | 10.6 |
| SF$_5$CF$_2$H/NH$_3$ | | | |
| 66.8/33.2 | 170.0 (1172) | 170.0 (1172) | 0.0 |
| 90.0/10.0 | 169.6 (1169) | 163.1 (1125) | 3.8 |
| 91.1/9.0 | 169.4 (1168) | 158.0 (1089) | 6.7 |
| 92.0/8.0 | 169.2 (1167) | 146.6 (1011) | 13.4 |
| 48.0/52.0 | 170.0 (1172) | 167.8 (1157) | 1.3 |
| SF$_5$CF$_3$/HFC-32 | | | |
| 34.0/66.0 | 260.3 (1795) | 260.3 (1795) | 0.0 |
| 20.0/80.0 | 258.8 (1784) | 256.9 (1771) | 0.7 |
| 1.0/99.0 | 247.8 (1709) | 247.0 (1703) | 0.3 |
| 60.0/40.0 | 256.1 (1766) | 249.2 (1718) | 2.7 |
| 72.0/28.0 | 249.0 (1717) | 224.5 (1548) | 9.8 |
| 73.0/27.0 | 248.1 (1711) | 220.9 (1523) | 11.0 |
| SF$_5$CF$_3$/HFC-134a | | | |
| 42.8/57.2 | 107.1 (738) | 107.1 (738) | 0.0 |
| 20.0/80.0 | 104.9 (723) | 103.9 (716) | 1.0 |
| 1.0/99.0 | 98.7 (681) | 98.5 (679) | 0.2 |
| 60.0/40.0 | 105.7 (729) | 104.7 (722) | 0.9 |
| 80.0/20.0 | 98.5 (679) | 93.4 (644) | 5.2 |
| 99.0/1.0 | 76.7 (529) | 75.5 (521) | 1.6 |
| SF$_5$CF$_3$/HFC-152a | | | |
| 63.5/36.5 | 107.5 (741) | 107.5 (741) | 0.0 |
| 80.0/20.0 | 105.0 (724) | 102.3 (705) | 2.6 |
| 99.0/1.0 | 78.4 (541) | 75.9 (523) | 3.2 |
| 40.0/60.0 | 105.1 (725) | 101.7 (701) | 3.2 |
| 20.0/80.0 | 99.3 (685) | 90.5 (624) | 8.9 |
| 18.0/82.0 | 98.4 (678) | 89.6 (618) | 8.9 |
| 15.0/85.0 | 96.9 (668) | 88.5 (610) | 8.7 |
| 1.0/99.0 | 86.8 (598) | 85.9 (592) | 1.0 |
| SF$_5$CF$_3$/134aE | | | |
| 60.1/39.9 | 83.2 (574) | 83.2 (574) | 0.0 |
| 80.0/20.0 | 81.7 (563) | 81.3 (561) | 0.5 |
| 99.0/1.0 | 75.3 (519) | 75.1 (518) | 0.3 |
| 40.0/60.0 | 82.1 (566) | 81.7 (563) | 0.5 |
| 20.0/80.0 | 79.1 (545) | 78.1 (538) | 1.3 |
| 1.0/99.0 | 74.1 (511) | 74.0 (510) | 0.1 |
| SF$_5$CF$_3$/HFC-161 | | | |
| 55.9/44.1 | 153.6 (1059) | 153.6 (1059) | 0.0 |
| 80.0/20.0 | 147.9 (1020) | 137.4 (947) | 7.1 |
| 82.0/18.0 | 146.3 (1009) | 132.7 (915) | 9.3 |
| 83.0/17.0 | 145.3 (1002) | 130.0 (896) | 10.5 |
| 20.0/80.0 | 147.8 (1019) | 134.6 (928) | 8.9 |
| 15.0/85.0 | 145.3 (1002) | 132.4 (913) | 8.9 |
| 1.0/99.0 | 131.8 (909) | 130.2 (898) | 1.2 |
| SF$_5$CF$_3$/DME | | | |
| 71.5/28.5 | 110.1 (759) | 110.1 (759) | 0.0 |
| 85.0/15.0 | 107.6 (742) | 104.6 (721) | 2.8 |
| 99.0/1.0 | 80.5 (555) | 76.4 (527) | 5.1 |
| 40.0/60.0 | 105.8 (729) | 97.7 (674) | 7.7 |
| 35.0/65.0 | 104.5 (721) | 94.3 (650) | 9.8 |
| 34.0/66.0 | 104.2 (718) | 93.7 (646) | 10.1 |
| SF$_5$CF$_3$/cyclopropane | | | |
| 55.6/44.4 | 110.6 (763) | 110.6 (763) | 0.0 |
| 80.0/20.0 | 106.9 (737) | 104.6 (721) | 2.2 |
| 99.0/1.0 | 78.9 (544) | 76.6 (528) | 2.9 |
| 20.0/80.0 | 107.9 (744) | 107.3 (740) | 0.6 |
| 1.0/99.0 | 105.2 (725) | 105.1 (725) | 0.1 |
| SF$_5$CF$_3$/143aE | | | |
| 52.0/48.0 | 92.3 (636) | 92.3 (636) | 0.0 |
| 80.0/20.0 | 88.4 (610) | 86.8 (598) | 1.8 |
| 99.0/1.0 | 75.8 (523) | 75.4 (520) | 0.5 |
| 20.0/80.0 | 89.1 (614) | 88.2 (608) | 1.0 |
| 1.0/99.0 | 84.2 (581) | 84.0 (579) | 0.2 |
| SF$_5$CF$_3$/HFC-245cb | | | |
| 96.4/3.6 | 74.7 (515) | 74.7 (515) | 0.0 |
| 99.0/1.0 | 74.7 (515) | 74.7 (515) | 0.0 |
| 60.0/40.0 | 73.0 (503) | 72.9 (503) | 0.1 |
| 40.0/60.0 | 71.4 (492) | 71.1 (490) | 0.4 |
| 20.0/80.0 | 69.4 (478) | 69.2 (477) | 0.3 |
| 1.0/99.0 | 67.5 (465) | 67.5 (465) | 0.0 |
| SF$_5$CF$_3$/HFC-143 | | | |
| 83.6/16.4 | 90.3 (623) | 90.3 (623) | 0.0 |
| 99.0/1.0 | 78.7 (543) | 75.5 (521) | 4.1 |
| 60.0/40.0 | 88.8 (612) | 86.2 (594) | 2.9 |
| 55.0/45.0 | 88.4 (610) | 80.2 (553) | 9.3 |
| 54.0/46.0 | 88.3 (609) | 75.8 (523) | 14.2 |
| SF$_5$CF$_3$/NH$_3$ | | | |
| 85.4/14.6 | 215.0 (1482) | 215.0 (1482) | 0.0 |
| 90.0/10.0 | 215.0 (1482) | 215.0 (1482) | 0.0 |
| 95.0/5.0 | 214.9 (1482) | 210.5 (1451) | 2.0 |
| 96.0/4.0 | 214.8 (1481) | 80.3 (554) | 62.6 |
| 72.0/28.0 | 215.0 (1482) | 215.0 (1482) | 0.0 |
| 71.0/29.0 | 215.0 (1482) | 215.0 (1482) | 0.0 |
| 3110Sbg/HFC-245ca | | | |
| 48.8/51.2 | 17.3 (119) | 17.3 (119) | 0.0 |

-continued

| Refrigerant Composition | 0 wt % evaporated psia (kPa) | 50 wt % evaporated psia (kPa) | % change in vapor pressure |
|---|---|---|---|
| 60.0/40.0 | 17.2 (119) | 17.0 (117) | 1.2 |
| 77.0/23.0 | 16.5 (114) | 14.9 (103) | 9.7 |
| 78.0/22.0 | 16.4 (113) | 14.6 (101) | 11.0 |
| 20.0/80.0 | 16.6 (114) | 15.6 (108) | 6.0 |
| 10.0/90.0 | 15.8 (109) | 14.6 (101) | 7.6 |
| 1.0/99.0 | 14.4 (99) | 14.2 (98) | 1.4 |

The results of this Example show that these compositions are azeotropic or azeotrope-like because when 50 wt. % of an original composition is removed, the vapor pressure of the remaining composition is within about 10% of the vapor pressure of the original composition, at a temperature of 25° C.

EXAMPLE 3

Impact of Vapor Leakage at 14.39° C.

A leak test is performed on compositions of SF5CF3 and HFC-32, at the temperature of 14.39° C. The results are summarized below.

| Refrigerant Composition | 0 wt % evaporated psia (kPa) | 50 wt % evaporated psia (kPa) | % change in vapor pressure |
|---|---|---|---|
| SF$_5$CF$_3$/HFC-32 | | | |
| 34.5/65.5 | 193.9 (1337) | 193.9 (1337) | 0.0 |
| 20.0/80.0 | 192.7 (1329) | 191.1 (1318) | 0.8 |
| 1.0/99.0 | 184.1 (1269) | 183.5 (1265) | 0.3 |
| 60.0/40.0 | 191.0 (1317) | 186.1 (1283) | 2.6 |
| 72.0/28.0 | 186.1 (1283) | 168.1 (1159) | 9.7 |
| 73.0/28.0 | 185.4 (1278) | 165.4 (1140) | 10.8 |

EXAMPLE 4

Refrigerant Performance

The following table shows the performance of the inventive refrigerants. The data are based on the following conditions.

| | |
|---|---|
| Evaporator temperature | 45.0° F. (7.2° C.) |
| Condensor temperature | 130.0° F. (54.4° C.) |
| Subcool | 15.0° F. (8.3° C.) |
| Return gas temperature | 65.0° F. (18.3° C.) |
| Compressor efficiency is 75%. | |

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 116S/HFC-32 | | | | | |
| 1.0/99.0 | 148.9 (1027) | 563.3 (3698) | 206.2 (96.8) | 2.94 | 500.8 (8.8) |
| 36.7/63.3 | 121.6 (838) | 438.7 (3025) | 192.4 (89.1) | 2.90 | 398.5 (7.0) |
| 99.0/1.0 | 43.0 (296) | 166.5 (1148) | 149.3 (65.2) | 3.33 | 164.9 (2.9) |
| 116S/HFC-134 | | | | | |
| 1.0/99.0 | 42.2 (291) | 170.2 (1173) | 182.1 (83.4) | 3.59 | 188.9 (3.3) |
| 53.5/46.5 | 48.7 (336) | 186.6 (1287) | 164.1 (73.4) | 3.41 | 193.7 (3.4) |
| 99.0/1.0 | 41.3 (285) | 160.5 (1107) | 148.5 (64.7) | 3.28 | 156.7 (2.8) |
| 116S/HFC-134a | | | | | |
| 1.0/99.0 | 54.6 (376) | 214.2 (1477) | 170.8 (77.1) | 3.43 | 223.7 (3.9) |
| 32.8/67.2 | 56.1 (387) | 215.1 (1483) | 164.2 (73.4) | 3.35 | 218.1 (3.8) |
| 99.0/1.0 | 41.3 (285) | 161.1 (1111) | 148.6 (64.8) | 3.27 | 156.7 (2.8) |
| 116S/HFC-143 | | | | | |
| 1.0/99.0 | 16.2 (112) | 72.9 (503) | 193.4 (89.7) | 3.82 | 85.6 (1.5) |
| 81.1/18.9 | 33.3 (230) | 136.1 (938) | 158.4 (70.2) | 3.47 | 141.6 (2.5) |
| 99.0/1.0 | 40.5 (279) | 158.3 (1091) | 148.7 (64.8) | 3.28 | 154.4 (2.7) |
| 116S/HFC-152a | | | | | |
| 1.0/99.0 | 50.9 (351) | 193.6 (1335) | 203.8 (95.4) | 3.60 | 223.6 (3.9) |
| 57.2/42.8 | 54.4 (375) | 202.3 (1395) | 175.9 (79.9) | 3.45 | 217.1 (3.8) |
| 99.0/1.0 | 41.6 (287) | 161.7 (1115) | 149.0 (65.0) | 3.29 | 158.1 (2.8) |
| 116S/HFC-161 | | | | | |
| 1.0/99.0 | 79.8 (550) | 279.8 (1929) | 201.0 (93.9) | 3.49 | 316.8 (5.6) |
| 48.8/51.2 | 79.1 (545) | 276.0 (1903) | 183.1 (83.9) | 3.38 | 294.9 (5.2) |
| 99.0/1.0 | 42.7 (294) | 165.2 (1139) | 149.3 (65.2) | 3.31 | 162.6 (2.9) |
| 116S/DME | | | | | |
| 1.0/99.0 | 48.6 (335) | 182.6 (1259) | 193.2 (89.6) | 3.67 | 214.5 (3.8) |
| 66.0/34.0 | 58.7 (405) | 212.1 (1462) | 169.8 (76.6) | 3.45 | 227.4 (4.0) |
| 99.0/1.0 | 42.4 (292) | 164.1 (1131) | 149.2 (65.1) | 3.29 | 161.0 (2.8) |
| 116S/NH$_3$ | | | | | |
| 1.0/99.0 | 83.1 (573) | 335.1 (2310) | 322.6 (161.4) | 3.64 | 426.4 (7.5) |
| 82.8/17.2 | 101.3 (698) | 375.0 (2586) | 209.4 (98.6) | 3.32 | 399.0 (7.0) |
| 99.0/1.0 | 49.4 (341) | 186.6 (1287) | 152.6 (67.0) | 3.52 | 196.4 (3.5) |
| 116S/134aE | | | | | |
| 1.0/99.0 | 41.8 (288) | 167.7 (1156) | 163.8 (73.2) | 3.45 | 174.4 (3.1) |
| 50.9/49.1 | 42.9 (296) | 168.9 (1165) | 156.5 (69.2) | 3.36 | 170.0 (3.0) |
| 99.0/1.0 | 41.0 (283) | 159.6 (1100) | 148.4 (64.7) | 3.28 | 155.5 (2.7) |
| 116S/143aE | | | | | |
| 1.0/99.0 | 47.9 (330) | 183.9 (1268) | 166.9 (74.9) | 3.47 | 196.0 (3.5) |
| 41.5/58.5 | 48.2 (332) | 183.9 (1268) | 160.4 (71.3) | 3.39 | 189.1 (3.3) |
| 99.0/1.0 | 41.1 (283) | 160.2 (1105) | 148.5 (64.7) | 3.28 | 155.9 (2.7) |
| 116S/HFC-245cb | | | | | |
| 1.0/99.0 | 36.2 (250) | 137.1 (945) | 139.0 (59.4) | 3.30 | 136.2 (2.4) |
| 72.9/27.1 | 38.9 (268) | 150.9 (1040) | 145.3 (62.9) | 3.29 | 154.8 (2.7) |
| 99.0/1.0 | 40.8 (281) | 158.9 (1096) | 148.0 (64.4) | 3.28 | 147.9 (2.6) |

-continued

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 116S/HFC-281ea | | | | | |
| 1.0/99.0 | 26.6 (183) | 105.2 (725) | 168.0 (75.6) | 3.69 | 120.9 (2.1) |
| 97.5/2.5 | 40.3 (278) | 157.3 (1085) | 157.3 (69.9) | 3.29 | 154.3 (2.7) |
| 99.0/1.0 | 40.7 (281) | 158.4 (1092) | 148.6 (64.8) | 3.29 | 154.9 (2.7) |
| 116S/cyclopropane | | | | | |
| 1.0/99.0 | 62.6 (432) | 215.1 (1483) | 200.2 (93.4) | 3.66 | 259.4 (4.6) |
| 41.6/58.4 | 65.7 (453) | 225.3 (1553) | 186.5 (85.8) | 3.57 | 259.7 (4.6) |
| 99.0/1.0 | 42.5 (293) | 164.3 (1133) | 149.3 (65.2) | 3.30 | 161.8 (2.8) |
| 125S/HFC-32 | | | | | |
| 1.0/99.0 | 148.9 1027 | 533.2 3676 | 205.5 96.4 | 2.96 | 502.4 8.8 |
| 8.0/92.0 | 144.6 997 | 496.6 3424 | 198.7 92.6 | 3.16 | 502.2 8.8 |
| 99.0/1.0 | 21.4 148 | 92.4 637 | 156.7 69.3 | 3.87 | 106.7 1.9 |
| 125S/134E | | | | | |
| 1.0/99.0 | 15.1 104 | 73.7 508 | 175.7 79.8 | 3.73 | 80.9 1.4 |
| 65.0/35.0 | 18.4 127 | 73.3 505 | 157.9 69.9 | 3.62 | 89.1 1.6 |
| 99.0/1.0 | 17.4 120 | 80.8 557 | 164.3 73.5 | 3.66 | 87.4 1.5 |
| 125S/HFC-143 | | | | | |
| 1.0/99.0 | 16.0 110 | 72.4 499 | 193.6 89.8 | 3.81 | 84.8 1.5 |
| 60.6/39.4 | 17.6 121 | 79.0 545 | 173.7 78.7 | 3.73 | 88.8 1.6 |
| 99.0/1.0 | 18.4 127 | 83.3 574 | 158.1 70.1 | 3.62 | 89.2 1.6 |
| 125S/NH$_3$ | | | | | |
| 1.0/99.0 | 82.3 567 | 334.2 2304 | 323.9 162.2 | 3.62 | 421.8 7.4 |
| 66.6/33.4 | 84.6 583 | 340.0 2344 | 253.3 122.9 | 3.38 | 379.4 6.7 |
| 99.0/1.0 | 25.6 177 | 106.6 735 | 159.2 70.7 | 4.12 | 132.6 2.3 |
| 125S/HFC-254cb | | | | | |
| 1.0/99.0 | 18.6 128 | 79.8 550 | 154.5 68.1 | 3.62 | 86.8 1.5 |
| 69.0/31.0 | 18.6 128 | 82.4 568 | 156.4 69.1 | 3.62 | 88.7 1.6 |
| 99.0/1.0 | 18.4 127 | 83.4 575 | 157.6 69.8 | 3.62 | 89.2 1.6 |
| 125S/HFC-254eb | | | | | |
| 1.0/99.0 | 18.9 130 | 81.1 559 | 154.4 68.0 | 3.62 | 88.1 1.6 |
| 36.7/63.3 | 18.9 130 | 82.1 566 | 155.3 68.5 | 3.62 | 88.8 1.6 |
| 99.0/1.0 | 18.4 127 | 83.4 575 | 157.6 69.8 | 3.62 | 89.2 1.6 |
| 125S/HFC-272ca | | | | | |
| 1.0/99.0 | 19.1 132 | 78.5 541 | 160.6 71.4 | 3.70 | 89.3 1.6 |
| 61.6/38.4 | 18.7 129 | 80.7 556 | 159.3 70.7 | 3.66 | 89.2 1.6 |
| 99.0/1.0 | 18.4 127 | 83.3 574 | 157.7 69.8 | 3.62 | 89.2 1.6 |
| 125S/HFC-281fa | | | | | |
| 1.0/99.0 | 20.7 143 | 86.6 597 | 169.4 76.3 | 3.73 | 99.3 1.7 |
| 45.1/54.9 | 20.1 139 | 86.1 594 | 166.2 74.6 | 3.70 | 96.9 1.7 |
| 99.0/1.0 | 18.5 128 | 83.5 576 | 157.9 69.9 | 3.62 | 89.4 1.6 |
| SF$_5$C$_2$F$_5$/HFC-32 | | | | | |
| 1.0/99.0 | 149.6 1031 | 510.5 3520 | 199.9 93.3 | 3.16 | 518.5 9.1 |
| 15.0/85.0 | 148.0 1020 | 504.6 3479 | 195.3 90.7 | 3.23 | 518.2 9.1 |
| 64.0/36.0 | 60.9 420 | 308.1 2124 | 192.4 89.1 | 2.93 | 254.4 4.5 |
| 99.0/1.0 | 15.8 109 | 79.1 545 | 142.7 61.5 | 3.86 | 84.7 1.5 |
| SF$_5$C$_2$F$_5$/HFC-245fa | | | | | |
| 1.0/99.0 | 11.2 77 | 53.8 371 | 154.6 68.1 | 3.67 | 57.5 1.0 |
| 71.8/28.2 | 11.2 77 | 58.4 403 | 143.8 62.1 | 3.51 | 57.0 1.0 |
| 99.0/1.0 | 11.6 80 | 62.8 433 | 137.8 58.8 | 3.39 | 57.5 1.0 |
| SF$_5$C$_2$F$_5$/HFC-263ca | | | | | |
| 1.0/99.0 | 9.4 65 | 44.8 309 | 162.2 72.3 | 3.77 | 49.9 0.9 |
| 82.6/17.4 | 10.7 74 | 56.3 388 | 144.2 62.3 | 3.54 | 55.2 1.0 |
| 99.0/1.0 | 11.5 79 | 62.6 432 | 138.1 58.9 | 3.39 | 57.3 1.0 |
| SF$_5$C$_2$F$_5$/HFC-272ca | | | | | |
| 1.0/99.0 | 19.0 131 | 78.4 541 | 160.5 71.4 | 3.70 | 89.2 1.6 |
| 16.5/83.5 | 18.4 127 | 77.4 534 | 158.8 70.4 | 3.68 | 86.8 1.5 |
| 99.0/1.0 | 11.8 81 | 63.4 437 | 138.2 59.0 | 3.38 | 58.3 1.0 |
| SF$_5$C$_2$F$_5$/HFC-272ea | | | | | |
| 1.0/99.0 | 10.7 74 | 50.9 351 | 171.0 77.2 | 3.80 | 57.7 1.0 |
| 76.3/23.7 | 11.7 81 | 58.4 410 | 149.7 65.4 | 3.59 | 60.4 1.1 |
| 99.0/1.0 | 11.6 80 | 62.9 434 | 138.2 59.0 | 3.39 | 57.8 1.0 |
| SF$_5$C$_2$F$_5$/HFC-272fb | | | | | |
| 1.0/99.0 | 9.4 65 | 63.4 437 | 168.7 75.9 | 3.76 | 71.9 1.3 |
| 56.5/43.5 | 10.7 74 | 58.4 403 | 143.8 62.1 | 3.51 | 57.0 1.0 |
| 99.0/1.0 | 11.7 81 | 63.2 436 | 138.2 59.0 | 3.39 | 58.0 1.0 |
| SF$_5$C$_2$F$_5$/HFC-281fa | | | | | |
| 1.0/99.0 | 20.7 143 | 86.6 597 | 169.4 76.3 | 3.72 | 99.2 1.7 |
| 6.9/93.1 | 20.5 141 | 86.4 596 | 168.7 75.9 | 3.71 | 98.4 1.7 |
| 99.0/1.0 | 11.9 82 | 64.1 442 | 138.5 59.2 | 3.39 | 58.9 1.0 |
| SF$_5$C$_2$F$_5$/NH$_3$ | | | | | |
| 1.0/99.0 | 85.7 591 | 336.0 2317 | 316.8 158.2 | 3.75 | 441.4 7.8 |
| 68.5/31.5 | 87.5 603 | 380.7 2625 | 255.8 124.3 | 3.10 | 378.6 6.7 |
| SF$_5$CF$_2$H/HFC-245cb | | | | | |
| 1.0/99.0 | 36.1 249 | 137.0 945 | 164.3 73.5 | 3.62 | 86.5 1.5 |

-continued

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 23.1/76.9 | 33.0 228 | 132.0 910 | 162.7 72.6 | 3.63 | 90.9 1.6 |
| 66.0/34.0 | 24.2 167 | 110.8 764 | 154.2 67.9 | 3.49 | 112.3 2.0 |
| 95.0/5.0 | 17.5 121 | 88.1 607 | 143.3 61.8 | 3.34 | 131.2 2.3 |
| 99.0/1.0 | 16.4 113 | 84.3 581 | 139.1 59.5 | 3.31 | 135.9 2.4 |
| $SF_5CF_2H/(CF_3)_3N$ | | | | | |
| 1.0/99.0 | 25.6 177 | 111.4 768 | 136.8 58.2 | 3.02 | 95.2 1.7 |
| 27.2/72.8 | 28.7 198 | 123.5 852 | 138.2 59.0 | 3.15 | 111.2 2.0 |
| 71.0/29.0 | 22.4 154 | 108.7 749 | 153.9 67.7 | 3.44 | 105.6 1.9 |
| 95.0/5.0 | 17.7 122 | 88.9 613 | 161.9 72.2 | 3.67 | 92.6 1.6 |
| 99.0/1.0 | 16.5 114 | 84.5 583 | 164.0 73.3 | 3.62 | 86.5 1.5 |
| $SF_5CF_2H/236faE$ | | | | | |
| 1.0/99.0 | 16.2 112 | 83.4 575 | 164.4 73.6 | 3.61 | 85.2 1.5 |
| 81.5/18.5 | 16.9 117 | 84.9 585 | 158.9 70.5 | 3.58 | 86.2 1.5 |
| 99.0/1.0 | 15.7 108 | 74.6 514 | 142.2 61.2 | 3.46 | 73.6 1.3 |
| $SF_5CF_2H/NH_3$ | | | | | |
| 1.0/99.0 | 82.1 566 | 333.5 2299 | 324.1 162.3 | 3.62 | 421.0 7.4 |
| 66.8/33.2 | 82.5 569 | 346.2 2387 | 265.1 129.5 | 3.34 | 380.5 6.7 |
| 99.0/1.0 | 23.9 165 | 109.5 755 | 165.7 74.3 | 4.18 | 134.4 2.4 |
| $SF_5CF_3/HFC-32$ | | | | | |
| 1.0/99.0 | 149.8 1033 | 535.9 3695 | 205.5 96.4 | 2.95 | 503.0 8.9 |
| 34.0/66.0 | 159.5 1100 | 517.4 3567 | 187.2 86.2 | 3.04 | 498.4 8.8 |
| 99.0/1.0 | 51.0 352 | 208.6 1438 | 155.5 68.6 | 3.33 | 201.0 3.5 |
| $SF_5CF_3/HFC-134a$ | | | | | |
| 1.0/99.0 | 54.5 376 | 214.1 1476 | 170.8 77.1 | 3.43 | 223.6 3.9 |
| 42.8/57.2 | 53.4 368 | 213.1 1469 | 165.6 74.2 | 3.33 | 213.0 3.8 |
| 99.0/1.0 | 45.8 316 | 193.7 1336 | 155.3 68.5 | 3.17 | 176.9 3.1 |
| $SF_5CF_3/HFC-152a$ | | | | | |
| 1.0/99.0 | 50.8 350 | 193.4 1333 | 203.9 95.5 | 3.60 | 223.5 3.9 |
| 63.5/36.5 | 51.3 354 | 202.2 1394 | 178.4 81.3 | 3.43 | 212.8 3.7 |
| 99.0/1.0 | 45.9 316 | 193.8 1336 | 155.9 68.8 | 3.17 | 177.6 3.1 |
| $SF_5CF_3/134aE$ | | | | | |
| 1.0/99.0 | 41.8 288 | 167.7 1156 | 163.9 73.3 | 3.45 | 174.4 3.1 |
| 60.1/39.9 | 42.9 296 | 177.6 1225 | 159.3 70.7 | 3.33 | 174.3 3.1 |
| 99.0/1.0 | 45.5 314 | 192.4 1327 | 155.2 68.4 | 3.17 | 175.8 3.1 |
| $SF_5CF_3/HFC-161$ | | | | | |
| 1.0/99.0 | 79.7 550 | 279.6 1928 | 201.0 93.9 | 3.49 | 316.6 5.6 |
| 55.9/44.1 | 73.9 510 | 269.5 1858 | 184.8 84.9 | 3.38 | 285.5 5.0 |
| 85.0/15.0 | 60.7 419 | 238.4 1644 | 169.3 76.3 | 3.26 | 233.4 4.1 |
| 95.0/5.0 | 51.7 356 | 212.6 1466 | 160.8 71.6 | 3.21 | 199.5 3.5 |
| 99.0/1.0 | 47.0 324 | 197.5 1362 | 156.3 69.1 | 3.18 | 181.5 3.2 |
| $SF_5CF_3/DME$ | | | | | |
| 1.0/99.0 | 48.4 334 | 182.3 1257 | 193.2 89.6 | 3.67 | 214.0 3.8 |
| 71.5/28.5 | 53.9 372 | 207.4 1430 | 172.8 78.2 | 3.45 | 219.8 3.9 |
| 99.0/1.0 | 46.4 320 | 195.4 1347 | 156.1 68.9 | 3.17 | 179.3 3.2 |
| $SF_5CF_3/cyclopropane$ | | | | | |
| 1.0/99.0 | 62.6 432 | 214.9 1482 | 200.2 93.4 | 3.67 | 259.3 4.6 |
| 55.6/44.4 | 62.2 429 | 222.3 1533 | 184.9 84.9 | 3.54 | 251.0 4.4 |
| 99.0/1.0 | 48.4 334 | 182.3 1257 | 193.2 89.6 | 3.67 | 214.0 3.8 |
| $SF_5CF_3/143aE$ | | | | | |
| 1.0/99.0 | 47.9 330 | 183.9 1268 | 167.0 75.0 | 3.47 | 176.3 3.1 |
| 52.0/48.0 | 47.8 330 | 190.1 1311 | 162.0 72.2 | 3.36 | 191.4 3.4 |
| 99.0/1.0 | 45.6 314 | 192.8 1329 | 155.3 68.5 | 3.17 | 176.3 3.1 |
| $SF_5CF_3/HFC-245cb$ | | | | | |
| 1.0/99.0 | 36.2 250 | 137.5 948 | 139.0 59.4 | 3.30 | 136.3 2.4 |
| 96.4/3.6 | 44.9 310 | 189.5 1307 | 154.3 67.9 | 3.17 | 173.6 3.1 |
| 99.0/1.0 | 45.4 313 | 192.1 1324 | 154.9 68.3 | 3.17 | 175.2 3.1 |
| $SF_5CF_3/HFC-143$ | | | | | |
| 1.0/99.0 | 16.1 111 | 72.7 501 | 193.7 89.8 | 3.81 | 85.2 1.5 |
| 83.6/16.4 | 33.3 230 | 147.1 1014 | 163.4 73.0 | 3.50 | 150.8 2.7 |
| 99.0/1.0 | 44.6 308 | 189.4 1306 | 155.6 68.7 | 3.19 | 174.5 3.1 |
| $SF_5CF_3/NH_3$ | | | | | |
| 1.0/99.0 | 83.2 574 | 335.4 2313 | 322.4 161.3 | 3.65 | 427.4 7.5 |
| 85.4/14.6 | 108.9 751 | 426.7 2942 | 215.4 101.9 | 3.09 | 416.2 7.3 |
| 99.0/1.0 | 55.6 383 | 226.3 1560 | 160.3 71.3 | 3.36 | 222.1 3.9 |
| 3110Sbg/HFC-245ca | | | | | |
| 1.0/99.0 | 7.0 48 | 36.9 254 | 157.7 69.8 | 3.75 | 39.3 0.7 |
| 48.8/51.2 | 8.8 61 | 44.6 308 | 140.6 60.3 | 3.52 | 44.3 0.8 |
| 99.0/1.0* | 4.7 32 | 27.7 191 | 130.0 54.4 | 3.36 | 24.5 0.4 |

*Return Gas = 70° F.

EXAMPLE 5

This Example is directed to the vapor pressure of the liquid mixtures of this invention shown in FIGS. 1–29 and 31–39, at 25° C.

Turning to FIG. 1, the upper curve represents the composition of the liquid, and the lower curve represents the composition of the vapor.

The data for the compositions of the liquid in FIG. 1 are obtained as follows. A stainless steel cylinder is evacuated, and a weighed amount of $CF_3SCF_3$ is added to the cylinder. The cylinder is cooled to reduce the vapor pressure of $CF_3SCF_3$, and then a weighed amount of butane is added to the cylinder. The cylinder is agitated to mix the $CF_3SCF_3$ and butane, and then the cylinder is placed in a constant temperature bath until the temperature comes to equilibrium at 25° C., at which time the vapor pressure of the $CF_3SCF_3$ and butane in the cylinder is measured. Additional samples of liquid are measured the same way, and the results are plotted in FIG. 1.

The curve which shows the composition of the vapor is calculated using an ideal gas equation of state. Vapor/liquid equilibrium data are obtained in the same way for the mixtures shown in FIGS. 2–29 and 31–39.

The data in these Figures show that at 25° C., there are ranges of compositions that have vapor pressures higher than the vapor pressures of the pure components of the composition at that same temperature. As stated earlier, the higher than expected pressures of these compositions may result in an unexpected increase in the refrigeration capacity or efficiency of those compositions when compared to the pure components of the compositions.

The data in FIGS. 1–29 and 31–39 show that at 25° C., there are ranges of compositions that have vapor pressures below the vapor pressures of the pure components of the composition at that same temperature. These minimum boiling compositions are useful in refrigeration, and may show an improved efficiency when compared to the pure components of the composition.

EXAMPLE 6

Figure 30:
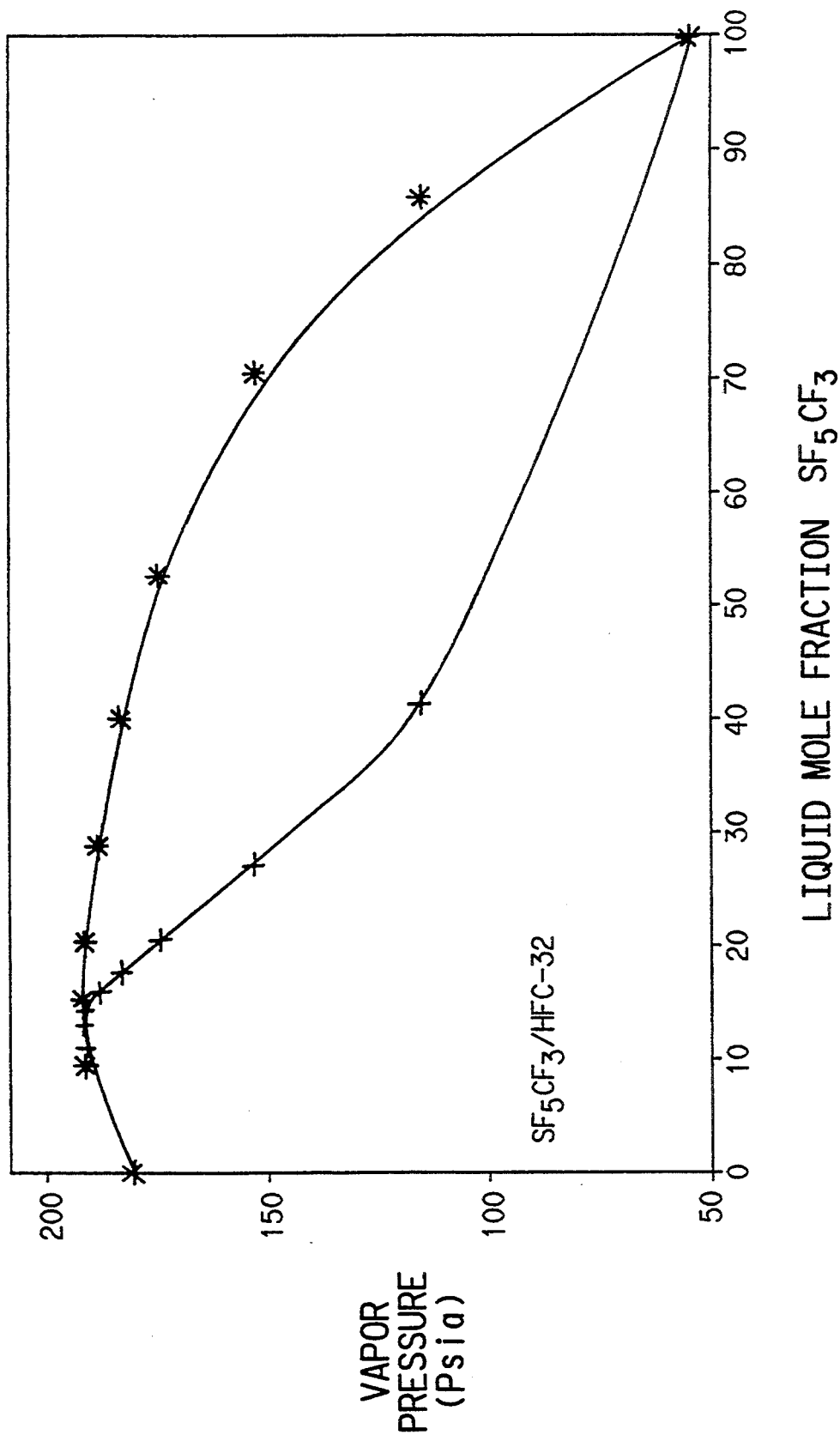
FIG. 30 is a graph of the vapor/liquid equilibrium curve for mixtures of SF$_5$CF$_3$ and HFC-32 at 14.39° C.
Figure 31:
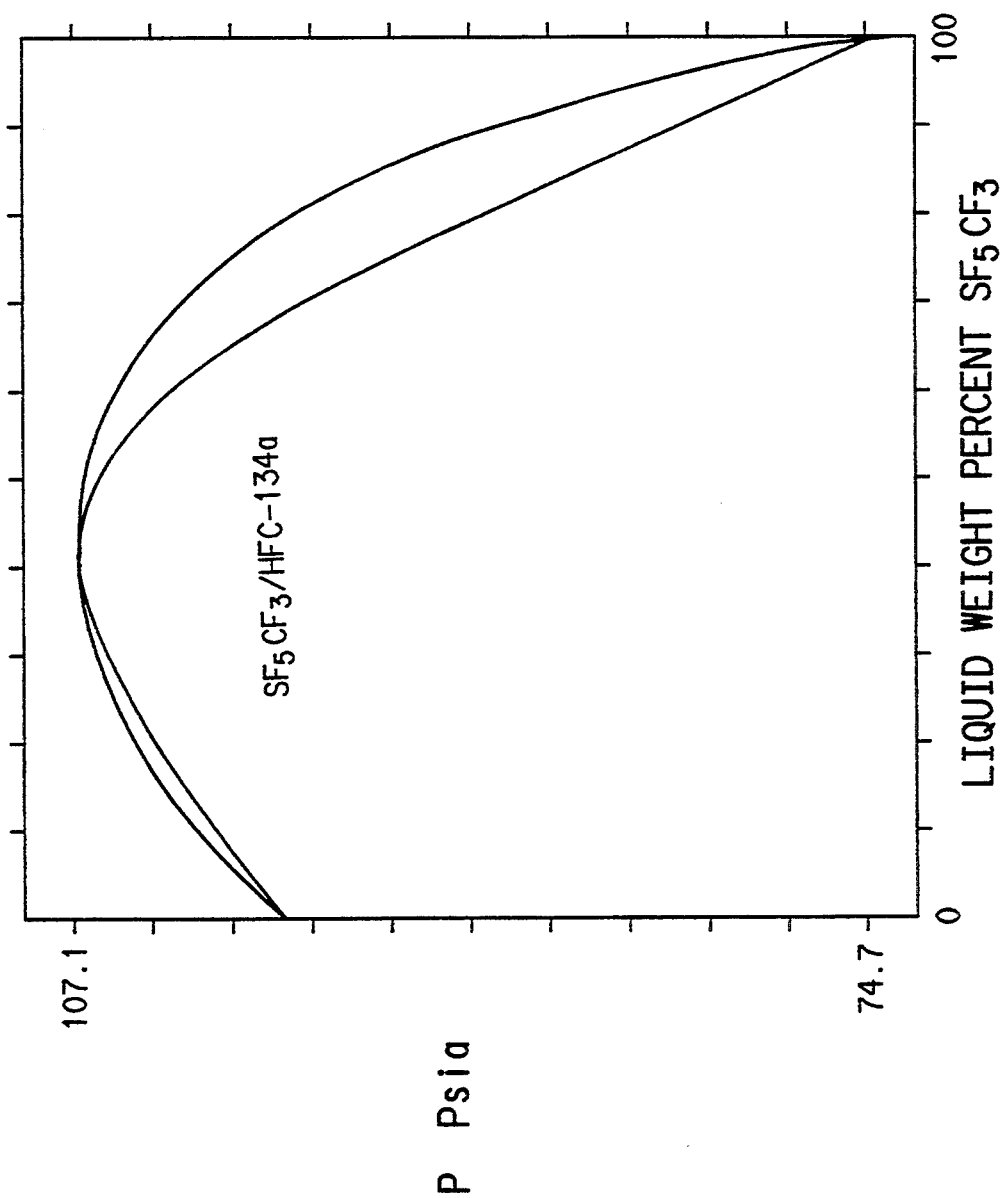
FIG. 31 is a graph of the vapor/liquid equilibrium curve for mixtures of SF$_5$CF$_3$ and HFC-134a at 25° C.
Figure 32:
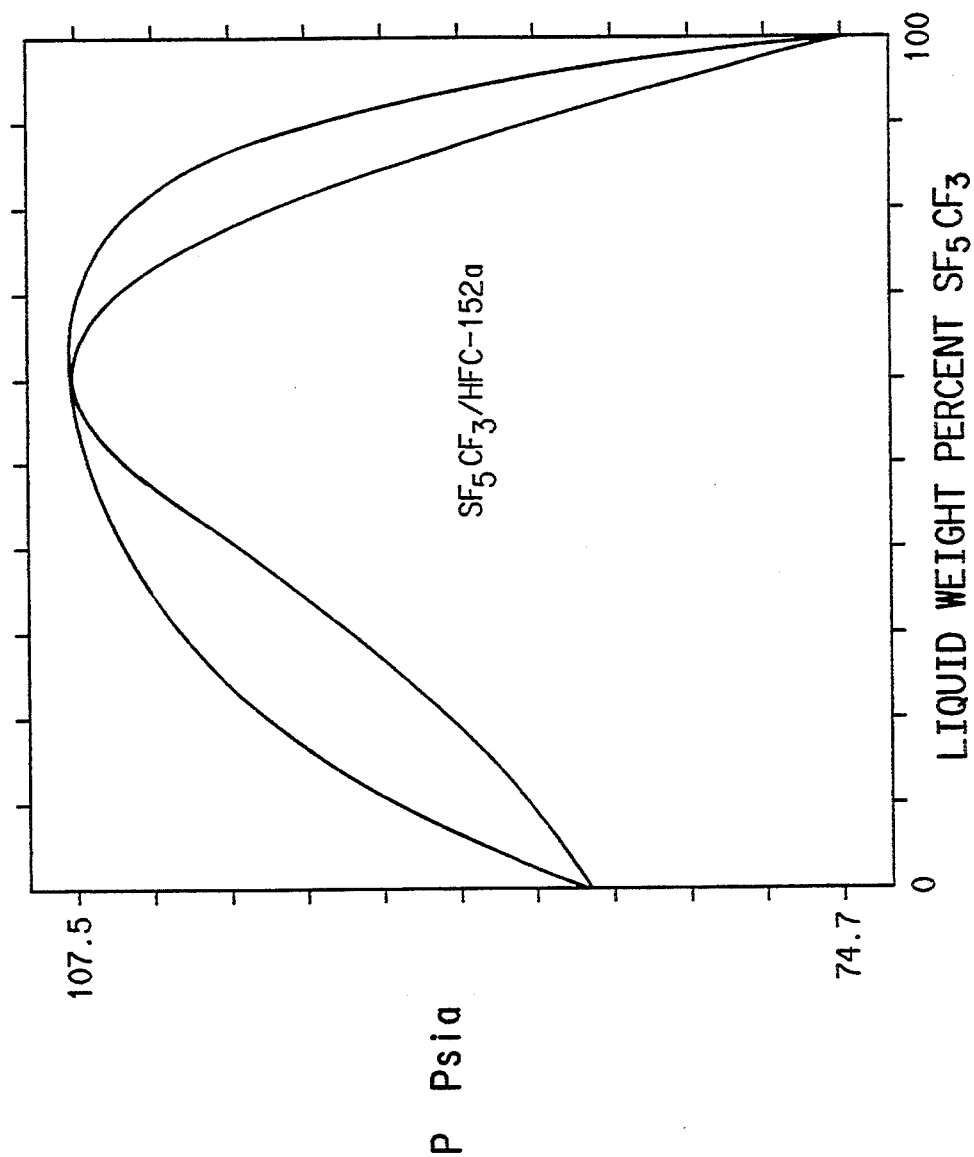
FIG. 32 is a graph of the vapor/liquid equilibrium curve for mixtures of SF$_5$CF$_3$ and HFC-152a at 25° C.
Figure 33:
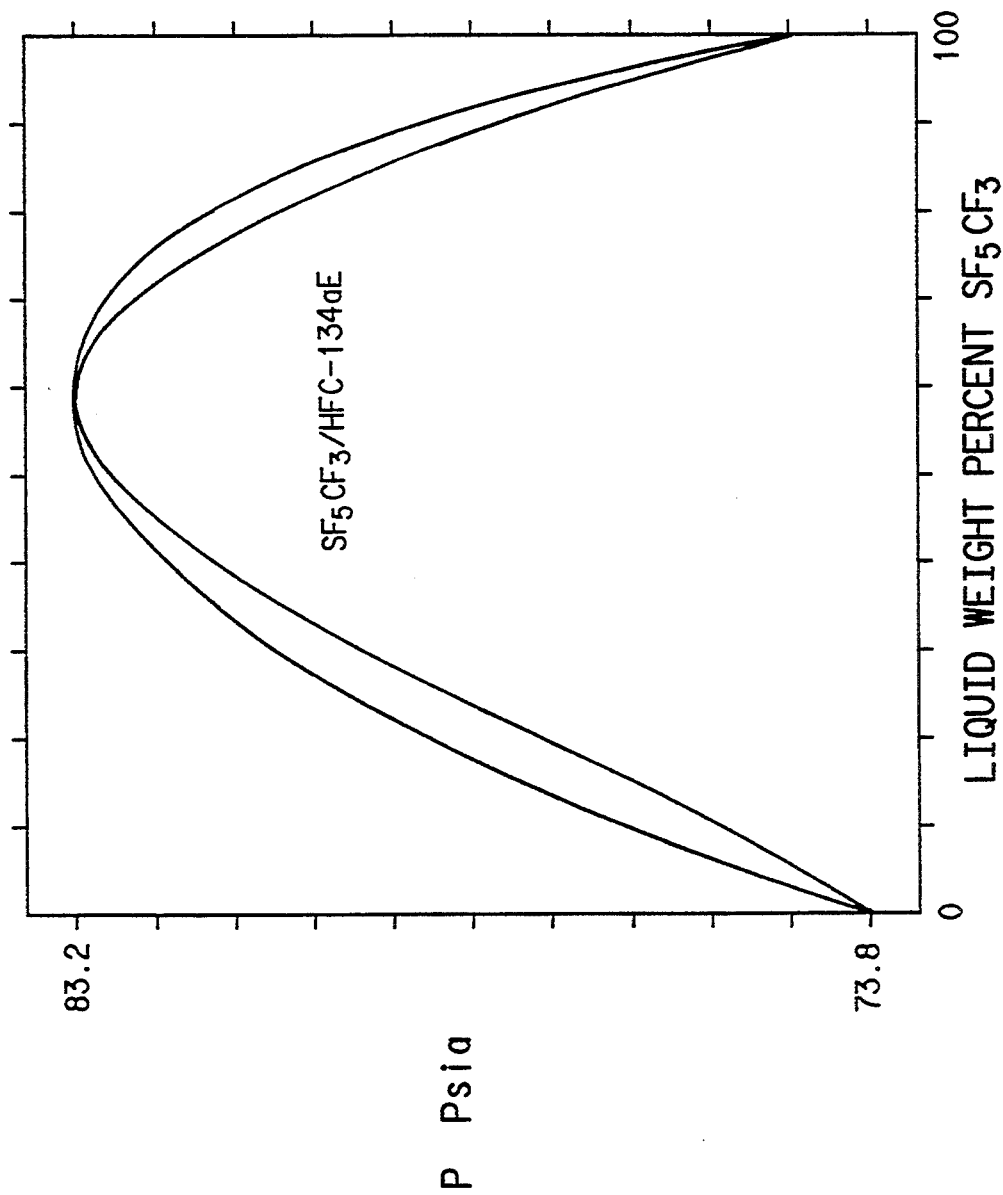
FIG. 33 is a graph of the vapor/liquid equilibrium curve for mixtures of SF$_5$CF$_3$ and 134aE at 25° C.
Figure 34:
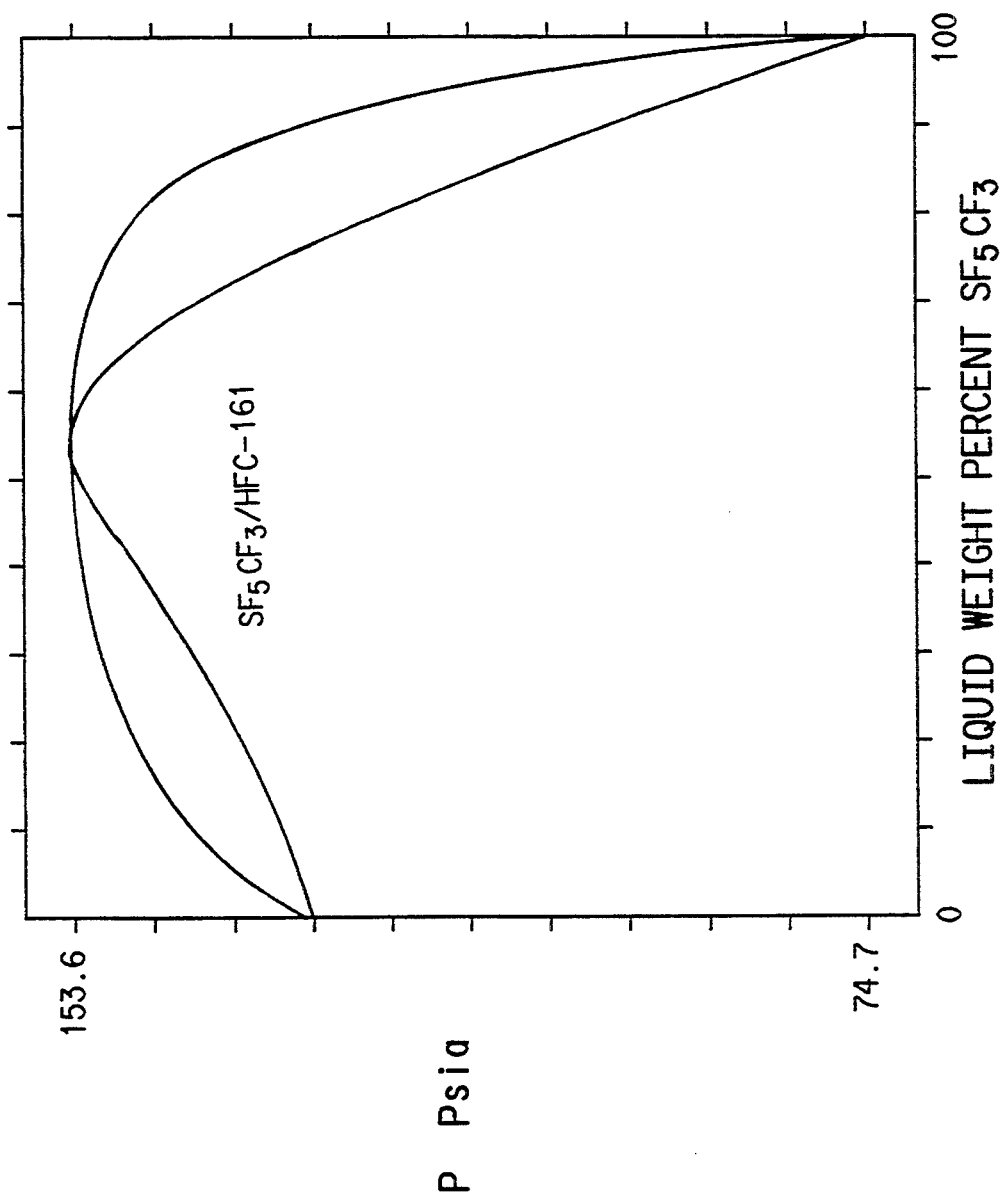
FIG. 34 is a graph of the vapor/liquid equilibrium curve for mixtures of SF$_5$CF$_3$ and HFC-161 at 25° C.
Figure 35:
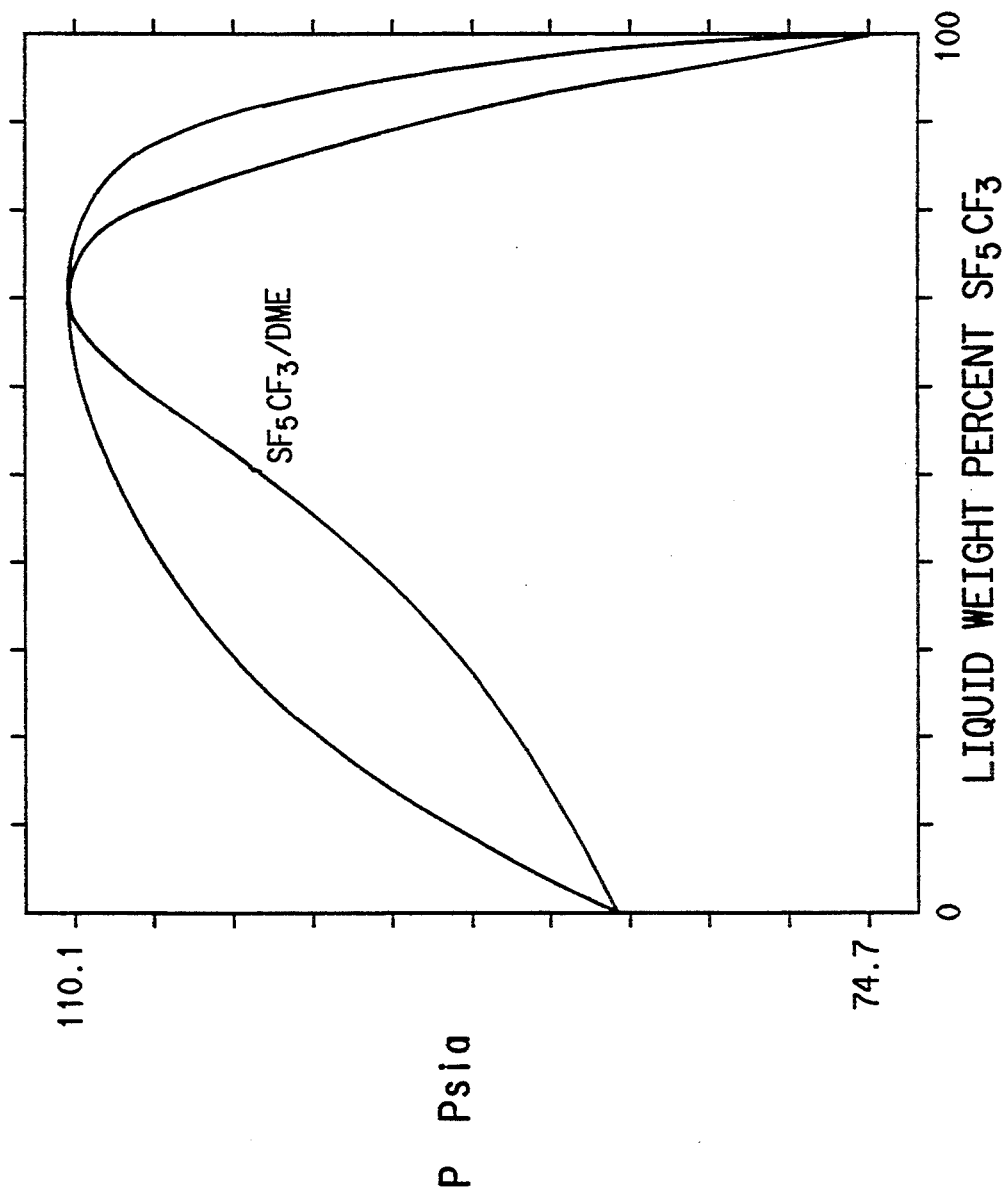
FIG. 35 is a graph of the vapor/liquid equilibrium curve for mixtures of SF$_5$CF$_3$ and DME at 25° C.
Figure 36:
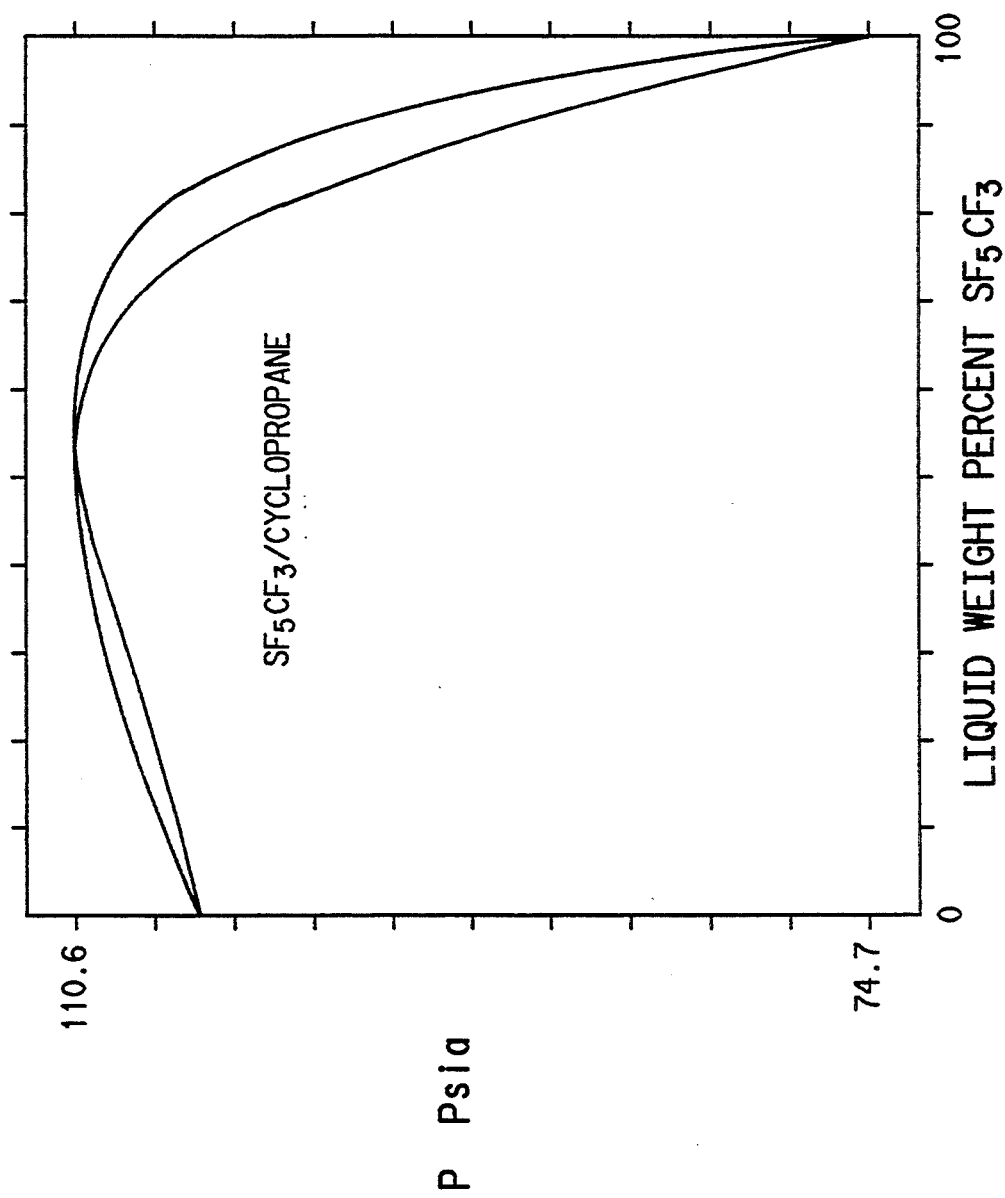
FIG. 36 is a graph of the vapor/liquid equilibrium curve for mixtures of SF$_5$CF$_3$ and cyclopropane at 25° C.
Figure 37:
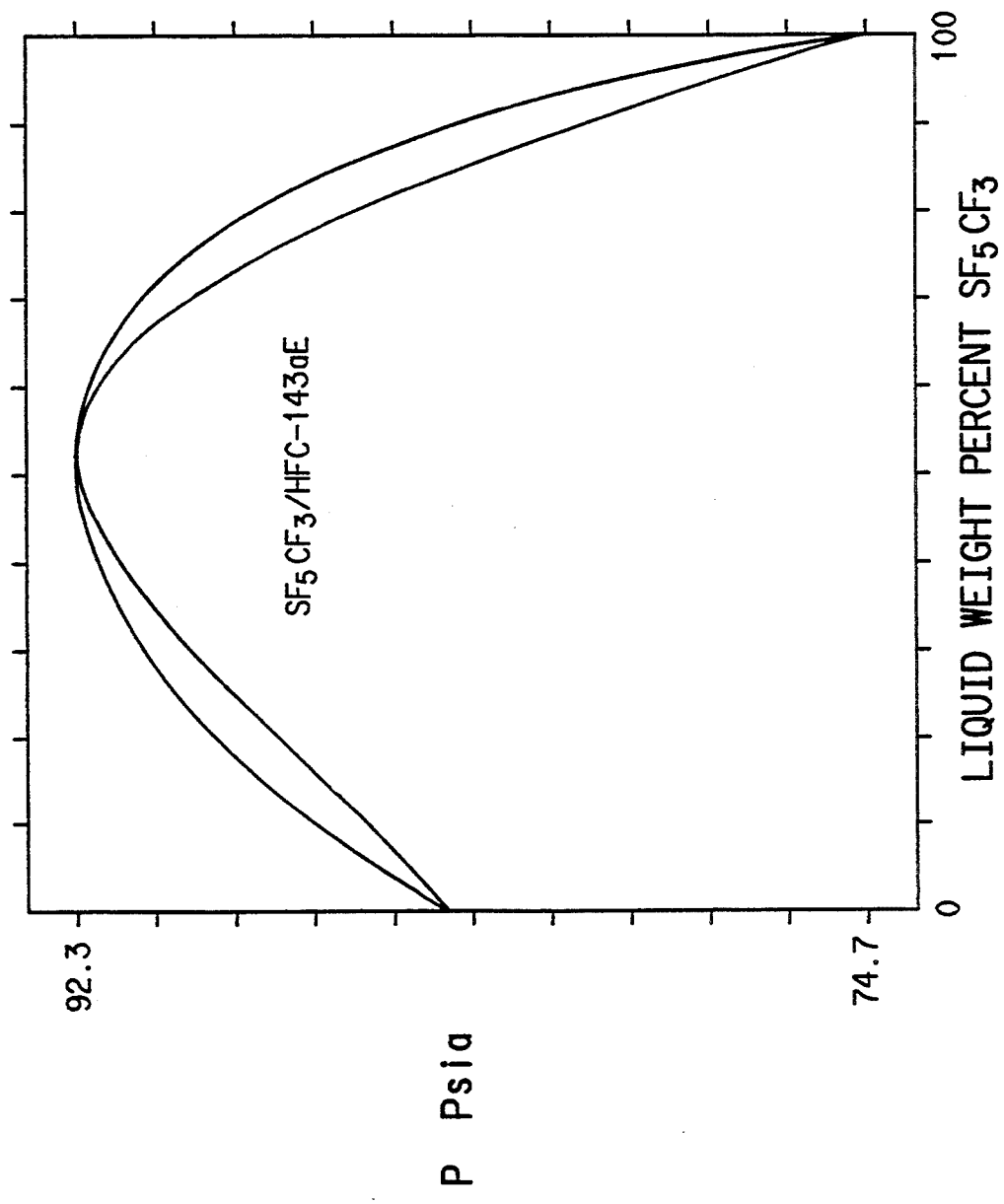
FIG. 37 is a graph of the vapor/liquid equilibrium curve for mixtures of SF$_5$CF$_3$ and 143aE at 25° C.
Figure 38:
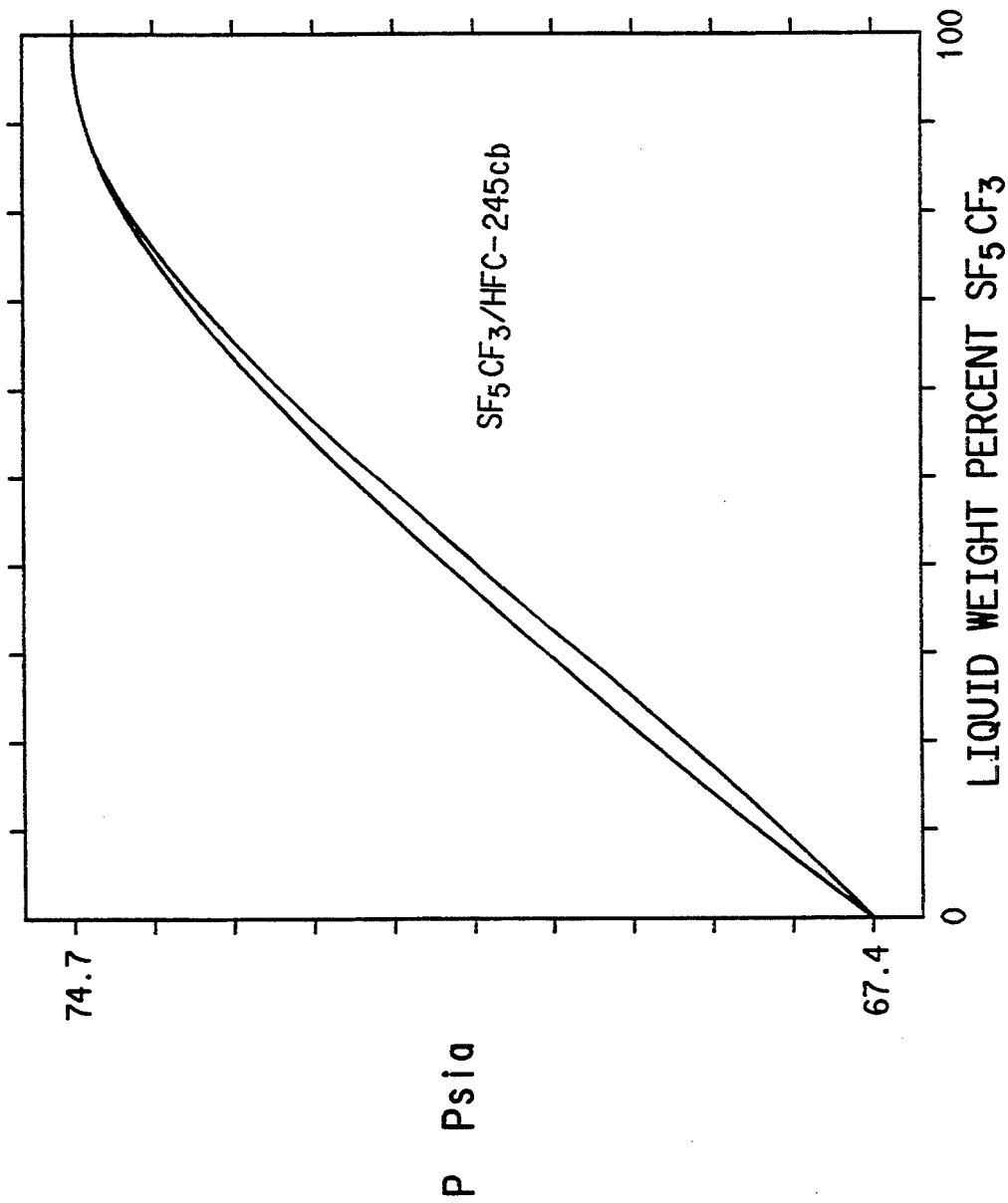
FIG. 38 is a graph of the vapor/liquid equilibrium curve for mixtures of SF$_5$CF$_3$ and HFC-245cb at 25° C.
Figure 39:
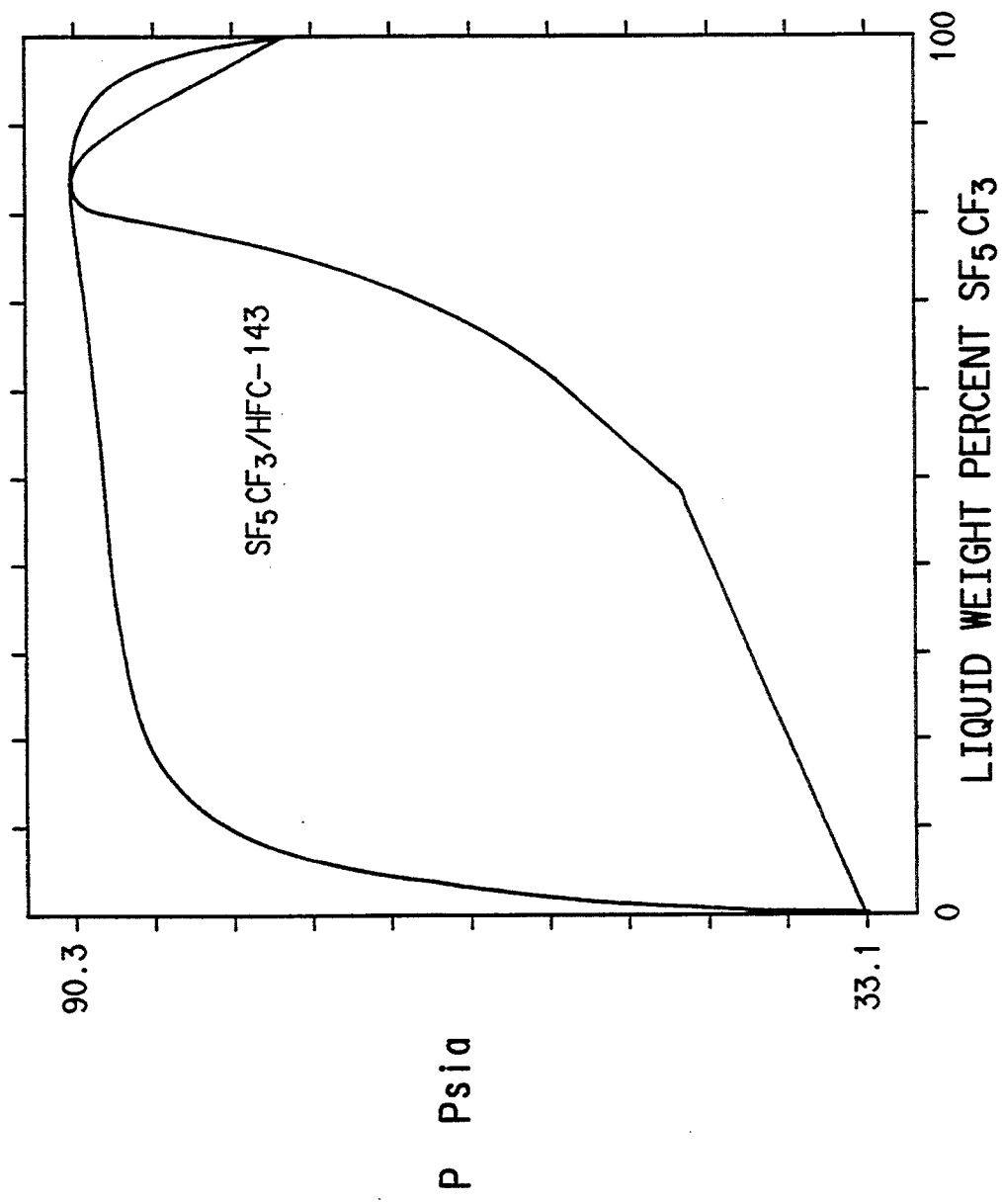
FIG. 39 is a graph of the vapor/liquid equilibrium curve for mixtures of SF$_5$CF$_3$ and HFC-143 at 25° C.
Figure 40:
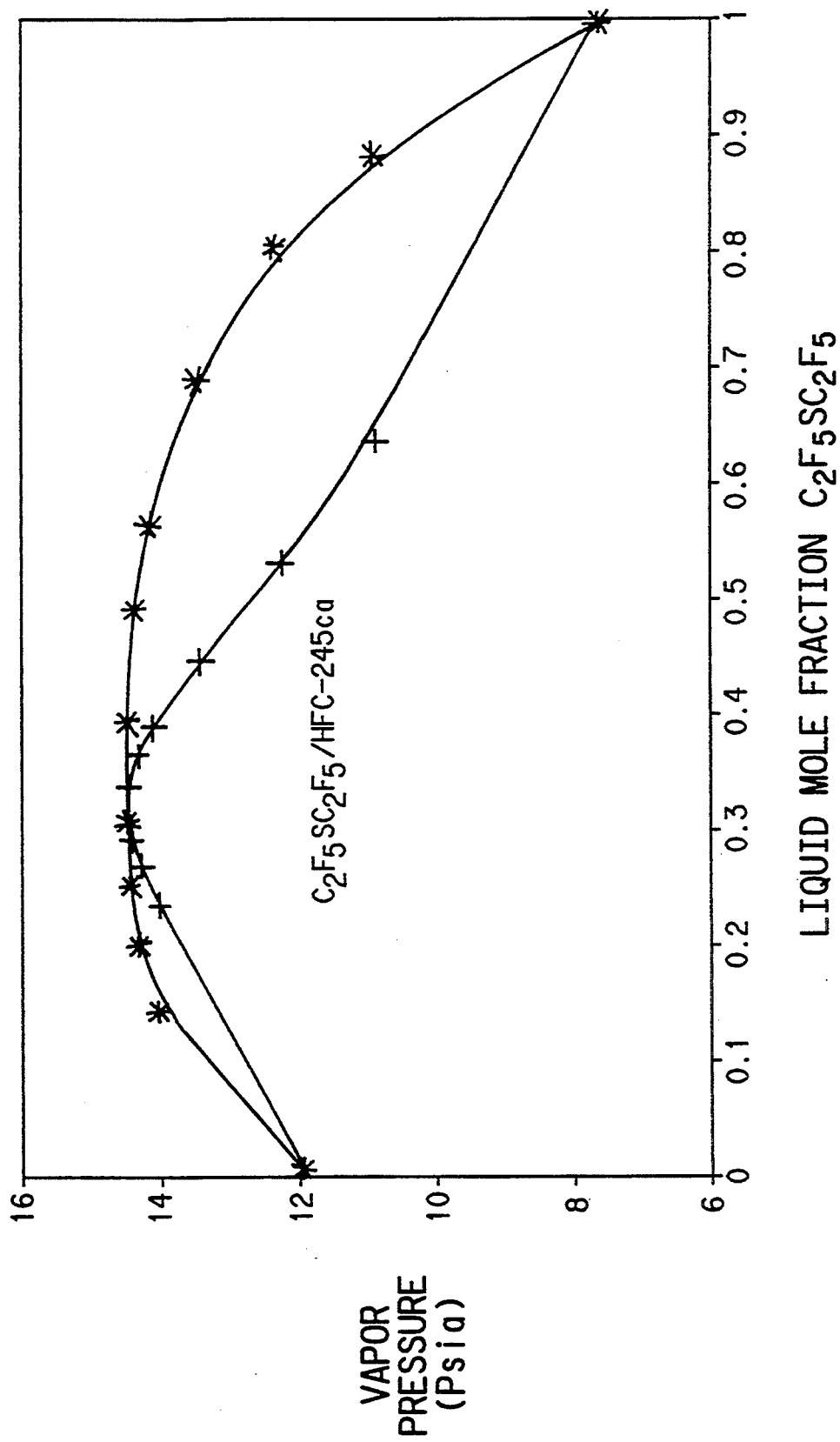
FIG. 40 is a graph of the vapor/liquid equilibrium curve for mixtures of C$_2$F$_5$SC$_2$F$_5$ and HFC-245ca at 19.95° C.

This Example is directed to measurements of the liquid/vapor equilibrium curve for mixtures of $SF_5CF_3$/HFC-32 and $C_2F_5SC_2F_5$/HFC-245ca. The liquid/vapor equilibrium data for these mixtures are shown in FIG. 30 and 40. The upper curve in these Figures represents the liquid composition, and the lower curve represents the vapor composition.

The procedure for measuring the composition of the liquid for mixtures of $SF_5CF_3$ and HFC-32 in FIG. 30 was as follows. A stainless steel cylinder was evacuated, and a weighed amount of $SF_5CF_3$ was added to the cylinder. The cylinder was cooled to reduce the vapor pressure of $SF_5CF_3$, and then a weighed amount of HFC-32 was added to the cylinder. The cylinder was agitated to mix the $SF_5CF_3$ and HFC-32, and then the cylinder was placed in a constant temperature bath until the temperature came to equilibrium at 14.39° C., at which time the vapor pressure of the content of the cylinder was measured. Samples of the liquid in the cylinder were taken and analyzed, and the results are plotted in FIG. 30 as asterisks, with a best fit curve having been drawn through the asterisks.

This procedure was repeated for various mixtures of $SF_5CF_3$ and HFC-32 as indicated in FIG. 30.

The curve which shows the composition of the vapor is calculated using an ideal gas equation of state.

The data in FIG. 30 show that at 14.39° C., there are ranges of compositions that have vapor pressures higher than the vapor pressures of the pure components of the composition at that same temperature.

The same procedure was used to measure the vapor/liquid equilibrium curve for mixtures of $C_2F_5SC_2F_5$ and HFC-245ca, except that the measurements were taked at 19.95° C. The result are shown in FIG. 40, where it may be seen that there are ranges of compositions that have vapor pressures higher than the vapor pressures of the pure components of the composition at that same temperature.

The novel compositions of this invention, including the azeotropic or azeotrope-like compositions, may be used to produce refrigeration by condensing the compositions and thereafter evaporating the condensate in the vicinity of a body to be cooled. The novel compositions may also be used to produce heat by condensing the refrigerant in the vicinity of the body to be heated and thereafter evaporating the refrigerant.

In addition to refrigeration applications, the novel constant boiling or substantially constant boiling compositions of the invention are also useful as aerosol propellants, heat transfer media, gaseous dielectrics, fire extinguishing agents, expansion agents for polyolefins and polyurethanes and power cycle working fluids.

Additional Compounds

Other components, such as aliphatic hydrocarbons having a boiling point of $-60°$ to $+60°$ C., hydrofluorocarbonalkanes having a boiling point of $-60°$ to $+60°$ C., hydrofluoropropanes having a boiling point of between $-60°$ to $+60°$ C., hydrocarbon esters having a boiling point between $-60°$ to $+60°$ C., hydrochlorofluorocarbons having a boiling point between $-60°$ to $+60°$ C., hydrofluorocarbons having a boiling point of $-60°$ to $+60°$ C., hydrochlorocarbons having a boiling point between $-60°$ to $+60°$ C., chlorocarbons and perfluorinated compounds, can be added to the azeotropic or azeotrope-like compositions described above.

Optionally, non-refrigerant additives may be added to the refrigerant compositions disclosed herein. By "non-refrigerant additives" is meant additives that are not refrigerants but which may be added to refrigerant compositions for a variety of purposes. Examples of non-refrigerant additives include lubricants, surfactants, corrosion inhibitors, stabilizers, and dyes. Preferred lubricants include esters having a molecular weight greater than 250.

If the compositions of the invention are used as cleaning agents, expansion agents for polyolefins and polyurethanes, aerosol propellants, heat transfer media, gaseous dielectrics, fire extinguishing agents, power cycle working fluids, polymerization media, particulate removal fluids, carrier fluids, buffing abrasive agents, or displacement drying agents, additives appropriate to those uses may be added to the compositions of the invention.

We claim:

1. An azeotropic or azeotrope-like composition consisting essentially of 1–77 weight percent bis(pentafluoroethyl)sulfide and 23–99 weight percent 1,1,2,2,3-pentafluoropropane, said composition having a vapor pressure of from about 14 to about 17 psia when the temperature is adjusted to about 25° C., and wherein when about 50 weight percent of the composition is evaporated at about 25° C., the vapor pressure changes less than about 10 percent.

2. A composition consisting essentially of greater than 0 to about 80 liquid mole percent bis(pentafluoroethyl)sulfide and about 20 to less than 100 liquid mole percent 1,1,2,2,3-pentafluoropropane wherein the vapor pressure of the composition is higher than the vapor pressure of bis(pentafluoroethyl)sulfide and 1,1,2,2,3-pentafluoropropane at about 20° C., when the temperature has been adjusted to about 20° C.

3. A process for producing refrigeration, comprising condensing a composition of claim 1 and thereafter evaporating said composition in the vicinity of the body to be cooled.

4. A process for producing heat comprising condensing a composition of any of claim 1 in the vicinity of a body to be heated, and thereafter evaporating said composition.

5. A process for producing refrigeration, comprising condensing a composition of claim 2 and thereafter evaporating said composition in the vicinity of the body to be cooled.

6. A process for producing heat comprising condensing a composition of any of claim 2 in the vicinity of a body to be heated, and thereafter evaporating said composition.

* * * * *